United States Patent
Zhang et al.

(10) Patent No.: US 9,350,435 B2
(45) Date of Patent: May 24, 2016

(54) PRECODING MATRIX INDICATOR FEEDBACK METHOD, RECEIVE END, AND TRANSMIT END

(71) Applicant: Huawei Technologies Co., Ltd., Shenzhen (CN)

(72) Inventors: Leiming Zhang, Beijing (CN); Qiang Wu, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/924,395

(22) Filed: Oct. 27, 2015

(65) Prior Publication Data

US 2016/0050000 A1 Feb. 18, 2016

Related U.S. Application Data

(63) Continuation of application No. PCT/CN2013/076776, filed on Jun. 5, 2013.

(30) Foreign Application Priority Data

Apr. 28, 2013 (CN) .................. PCT/CN2013/074992

(51) Int. Cl.
  *H04L 1/06* (2006.01)
  *H04B 7/04* (2006.01)
  (Continued)

(52) U.S. Cl.
  CPC ............ *H04B 7/0478* (2013.01); *H04B 7/0417* (2013.01); *H04B 7/0456* (2013.01); *H04B 7/0639* (2013.01); *H04L 25/03006* (2013.01)

(58) Field of Classification Search
  CPC ...... H04B 17/24; H04B 7/061; H04B 7/0647; H04B 7/0413; H04B 7/0478; H04B 7/0619; H04B 1/7097; H04B 1/707; H04B 7/02; H04L 1/06; H04L 1/02; H04L 1/04
  USPC ................................................. 375/267, 299
  See application file for complete search history.

(56) References Cited

U.S. PATENT DOCUMENTS 9,054,415 B2 * 6/2015 Goransson ............. H01Q 3/267
2012/0219042 A1 8/2012 Onggosanusi et al.
(Continued)

FOREIGN PATENT DOCUMENTS

CN 101958773 A 1/2011
CN 102437986 A 5/2012
(Continued)

OTHER PUBLICATIONS

"$3^{rd}$ Generation Partnership Project; Technical Specification Group Radio Access Network; Evolved Universal Terrestrial Radio Access (E-UTRA); Physical layer procedures (Release 11)," 3GPP TS 36.213, V11.2.0, pp. 1-173, $3^{rd}$ Generation Partnership Project, Valbonne, France (Feb. 2013).

(Continued)

Primary Examiner — Emmanuel Bayard
(74) Attorney, Agent, or Firm — Leydig, Voit & Mayer, Ltd

(57) ABSTRACT

The present invention provides a precoding matrix indicator feedback method, a receive end, and a transmit end. The method includes: selecting, by a receive end based on a reference signal, a precoding matrix W from a codebook, where a coefficient α is used to perform phase adjustment on $\phi_n$ in W, $\phi_n$ represents a phase difference between weighted values of a first antenna group and a second antenna group of a transmit end for a transmission signal from a same transmission layer, $$\varphi_n \in \left\{ e^{\frac{j2\pi n}{Q}} \right\},$$

and the first antenna group and the second antenna group belong to a same multi-antenna system; and sending, by the receive end, a precoding matrix indicator (PMI) to the transmit end. In this way, using the coefficient α to perform the phase adjustment on $\phi_n$ can increase a size of a codebook set applicable to different antenna configurations, and improve precision of the receive end to feed back a PMI.

10 Claims, 11 Drawing Sheets

---

A receive end selects a precoding matrix W from a codebook based on a reference signal, where a coefficient $\alpha$ is used to perform phase adjustment on $\varphi_n$ in the W, the $\varphi_n$ represents a phase difference between weighted values of a first antenna group of a transmit end and a second antenna group of the transmit end for a transmission signal from a same transmission layer, the $\varphi_n = e^{\frac{j2\pi n}{Q}}$, the Q is a positive integer, the n is a non-negative integer, and the first antenna group and the second antenna group belong to a same multi-antenna system — 101

The receive end sends a precoding matrix indicator PMI to the transmit end, so that the transmit end determines the precoding matrix W according to the PMI — 102

(51) Int. Cl.
*H04B 7/06* (2006.01)
*H04L 25/03* (2006.01)

(56) References Cited

U.S. PATENT DOCUMENTS

| | | | |
|---|---|---|---|
| 2012/0269290 A1 | 10/2012 | Onggosanusi et al. | |
| 2013/0308590 A1* | 11/2013 | Ihm | H04B 7/0632 370/329 |
| 2014/0003395 A1* | 1/2014 | Hsu | H04B 7/0478 370/335 |
| 2014/0133336 A1* | 5/2014 | Park | H04W 24/10 370/252 |
| 2015/0023194 A1* | 1/2015 | Seo | H04W 24/10 370/252 |

FOREIGN PATENT DOCUMENTS

| | | |
|---|---|---|
| CN | 102594502 A | 7/2012 |
| WO | 2011082655 A1 | 7/2011 |
| WO | 2012093742 A1 | 7/2012 |

OTHER PUBLICATIONS

"Further Downlink MIMO Enhancement for LTE-Advanced—Core Part," 3GPP™ Work Item Description (Published no later than Jan. 13, 2016).

"Further Downlink MIMO Enhancement for LTE-Advanced-Feature," 3GPP™ Work Item Description (Published no later than Jan. 13, 2016).

"Further Downlink MIMO Enhancement for LTE-Advanced-Performance Part," 3GPP™ Work Item Description (Published no later than Jan. 13, 2016).

"Discussion of two-stage feedback proposals," 3GPP TSG RAN WG1 Meeting #61 bis, Dresden, Germany, R1-104088, $3^{rd}$ Generation Partnership Project, Valbonne, France (Jun. 28-Jul. 2, 2010).

* cited by examiner

1200

1400

A receive end selects, from a codebook, a precoding matrix W corresponding to a rank indicator, where the rank indicator is 2, the precoding matrix W is represented by $W_1 \cdot W_2$, the $W_1 = \begin{bmatrix} X_L & 0 \\ 0 & X_L \end{bmatrix}$, the $X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix}$, the 0 is a matrix of zeros having 2 rows and 4 columns, the L is a non-negative integer, a coefficient $\alpha$ is used to perform phase adjustment on $\varphi_n$ in the $W_2$, the $\varphi_n$ represents a phase difference between weighted values of a first antenna group and a second antenna group of a transmit end for a transmission signal from a same transmission layer, the $\varphi_n \in \{e^{j\frac{2\pi n}{Q}}\}$, the n is a non-negative integer, the Q is a positive integer, and the first antenna group and the second antenna group belong to a same multi-antenna system ⟿ 1501

The receive end sends a precoding matrix indicator PMI to the transmit end, so that the transmit end determines the precoding matrix W according to the PMI ⟿ 1502

FIG. 15

1701 — A receive end selects, from a codebook, a precoding matrix $W^{(2)}_{m,m',k}$ corresponding to a rank indicator, where the rank indicator is 2, the $W^{(2)}_{m,m',k} = \frac{1}{\sqrt{8}}\begin{bmatrix} v_m & v_{m'} \\ \alpha\varphi_k v_{m'} & -\alpha\varphi_k v_m \end{bmatrix}$ or the $W^{(2)}_{m,m',k} = \frac{1}{\sqrt{8}}\begin{bmatrix} v_m & v_{m'} \\ \alpha\varphi_k v_m & -\alpha\varphi_k v_{m'} \end{bmatrix}$ or the $W^{(2)}_{m,m',k} = \frac{1}{\sqrt{8}}\begin{bmatrix} v_m & v_{m'} \\ \alpha\varphi_k v_m & \alpha\varphi_k v_{m'} \end{bmatrix}$, the $v_m = \begin{bmatrix} 1 \\ e^{j2\pi m/32} \end{bmatrix}$, the $v_{m'} = \begin{bmatrix} 1 \\ e^{j2\pi m'/32} \end{bmatrix}$, the m=$i_1$+8*$Z_1$, the m'=$i_1$+8*$Z_2$, the $i_1$ is a non-negative integer, the $Z_1$ and the $Z_2$ are non-negative integers, the $\varphi_k$ represents a phase difference between weighted values of a first antenna group and a second antenna group of a transmit end for a transmission signal from a same transmission layer and $\varphi_k = e^{j\pi k/2}$, the k is a non-negative integer and is determined by $i_2$, the $i_2$ is a non-negative integer, the first antenna group and the second antenna group belong to a same multi-antenna system, the coefficient $\alpha$ is used to perform phase adjustment, and the coefficient $\alpha$ has a functional relationship with at least one of the $i_1$, the $i_2$, the m, the m', and the k 1702 — The receive end sends a precoding matrix indicator PMI to the transmit end, so that the transmit end determines the precoding matrix W according to the PMI

FIG. 17

PRECODING MATRIX INDICATOR FEEDBACK METHOD, RECEIVE END, AND TRANSMIT END

CROSS-REFERENCE

This application is a continuation of International Patent Application No. PCT/CN2013/076776, filed on Jun. 5, 2013, which claims priority to International Patent Application No. PCT/CN2013/074992, filed on Apr. 28, 2013, both of which are hereby incorporated by reference in their entireties.

TECHNICAL FIELD

Embodiments of the present invention relate to the field of wireless communications, and in particular, to a precoding matrix indicator feedback method, a receive end, and a transmit end.

BACKGROUND

A multiple input multiple output (Multiple Input Multiple Output, MIMO) wireless communications system can obtain diversity and array gains by using a transmitted precoding technology and a receive combining technology. A system using precoding may be represented by:

$$y = H\hat{V}s + n$$

where y is a received signal vector, H is a channel matrix, V is a precoding matrix, s is a transmitted symbol vector, and n is measured noise.

Optimal precoding usually requires channel state information (Channel State Information, CSI) to be fully known to a transmitter. In a common method, a user equipment (User Equipment, UE) quantifies transient CSI and reports quantified transient CSI to a base station, where the user equipment includes a mobile station (Mobile Station, MS), a relay (Relay), a mobile telephone (Mobile Telephone), a handset (handset), a portable device (portable equipment), and the like, and the base station includes a NodeB (NodeB) base station (Base Station, BS), an access point (Access Point), a transmission point (Transmission Point, TP), an evolved NodeB (Evolved NodeB, eNB), a relay (Relay), and the like. CSI information reported by an existing Long Term Evolution (Long Term Evolution, LTE) system includes information about a rank indicator (Rank Indicator, RI), a precoding matrix indicator (Precoding Matrix Indicator, PMI), a channel quality indicator (Channel Quality Indicator, CQI), and the like, in which the RI and the PMI indicate the number of transport layers and a precoding matrix that are used, respectively. A set of used precoding matrices is usually referred to as a codebook, in which each precoding matrix is a codeword in the codebook.

A codebook used in the existing LTE system is mainly designed for a single user multiple input multiple output (Single User Multiple Input Multiple Output, SU-MIMO) technology. When an existing codebook design is applied to a technology such as multi-user multiple input multiple output (Multi-User Multiple Input Multiple Output, MU-MIMO) or coordinated multi-point (Coordinative Multiple Point, CoMP), limitations of a capacity of a feedback channel and a size of a codebook set lower feedback precision, resulting in performance loss and a system throughput decrease.

SUMMARY

Embodiments of the present invention provide a precoding matrix indicator feedback method, a receive end, and a transmit end, which can increase a size of a codebook set and improve feedback precision.

A first aspect provides a precoding matrix indicator feedback method. The method includes: selecting, by a receive end based on a reference signal, a precoding matrix W from a codebook, where a coefficient $\alpha$ is used to perform phase adjustment on $\varphi_n$ in the W, the $\varphi_n$ represents a phase difference between weighted values of a first antenna group and a second antenna group of a transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system; and sending, by the receive end, a precoding matrix indicator PMI to the transmit end, so that the transmit end determines the W according to the PMI.

With reference to the first aspect, in an implementation manner of the first aspect, the receive end determines a rank indicator based on the reference signal, where the rank indicator corresponds to the number of useful transmission layers; and the selecting, by a receive end based on a reference signal, a precoding matrix W from a codebook includes: selecting, by the receive end based on the reference signal, the W corresponding to the rank indicator from the codebook.

With reference to the first aspect or any implementation manner of the foregoing implementation manners, in another implementation manner of the first aspect, when the rank indicator is 1, the precoding matrix is:

$$W = W_1 \cdot W_2 = \begin{bmatrix} X_L & 0 \\ 0 & X_L \end{bmatrix} \cdot \begin{bmatrix} Y_1 \\ \alpha \varphi_n Y_2 \end{bmatrix} = \begin{bmatrix} X_L & 0 \\ 0 & X_L \end{bmatrix} \cdot \begin{bmatrix} e_{m1} \\ \alpha \varphi_n e_{m2} \end{bmatrix};$$

where the $$X_L = \begin{bmatrix} 1 & 1 & \cdots & 1 \\ e^{j2\pi \frac{L}{M}} & e^{j2\pi \frac{L+1}{M}} & & e^{j2\pi \frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent a P×1-dimensional column vector, where in the $e_{m2}$ an $m2^{th}$ element is 1 and other elements are all 0; and the m1 and the m2 are both positive integers.

With reference to the first aspect or any implementation manner of the foregoing implementation manners, in another implementation manner of the first aspect, when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_1 \\ \alpha \varphi_n Y_2 & -\alpha \varphi_n Y_2 \end{bmatrix} =$$

$$\begin{bmatrix} X_L & 0 \\ 0 & X_L \end{bmatrix} \cdot \begin{bmatrix} e_{m1} & e_{m1} \\ \alpha \varphi_n e_{m2} & -\alpha \varphi_n e_{m2} \end{bmatrix};$$

or when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_1 & -\alpha\varphi_n Y_2 \end{bmatrix} =$$

$$\begin{bmatrix} X_L & 0 \\ 0 & X_L \end{bmatrix} \cdot \begin{bmatrix} e_{m1} & e_{m2} \\ \alpha\varphi_n e_{m1} & -\alpha\varphi_n e_{m2} \end{bmatrix};$$

or when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_2 & -\alpha\varphi_n Y_1 \end{bmatrix} =$$

$$\begin{bmatrix} X_L & 0 \\ 0 & X_L \end{bmatrix} \cdot \begin{bmatrix} e_{m1} & e_{m2} \\ \alpha\varphi_n e_{m2} & -\alpha\varphi_n e_{m1} \end{bmatrix};$$

where the $$X_L = \begin{bmatrix} 1 & 1 & \cdots & 1 \\ e^{j2\pi\frac{L}{M}} & e^{j2\pi\frac{L+1}{M}} & & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an m1$^{th}$ element is 1 and other elements are all 0; the $Y_2$ and $e_{m2}$ represent a P×1-dimensional column vector, where in the $e_{m2}$ an m2$^{th}$ element is 1 and other elements are all 0; and the m1 and the m2 are both positive integers.

With reference to the first aspect or any implementation manner of the foregoing implementation manners, in another implementation manner of the first aspect, the coefficient $\alpha = e^{j2\pi \cdot f(m1)}$, where the $f(m_1)$ represents a function of the $m_1$; or the coefficient $\alpha = e^{j2\pi \cdot f(m2)}$, where the $f(m_2)$ represents a function of the $m_2$.

With reference to the first aspect or any implementation manner of the foregoing implementation manners, in another implementation manner of the first aspect, the coefficient $$\alpha = e^{j2\pi \lfloor \frac{(m1-1)/k}{A} \rfloor}$$

or the coefficient $$\alpha = e^{j2\pi \lfloor \frac{(m2-1)/k}{A} \rfloor},$$

where the A is a positive integer, the k=P/2, and $\lfloor \ \rfloor$ is a rounding down operator.

With reference to the first aspect or any implementation manner of the foregoing implementation manners, in another implementation manner of the first aspect, the coefficient $$\alpha = e^{j2\pi \frac{(m1-1)mod2}{A}}$$

or the coefficient $$\alpha = e^{j2\pi \frac{(m2-1)mod2}{A}},$$

where the A is a positive integer, the k=P/2, and mod is a modulo operator.

With reference to the first aspect or any implementation manner of the foregoing implementation manners, in another implementation manner of the first aspect, the $W_1$ is a matrix representing a channel characteristic of a wideband, and the $W_2$ is a matrix representing a channel characteristic of a subband.

With reference to the first aspect or any implementation manner of the foregoing implementation manners, in another implementation manner of the first aspect, the precoding matrix indicator PMI includes a first precoding matrix indicator $PMI_1$ and a second precoding matrix indicator $PMI_2$, the $PMI_1$ is used for indicating the $W_1$, and the $PMI_2$ is used for indicating the $W_2$.

With reference to the first aspect or any implementation manner of the foregoing implementation manners, in another implementation manner of the first aspect, after the selecting, by a receive end based on a reference signal, a precoding matrix W from a codebook, the method further includes: performing, by the receive end according to an antenna serial number, row permutation or column permutation on the W.

With reference to the first aspect or any implementation manner of the foregoing implementation manners, in another implementation manner of the first aspect, before the selecting, by a receive end based on a reference signal, a precoding matrix W from a codebook, the method further includes: receiving, by the receive end, the reference signal sent by the transmit end, where the reference signal includes at least one of the following: a channel state information reference signal CSI RS, a demodulation reference signal DM RS, and a cell-specific reference signal CRS.

A second aspect provides a precoding matrix indicator feedback method. The method includes: receiving, by a transmit end, a precoding matrix indicator PMI sent by a receive end; and determining, by the transmit end according to the precoding matrix indicator PMI, a precoding matrix W selected from a codebook by the receive end based on a reference signal, where a coefficient $\alpha$ is used to perform phase adjustment on $\phi_n$ in the W, the $\phi_n$ represents a phase difference between weighted values of a first antenna group and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system.

With reference to the second aspect or any implementation manner of the foregoing implementation manners, in another implementation manner of the second aspect, the W corresponds to a rank indicator, and the rank indicator corresponds to the number of useful transmission layers.

With reference to the second aspect or any implementation manner of the foregoing implementation manners, in another implementation manner of the second aspect, when the rank indicator is 1, the precoding matrix is:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix};$$

where the $$X_L = \begin{bmatrix} 1 & 1 & & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent a P×1-dimensional column vector, where in the $e_{m2}$ an $m2^{th}$ element is 1 and other elements are all 0; and the m1 and the m2 are both positive integers.

With reference to the second aspect or any implementation manner of the foregoing implementation manners, in another implementation manner of the second aspect, when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_1 \\ \alpha\varphi_n Y_2 & -\alpha\varphi_n Y_2 \end{bmatrix} = \begin{bmatrix} X_L & 0 \\ 0 & X_L \end{bmatrix} \cdot \begin{bmatrix} e_{m1} & e_{m1} \\ \alpha\varphi_n e_{m2} & -\alpha\varphi_n e_{m2} \end{bmatrix};$$

or
when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_1 & -\alpha\varphi_n Y_2 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m1} & -\alpha\varphi_n e_{m2} \end{bmatrix};$$

or
when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_2 & -\alpha\varphi_n Y_1 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m2} & -\alpha\varphi_n e_{m1} \end{bmatrix};$$

where the $$X_L = \begin{bmatrix} 1 & 1 & & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent a P×1-dimensional column vector, where in the $e_{m2}$ an $m2^{th}$ element is 1 and other elements are all 0; and the m1 and the m2 are both positive integers.

With reference to the second aspect or any implementation manner of the foregoing implementation manners, in another implementation manner of the second aspect, the coefficient $\alpha = e^{j2\pi \cdot f(m1)}$, where the $f(m_1)$ represents a function of the $m_1$; or the coefficient $\alpha = e^{j2\pi \cdot f(m2)}$, where the $f(m_2)$ represents a function of the $m_2$.

With reference to the second aspect or any implementation manner of the foregoing implementation manners, in another implementation manner of the second aspect, the coefficient $$\alpha = e^{j2\pi \frac{\lfloor (m1-1)/k \rfloor}{A}}$$

or the coefficient $$\alpha = e^{j2\pi \frac{\lfloor (m2-1)/k \rfloor}{A}},$$

where the A is a positive integer, the k=P/2, and $\lfloor \ \rfloor$ is a rounding down operator.

With reference to the second aspect or any implementation manner of the foregoing implementation manners, in another implementation manner of the second aspect, the coefficient $$\alpha = e^{j2\pi \frac{(m1-1)mod2}{A}}$$

or the coefficient $$\alpha = e^{j2\pi \frac{(m2-1)mod2}{A}},$$

where the A is a positive integer, the k=P/2, and mod is a modulo operator.

With reference to the second aspect or any implementation manner of the foregoing implementation manners, in another implementation manner of the second aspect, the $W_1$ is a matrix representing a channel characteristic of a wideband, and the $W_2$ is a matrix representing a channel characteristic of a subband.

With reference to the second aspect or any implementation manner of the foregoing implementation manners, in another implementation manner of the second aspect, the precoding matrix indicator PMI includes a first precoding matrix indicator $PMI_1$ and a second precoding matrix indicator $PMI_2$; and the determining, by the transmit end according to the precoding matrix indicator PMI, a precoding matrix W selected from a codebook by the receive end based on a reference signal includes: determining, by the transmit end according to the $PMI_1$, the $W_1$ selected from the codebook by the receive end based on the reference signal, and determining, according to the $PMI_2$, the $W_2$ selected from the codebook by the receive end; and determining, by the transmit end, the W according to the $W_1$ and the $W_2$.

With reference to the second aspect or any implementation manner of the foregoing implementation manners, in another implementation manner of the second aspect, after the determining, by the transmit end according to the precoding matrix indicator PMI, a precoding matrix W selected from a codebook by the receive end based on a reference signal, the method further includes: performing, by the transmit end according to an antenna serial number, row permutation or column permutation on the W.

With reference to the second aspect or any implementation manner of the foregoing implementation manners, in another implementation manner of the second aspect, before the receiving, by a transmit end, a precoding matrix indicator PMI sent by a receive end, the method further includes: sending, by the transmit end, the reference signal to the receive end, where the reference signal includes at least one of the following: a channel state information reference signal CSI RS, a demodulation reference signal DM RS, and a cell-specific reference signal CRS.

A third aspect provides a method for feeding back channel state information. The method includes: determining, by a user equipment based on a reference signal, channel state information corresponding to each subband in a system bandwidth, and sending, by the user equipment to a base station, the channel state information corresponding to each subband in the system bandwidth, where the number of resource blocks RBs included in each subband in the system bandwidth is the same as the number of resource blocks RBs included in a corresponding resource block set.

With reference to the third aspect, in another implementation manner of the third aspect, the resource block set is a resource block group RBG or the resource block set is a precoding resource group PRG.

With reference to the third aspect or any implementation manner of the foregoing implementation manners, in another implementation manner of the third aspect, the resource block set is the precoding resource group PRG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 2 RBs.

With reference to the third aspect or any implementation manner of the foregoing implementation manners, in another implementation manner of the third aspect, the resource block set is the resource block group RBG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 4 RBs.

With reference to the third aspect or any implementation manner of the foregoing implementation manners, in another implementation manner of the third aspect, the RB included in each subband in the system bandwidth is the same as the RB included in the corresponding resource block set.

With reference to the third aspect or any implementation manner of the foregoing implementation manners, in another implementation manner of the third aspect, the sending, by the user equipment to a base station, the channel state information corresponding to each subband in the system bandwidth includes: sending, by the user equipment to the base station through a physical uplink shared channel PUSCH, the channel state information corresponding to each subband in the system bandwidth.

With reference to the third aspect or any implementation manner of the foregoing implementation manners, in another implementation manner of the third aspect, the channel state information includes at least one of the following: a precoding matrix indicator PMI and a channel quality indicator CQI.

A fourth aspect provides a method for receiving channel state information. The method includes: receiving, by a base station, channel state information corresponding to each subband in a system bandwidth sent by a user equipment, where the channel state information corresponding to each subband in the system bandwidth is determined by the user equipment based on a reference signal, and transmitting, by the base station, data according to the channel state information corresponding to each subband in the system bandwidth, where the number of resource blocks RBs included in each subband in the system bandwidth is the same as the number of resource blocks RBs included in a corresponding resource block set.

With reference to the fourth aspect, in another implementation manner of the fourth aspect, the resource block set is a resource block group RBG or the resource block set is a precoding resource group PRG.

With reference to the fourth aspect or any implementation manner of the foregoing implementation manners, in another implementation manner of the fourth aspect, the resource block set is the precoding resource group PRG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 2 RBs.

With reference to the fourth aspect or any implementation manner of the foregoing implementation manners, in another implementation manner of the fourth aspect, the resource block set is the resource block group RBG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 4 RBs.

With reference to the fourth aspect or any implementation manner of the foregoing implementation manners, in another implementation manner of the fourth aspect, the RB included in each subband in the system bandwidth is the same as the RB included in the corresponding resource block set.

With reference to the fourth aspect or any implementation manner of the foregoing implementation manners, in another implementation manner of the fourth aspect, the receiving, by a base station, channel state information corresponding to each subband in a system bandwidth sent by a user equipment includes: receiving, by the base station through a physical uplink shared channel PUSCH, the channel state information corresponding to each subband in the system bandwidth sent by the user equipment.

With reference to the fourth aspect or any implementation manner of the foregoing implementation manners, in another implementation manner of the fourth aspect, the channel state information includes at least one of the following: a precoding matrix indicator PMI and a channel quality indicator CQI.

With reference to the fourth aspect or any implementation manner of the foregoing implementation manners, in another implementation manner of the fourth aspect, the channel state information includes the precoding matrix indicator PMI and the channel quality indicator CQI, and the transmitting, by the base station, data according to the channel state information corresponding to each subband in the system bandwidth includes: determining, by the base station according to the CQI corresponding to each subband in the system bandwidth, a resource block set used for sending the data; and precoding the data according to the PMI corresponding to the subband corresponding to the determined resource block set, and transmitting the data in an RB of the determined resource block set.

With reference to the fourth aspect or any implementation manner of the foregoing implementation manners, in another implementation manner of the fourth aspect, the channel state information includes the precoding matrix indicator PMI, and the transmitting, by the base station, data according to the channel state information corresponding to each subband in the system bandwidth includes:

precoding the data according to the PMI corresponding to the subband corresponding to the resource block set, and transmitting the data in an RB of the resource block set.

With reference to the fourth aspect or any implementation manner of the foregoing implementation manners, in another implementation manner of the fourth aspect, the channel state information includes the channel quality indicator CQI, and the transmitting, by the base station, data according to the channel state information corresponding to each subband in the system bandwidth includes: determining, by the base station according to the CQI corresponding to each subband in the system bandwidth, a resource block set used for sending the data and transmitting the data in an RB of the resource block set.

A fifth aspect provides a receive end. The receive end includes: a selecting unit, configured to select a precoding matrix W from a codebook based on a reference signal, where a coefficient α is used to perform phase adjustment on $\phi_n$ in the W, the $\phi_n$ represents a phase difference between weighted values of a first antenna group and a second antenna group of a transmit end for a transmission signal from a same transmission layer, the $$\varphi_n \in \{e^{\frac{j2\pi n}{Q}}\},$$

the n is a non-negative integer, the Q is a positive integer, and the first antenna group and the second antenna group belong to a same multi-antenna system; and a sending unit, configured to send a precoding matrix indicator PMI to the transmit end, so that the transmit end determines, according to the PMI, the W selected by the selecting unit.

With reference to the fifth aspect, in another implementation manner of the fifth aspect, the receive end further includes a determining unit. The determining unit is configured to determine a rank indicator based on the reference signal, where the rank indicator corresponds to the number of useful transmission layers. The selecting unit is specifically configured to: select, based on the reference signal, the precoding matrix W corresponding to the rank indicator determined by the determining unit from the codebook.

With reference to the fifth aspect, in another implementation manner of the fifth aspect, when the rank indicator determined by the determining unit is 1, the precoding matrix selected by the selecting unit is:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix};$$

where the $$X_L = \begin{bmatrix} 1 & 1 & \cdots & 1 \\ e^{j2\pi \frac{L}{M}} & e^{j2\pi \frac{L+1}{M}} & \cdots & e^{j2\pi \frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an m1$^{th}$ element is 1 and other elements are all 0; the $Y_2$ and $e_{m2}$ represent a P×1-dimensional column vector, where in the $e_{m2}$ an m2$^{th}$ element is 1 and other elements are all 0; the m1 and the m2 are both positive integers; and the $e_{m1}$ and the $e_{m2}$ are the same or different.

With reference to the fifth aspect, in another implementation manner of the fifth aspect, when the rank indicator determined by the determining unit is 1, the precoding matrix selected by the selecting unit is:

$$W = W_1 \cdot W_2 = \begin{bmatrix} X_L & 0 \\ 0 & X_L \end{bmatrix} \cdot \begin{bmatrix} Y_1 & Y_1 \\ \alpha\varphi_n Y_2 & -\alpha\varphi_n Y_2 \end{bmatrix} = \begin{bmatrix} X_L & 0 \\ 0 & X_L \end{bmatrix} \cdot \begin{bmatrix} e_{m1} & e_{m1} \\ \alpha\varphi_n e_{m2} & -\alpha\varphi_n e_{m2} \end{bmatrix};$$

or $$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_1 & -\alpha\varphi_n Y_2 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m1} & -\alpha\varphi_n e_{m2} \end{bmatrix};$$

or $$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_2 & -\alpha\varphi_n Y_1 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m2} & -\alpha\varphi_n e_{m1} \end{bmatrix};$$

where the $$X_L = \begin{bmatrix} 1 & 1 & \cdots & 1 \\ e^{j2\pi \frac{L}{M}} & e^{j2\pi \frac{L+1}{M}} & \cdots & e^{j2\pi \frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an m1$^{th}$ element is 1 and other elements are all 0; the $Y_2$ and $e_{m2}$ represent a P×1-dimensional column vector, where in the $e_{m2}$ an m2$^{th}$ element is 1 and other elements are all 0; the m1 and the m2 are both positive integers; and the $e_{m1}$ and the $e_{m2}$ are the same or different.

With reference to the fifth aspect, in another implementation manner of the fifth aspect, the coefficient $\alpha = e^{j2\pi \cdot f(m1)}$, where the $f(m_1)$ represents a function of the $m_1$; or the coefficient $\alpha = e^{j2\pi \cdot f(m2)}$, where the $f(m_2)$ represents a function of the $m_2$.

With reference to the fifth aspect, in another implementation manner of the fifth aspect, the coefficient $$\alpha = e^{j2\pi \frac{\lfloor (m1-1)/k \rfloor}{A}}$$

or the coefficient $$\alpha = e^{j2\pi \frac{\lfloor(m2-1)/k\rfloor}{A}},$$

where the A is a positive integer, the k=P/2, and $\lfloor\ \rfloor$ is a rounding down operator.

With reference to the fifth aspect, in another implementation manner of the fifth aspect, the coefficient $$\alpha = e^{j2\pi \frac{(m1-1)mod2}{A}}$$

or the coefficient $$\alpha = e^{j2\pi \frac{(m2-1)mod2}{A}},$$

where the A is a positive integer, and mod is a modulo operator.

With reference to the fifth aspect or any implementation manner of the foregoing implementation manners, in another implementation manner of the fifth aspect, the $W_1$ is a matrix representing a channel characteristic of a wideband, and the $W_2$ is a matrix representing a channel characteristic of a subband.

With reference to the fifth aspect or any implementation manner of the foregoing implementation manners, in another implementation manner of the fifth aspect, the precoding matrix indicator PMI sent by the sending unit includes a first precoding matrix indicator $PMI_1$ and a second precoding matrix indicator $PMI_2$, the $PMI_1$ is used for indicating the $W_1$, and the $PMI_2$ is used for indicating the $W_2$.

With reference to the fifth aspect or any implementation manner of the foregoing implementation manners, in another implementation manner of the fifth aspect, the selecting unit is further configured to perform row permutation or column permutation on the W according to an antenna serial number.

A sixth aspect provides a transmit end. The transmit end includes: a receiving unit, configured to receive a precoding matrix indicator PMI sent by a receive end; and a determining unit, configured to determine, according to the precoding matrix indicator PMI received by the receiving unit, a precoding matrix W selected from a codebook by the receive end based on a reference signal, where a coefficient α is used to perform phase adjustment on $\phi_n$ in the W, the $\phi_n$ represents a phase difference between weighted values of a first antenna group and a second antenna group of the transmit end for a transmission signal from a same transmission layer, the $$\varphi_n \in \{e^{j\frac{2\pi n}{Q}}\},$$

the n is a non-negative integer, the Q is a positive integer, and the first antenna group and the second antenna group belong to a same multi-antenna system.

With reference to the sixth aspect, in another implementation manner of the sixth aspect, the W corresponds to a rank indicator, and the rank indicator corresponds to the number of useful transmission layers.

With reference to the sixth aspect or any implementation manner of the foregoing implementation manners, in another implementation manner of the sixth aspect, when the rank indicator is 1, the precoding matrix is:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix};$$

where the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent a P×1-dimensional column vector, where in the $e_{m2}$ an $m2^{th}$ element is 1 and other elements are all 0; the m1 and the m2 are both positive integers; and the $e_{m1}$ and the $e_{m2}$ are the same or different.

With reference to the sixth aspect or any implementation manner of the foregoing implementation manners, in another implementation manner of the sixth aspect, when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_1 \\ \alpha\varphi_n Y_2 & -\alpha\varphi_n Y_2 \end{bmatrix} =$$

$$\begin{bmatrix} X_L & 0 \\ 0 & X_L \end{bmatrix} \cdot \begin{bmatrix} e_{m1} & e_{m1} \\ \alpha\varphi_n e_{m2} & -\alpha\varphi_n e_{m2} \end{bmatrix};$$

or
when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_1 & -\alpha\varphi_n Y_2 \end{bmatrix} =$$

$$\begin{bmatrix} X_L & 0 \\ 0 & X_L \end{bmatrix} \cdot \begin{bmatrix} e_{m1} & e_{m2} \\ \alpha\varphi_n e_{m1} & -\alpha\varphi_n e_{m2} \end{bmatrix};$$

or
when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_2 & -\alpha\varphi_n Y_1 \end{bmatrix} =$$

$$\begin{bmatrix} X_L & 0 \\ 0 & X_L \end{bmatrix} \cdot \begin{bmatrix} e_{m1} & e_{m2} \\ \alpha\varphi_n e_{m2} & -\alpha\varphi_n e_{m1} \end{bmatrix};$$

where the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent a P×1-dimensional column vector, where in the $e_{m2}$ an $m2^{th}$ element is 1 and other elements are all 0; the m1 and the m2 are both positive integers; and the $e_{m1}$ and the $e_{m2}$ are the same or different.

With reference to the sixth aspect, in another implementation manner of the sixth aspect, the coefficient $\alpha=e^{j2\pi \cdot f(m1)}$, where the $f(m_1)$ represents a function of the $m_1$; or the coefficient $\alpha=e^{j2\pi \cdot f(m2)}$, where the $f(m_2)$ represents a function of the $m_2$.

With reference to the sixth aspect, in another implementation manner of the sixth aspect, the coefficient $$\alpha = e^{j2\pi \frac{\lfloor (m1-1)/k \rfloor}{A}}$$

or the coefficient $$\alpha = e^{j2\pi \frac{\lfloor (m2-1)/k \rfloor}{A}},$$

where the A is a positive integer, the k=P/2, and $\lfloor \ \rfloor$ is a rounding down operator.

With reference to the sixth aspect, in another implementation manner of the sixth aspect, the coefficient $$\alpha = e^{j2\pi \frac{(m1-1) \bmod 2}{A}}$$

or the coefficient $$\alpha = e^{j2\pi \frac{(m2-1) \bmod 2}{A}},$$

where the A is a positive integer, and mod is a modulo operator.

With reference to the sixth aspect, in another implementation manner of the sixth aspect, the precoding matrix indicator PMI received by the receiving unit includes a first precoding matrix indicator $PMI_1$ and a second precoding matrix indicator $PMI_2$; and the determining unit is specifically configured to: determine, according to the $PMI_1$, the $W_1$ selected from the codebook by the receive end based on the reference signal, determine, according to the $PMI_2$, the $W_2$ selected from the codebook by the receive end, and determine the W according to the $W_1$ and the $W_2$.

With reference to the sixth aspect, in another implementation manner of the sixth aspect, the determining unit is further configured to perform row permutation or column permutation on the W according to an antenna serial number.

A seventh aspect provides a user equipment. The user equipment includes a determining unit, configured to determine, based on a reference signal, channel state information corresponding to each subband in a system bandwidth, and a sending unit, configured to send, to a base station, the channel state information corresponding to each subband in the system bandwidth determined by the determining unit, where the number of resource blocks RBs included in each subband in the system bandwidth is the same as the number of resource blocks RBs included in a corresponding resource block set.

With reference to the seventh aspect, in another implementation manner of the seventh aspect, the resource block set is a resource block group RBG or the resource block set is a precoding resource group PRG.

With reference to the seventh aspect or any implementation manner of the foregoing implementation manners, in another implementation manner of the seventh aspect, the resource block set is the precoding resource group PRG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 2 RBs.

With reference to the seventh aspect or any implementation manner of the foregoing implementation manners, in another implementation manner of the seventh aspect, the resource block set is the resource block group RBG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 4 RBs.

With reference to the seventh aspect or any implementation manner of the foregoing implementation manners, in another implementation manner of the seventh aspect, the RB included in each subband in the system bandwidth is the same as the RB included in the corresponding resource block set.

With reference to the seventh aspect or any implementation manner of the foregoing implementation manners, in another implementation manner of the seventh aspect, that the user equipment sends the channel state information corresponding to each subband in the system bandwidth to the base station includes that the user equipment sends, to the base station through a physical uplink shared channel PUSCH, the channel state information corresponding to each subband in the system bandwidth.

With reference to the seventh aspect or any implementation manner of the foregoing implementation manners, in another implementation manner of the seventh aspect, the channel state information includes at least one of the following: a precoding matrix indicator PMI and a channel quality indicator CQI.

An eighth aspect provides a base station. The base station includes: a receiving unit, configured to receive channel state information corresponding to each subband in a system bandwidth sent by a user equipment, where the channel state information corresponding to each subband in the system bandwidth is determined by the user equipment based on a reference signal; and a sending unit, configured to transmit data according to the channel state information corresponding to each subband in the system bandwidth received by the receiving unit; where the number of resource blocks RBs included in each subband in the system bandwidth is the same as the number of resource blocks RBs included in a corresponding resource block set.

With reference to the eighth aspect, in another implementation manner of the eighth aspect, the resource block set is a resource block group RBG or the resource block group is a precoding resource group PRG.

With reference to the eighth aspect or any implementation manner of the foregoing implementation manners, in another implementation manner of the eighth aspect, the resource block set is the precoding resource group PRG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 2 RBs.

With reference to the eighth aspect or any implementation manner of the foregoing implementation manners, in another implementation manner of the eighth aspect, the resource block set is the resource block group RBG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 4 RBs.

With reference to the eighth aspect or any implementation manner of the foregoing implementation manners, in another implementation manner of the eighth aspect, the RB included in each subband in the system bandwidth is the same as the RB included in the corresponding resource block set.

With reference to the eighth aspect or any implementation manner of the foregoing implementation manners, in another implementation manner of the eighth aspect, that the base station receives the channel state information corresponding to each subband in the system bandwidth sent by the user equipment includes that the base station receives, through a physical uplink shared channel PUSCH, the channel state information corresponding to each subband in the system bandwidth sent by the user equipment.

With reference to the eighth aspect or any implementation manner of the foregoing implementation manners, in another implementation manner of the eighth aspect, the channel state information includes at least one of the following: a precoding matrix indicator PMI and a channel quality indicator CQI.

With reference to the eighth aspect or any implementation manner of the foregoing implementation manners, in another implementation manner of the eighth aspect, the channel state information includes the precoding matrix indicator PMI and the channel quality indicator CQI, and the base station further includes a determining unit, where the determining unit is configured to determine, according to the CQI, corresponding to each subband in the system bandwidth, received by the receiving unit, a resource block set used for sending the data; and the sending unit is configured to precode the data according to the PMI corresponding to the subband corresponding to the resource block set determined by the determining unit, and transmit the data in an RB of the determined resource block set.

With reference to the eighth aspect or any implementation manner of the foregoing implementation manners, in another implementation manner of the eighth aspect, the channel state information includes the precoding matrix indicator PMI, and the sending unit is further configured to precode the data according to the PMI corresponding to the subband corresponding to the resource block set, and transmit the data in an RB of the resource block set.

With reference to the eighth aspect or any implementation manner of the foregoing implementation manners, in another implementation manner of the eighth aspect, the channel state information includes the channel quality indicator CQI, and the sending unit is further configured to determine, according to the CQI corresponding to each subband in the system bandwidth, a resource block set used for sending the data, and transmit the data in an RB of the resource block set.

A ninth aspect provides a receive end. The receive end includes: a processor, configured to select a precoding matrix W from a codebook based on a reference signal, where a coefficient $\alpha$ is used to perform phase adjustment on $\phi_n$ in the W, the $\phi_n$ represents a phase difference between weighted values of a first antenna group and a second antenna group of a transmit end for a transmission signal from a same transmission layer, the $$\varphi_n \in \{e^{\frac{j2\pi n}{Q}}\},$$

the n is a non-negative integer, the Q is a positive integer, and the first antenna group and the second antenna group belong to a same multi-antenna system; and a sender, configured to send a precoding matrix indicator PMI to the transmit end, so that the transmit end determines, according to the PMI, the W selected by the processor.

With reference to the ninth aspect, in another implementation manner of the ninth aspect, the processor is further configured to determine a rank indicator based on the reference signal, where the rank indicator corresponds to the number of useful transmission layers; and the processor is specifically configured to select, from the codebook based on the reference signal, the precoding matrix W corresponding to the determined rank indicator.

With reference to the ninth aspect, in another implementation manner of the ninth aspect, when the rank indicator determined by the processor is 1, the precoding matrix selected by the processor is:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix};$$

where the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an m1$^{th}$ element is 1 and other elements are all 0; the $Y_2$ and $e_{m2}$ represent a P×1-dimensional column vector, where in the $e_{m2}$ an m2$^{th}$ element is 1 and other elements are all 0; the m1 and the m2 are both positive integers; and the $e_{m1}$ and the $e_{m2}$ are the same or different.

With reference to the ninth aspect, in another implementation manner of the ninth aspect, when the rank indicator determined by the processor is 1, the precoding matrix selected by the processor is:

$$W = W_1 \cdot W_2 = \begin{bmatrix} X_L & 0 \\ 0 & X_L \end{bmatrix} \cdot$$

$$\begin{bmatrix} Y_1 & Y_1 \\ \alpha\varphi_n Y_2 & -\alpha\varphi_n Y_2 \end{bmatrix} = \begin{bmatrix} X_L & 0 \\ 0 & X_L \end{bmatrix} \cdot \begin{bmatrix} e_{m1} & e_{m1} \\ \alpha\varphi_n e_{m2} & -\alpha\varphi_n e_{m2} \end{bmatrix};$$

or $$W = W_1 \cdot W_2 = \begin{bmatrix} X_L & 0 \\ 0 & X_L \end{bmatrix} \cdot$$

$$\begin{bmatrix} Y_1 & Y_2 \\ \alpha\varphi_n Y_1 & -\alpha\varphi_n Y_2 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m1} & -\alpha\varphi_n e_{m2} \end{bmatrix};$$

or $$W = W_1 \cdot W_2 = \begin{bmatrix} X_L & 0 \\ 0 & X_L \end{bmatrix} \cdot$$

$$\begin{bmatrix} Y_1 & Y_2 \\ \alpha\varphi_n Y_2 & -\alpha\varphi_n Y_1 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m2} & -\alpha\varphi_n e_{m1} \end{bmatrix};$$

where the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent a P×1-dimensional column vector, where in the $e_{m2}$ an $m2^{th}$ element is 1 and other elements are all 0; the m1 and the m2 are both positive integers; and the $e_{m1}$ and the $e_{m2}$ are the same or different.

With reference to the ninth aspect or any implementation manner of the foregoing implementation manners, the coefficient $\alpha = e^{j2\pi \cdot f(m1)}$, where the $f(m_1)$ represents a function of the $m_1$; or the coefficient $\alpha = e^{j2\pi \cdot f(m2)}$, where the $f(m_2)$ represents a function of the $m_2$.

With reference to the ninth aspect or any implementation manner of the foregoing implementation manners, the coefficient $$\alpha = e^{j2\pi \frac{\lfloor (m1-1)/k \rfloor}{A}}$$

or the coefficient $$\alpha = e^{j2\pi \frac{\lfloor (m2-1)/k \rfloor}{A}},$$

where the A is a positive integer, the k=P/2, and $\lfloor \ \rfloor$ is a rounding down operator.

With reference to the ninth aspect or any implementation manner of the foregoing implementation manners, the coefficient $$\alpha = e^{j2\pi \frac{(m1-1) \bmod 2}{A}}$$

or the coefficient $$\alpha = e^{j2\pi \frac{(m2-1) \bmod 2}{A}},$$

where the A is a positive integer, and mod is a modulo operator.

With reference to the ninth aspect or any implementation manner of the foregoing implementation manners, in another implementation manner of the ninth aspect, the $W_1$ is a matrix representing a channel characteristic of a wideband, and the $W_2$ is a matrix representing a channel characteristic of a subband.

With reference to the ninth aspect or any implementation manner of the foregoing implementation manners, in another implementation manner of the ninth aspect, the precoding matrix indicator PMI sent by the sender includes a first precoding matrix indicator $PMI_1$ and a second precoding matrix indicator $PMI_2$, the $PMI_1$ is used for indicating the $W_1$, and the $PMI_2$ is used for indicating the $W_2$.

With reference to the ninth aspect or any implementation manner of the foregoing implementation manners, in another implementation manner of the ninth aspect, the processor is further configured to perform row permutation or column permutation on the W according to an antenna serial number.

A tenth aspect provides a transmit end. The transmit end includes a receiver, configured to receive a precoding matrix indicator PMI sent by a receive end; and a processor, configured to determine, according to the precoding matrix indicator PMI received by the receiver, a precoding matrix W selected from a codebook by the receive end based on a reference signal, where a coefficient α is used to perform phase adjustment on $\phi_n$ in the W, the $\phi_n$ represents a phase difference between weighted values of a first antenna group and a second antenna group of the transmit end for a transmission signal from a same transmission layer, the $$\varphi_n \in \{ e^{\frac{j2\pi n}{Q}} \},$$

the n is a non-negative integer, the Q is a positive integer, and the first antenna group and the second antenna group belong to a same multi-antenna system.

With reference to the tenth aspect, in another implementation manner of the tenth aspect, the W corresponds to a rank indicator, and the rank indicator corresponds to the number of useful transmission layers.

With reference to the tenth aspect or any implementation manner of the foregoing implementation manners, in another implementation manner of the tenth aspect, when the rank indicator is 1, the precoding matrix is:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix};$$

where the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent a P×1-dimensional column vector, where in the $e_{m2}$ an $m2^{th}$ element is 1 and other elements are all 0; the m1 and the m2 are both positive integers; and the $e_{m1}$ and the $e_{m2}$ are the same or different.

With reference to the tenth aspect or any implementation manner of the foregoing implementation manners, in another implementation manner of the tenth aspect, when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_1 \\ \alpha\varphi_n Y_2 & -\alpha\varphi_n Y_2 \end{bmatrix} =$$

-continued $$W = \begin{bmatrix} X_L & 0 \\ 0 & X_L \end{bmatrix} \cdot \begin{bmatrix} e_{m1} & e_{m1} \\ \alpha\varphi_n e_{m2} & -\alpha\varphi_n e_{m2} \end{bmatrix};$$

or when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_1 & -\alpha\varphi_n Y_2 \end{bmatrix} =$$
$$\begin{bmatrix} X_L & 0 \\ 0 & X_L \end{bmatrix} \cdot \begin{bmatrix} e_{m1} & e_{m2} \\ \alpha\varphi_n e_{m1} & -\alpha\varphi_n e_{m2} \end{bmatrix};$$

or when the rank indicator is 2, the precoding matrix is:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_2 & -\alpha\varphi_n Y_1 \end{bmatrix} =$$
$$\begin{bmatrix} X_L & 0 \\ 0 & X_L \end{bmatrix} \cdot \begin{bmatrix} e_{m1} & e_{m2} \\ \alpha\varphi_n e_{m2} & -\alpha\varphi_n e_{m1} \end{bmatrix};$$

where the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, where in the $e_{m1}$ an m1$^{th}$ element is 1 and other elements are all 0; the $Y_2$ and $e_{m2}$ represent a P×1-dimensional column vector, where in the $e_{m2}$ an m2$^{th}$ element is 1 and other elements are all 0; the m1 and the m2 are both positive integers; and the $e_{m1}$ and the $e_{m2}$ are the same or different.

With reference to the tenth aspect, in another implementation manner of the tenth aspect, the coefficient $\alpha = e^{j2\pi \cdot f(m_1)}$, where the $f(m_1)$ represents a function of the $m_1$; or the coefficient $\alpha = e^{j2\pi \cdot f(m_2)}$, where the $f(m_2)$ represents a function of the $m_2$.

With reference to the tenth aspect, in another implementation manner of the tenth aspect, the coefficient $$\alpha = e^{j2\pi \frac{\lfloor (m1-1)/k \rfloor}{A}}$$

or the coefficient $$\alpha = e^{j2\pi \frac{\lfloor (m2-1)/k \rfloor}{A}},$$

where the A is a positive integer, the k=P/2, and $\lfloor \ \rfloor$ is a rounding down operator.

With reference to the tenth aspect, in another implementation manner of the tenth aspect, the coefficient $$\alpha = e^{j2\pi \frac{(m1-1) \bmod 2}{A}}$$

or the coefficient $$\alpha = e^{j2\pi \frac{(m2-1) \bmod 2}{A}},$$

where the A is a positive integer, and mod is a modulo operator.

With reference to the tenth aspect, in another implementation manner of the tenth aspect, the precoding matrix indicator PMI received by the receiver includes a first precoding matrix indicator $PMI_1$ and a second precoding matrix indicator $PMI_2$; the processor is specifically configured to determine, according to the $PMI_1$, the $W_1$ selected from the codebook by the receive end based on the reference signal, determine, according to the $PMI_2$, the $W_2$ selected from the codebook by the receive end, and determine the W according to the $W_1$ and the $W_2$.

With reference to the tenth aspect, in another implementation manner of the tenth aspect, the processor is further configured to perform row permutation or column permutation on the W according to an antenna serial number.

An eleventh aspect provides a user equipment. The user equipment includes a processor, configured to determine, based on a reference signal, channel state information corresponding to each subband in a system bandwidth, and a sender, configured to send, to a base station, the channel state information corresponding to each subband in the system bandwidth determined by the processor, where the number of resource blocks RBs included in each subband in the system bandwidth is the same as the number of resource blocks RBs included in a corresponding resource block set.

With reference to the eleventh aspect, in another implementation manner of the eleventh aspect, the resource block set is a resource block group RBG or the resource block set is a precoding resource group PRG.

With reference to the eleventh aspect or any implementation manner of the foregoing implementation manners, in another implementation manner of the eleventh aspect, the resource block set is the precoding resource group PRG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 2 RBs.

With reference to the eleventh aspect or any implementation manner of the foregoing implementation manners, in another implementation manner of the eleventh aspect, the resource block set is the resource block group RBG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 4 RBs.

With reference to the eleventh aspect or any implementation manner of the foregoing implementation manners, in another implementation manner of the eleventh aspect, the RB included in each subband in the system bandwidth is the same as the RB included in the corresponding resource block set.

With reference to the eleventh aspect or any implementation manner of the foregoing implementation manners, in another implementation manner of the eleventh aspect, that the user equipment sends, to the base station, the channel state information corresponding to each subband in the system bandwidth includes that the user equipment sends, to the base station through a physical uplink shared channel PUSCH, the channel state information corresponding to each subband in the system bandwidth.

With reference to the eleventh aspect or any implementation manner of the foregoing implementation manners, in another implementation manner of the eleventh aspect, the channel state information includes at least one of the following: a precoding matrix indicator PMI and a channel quality indicator CQI.

A twelfth aspect provides a base station. The base station includes a receiver, configured to receive channel state information corresponding to each subband in a system bandwidth sent by a user equipment, where the channel state information corresponding to each subband in the system bandwidth is determined by the user equipment based on a reference signal; and a sender, configured to transmit data according to the channel state information corresponding to each subband in the system bandwidth received by the receiver; where the number of resource blocks RBs included in each subband in the system bandwidth is the same as the number of resource blocks RBs included in a corresponding resource block set.

With reference to the twelfth aspect, in another implementation manner of the twelfth aspect, the resource block set is a resource block group RBG or the resource block group is a precoding resource group PRG.

With reference to the twelfth aspect or any implementation manner of the foregoing implementation manners, in another implementation manner of the twelfth aspect, the resource block set is the precoding resource group PRG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 2 RBs.

With reference to the twelfth aspect or any implementation manner of the foregoing implementation manners, in another implementation manner of the twelfth aspect, the resource block set is the resource block group RBG, and when the system bandwidth is less than or equal to 10 RBs, a size of the subband is 1 RB; or when the system bandwidth is 11 to 26 RBs, a size of the subband is 2 RBs; or when the system bandwidth is 27 to 63 RBs, a size of the subband is 3 RBs; or when the system bandwidth is 64 to 110 RBs, a size of the subband is 4 RBs.

With reference to the twelfth aspect or any implementation manner of the foregoing implementation manners, in another implementation manner of the twelfth aspect, the RB included in each subband in the system bandwidth is the same as the RB included in the corresponding resource block set.

With reference to the twelfth aspect or any implementation manner of the foregoing implementation manners, in another implementation manner of the twelfth aspect, that the base station receives the channel state information corresponding to each subband in the system bandwidth sent by the user equipment includes that the base station receives, through a physical uplink shared channel PUSCH, the channel state information corresponding to each subband in the system bandwidth sent by the user equipment.

With reference to the twelfth aspect or any implementation manner of the foregoing implementation manners, in another implementation manner of the twelfth aspect, the channel state information includes at least one of the following: a precoding matrix indicator PMI and a channel quality indicator CQI.

With reference to the twelfth aspect or any implementation manner of the foregoing implementation manners, in another implementation manner of the twelfth aspect, the channel state information includes the precoding matrix indicator PMI and the channel quality indicator CQI, and the base station further includes a processor, where the processor is configured to determine, according to the CQI, corresponding to each subband in the system bandwidth, received by the receiver, a resource block set used for sending the data, and configured to precode the data according to the PMI corresponding to the subband corresponding to the determined resource block set, and the sender is further configured to transmit the data in an RB of the resource block set determined by the processor.

With reference to the twelfth aspect or any implementation manner of the foregoing implementation manners, in another implementation manner of the twelfth aspect, the channel state information includes the precoding matrix indicator PMI, and the base station further includes a processor, where the processor is configured to precode the data according to the PMI corresponding to the subband corresponding to the resource block set, and the sender is further configured to transmit the data in an RB of the resource block set.

With reference to the twelfth aspect or any implementation manner of the foregoing implementation manners, in another implementation manner of the twelfth aspect, the channel state information includes the channel quality indicator CQI, and the base station further includes a processor, where the processor is configured to determine, according to the CQI corresponding to each subband in the system bandwidth, a resource block set used for sending the data, and the sender is further configured to transmit the data in an RB of the resource block set determined by the processor.

A thirteenth aspect provides a precoding matrix indicator feedback method. The method includes: selecting, by a receive end from a codebook, a precoding matrix W corresponding to a rank indicator, where the rank indicator is 2, the precoding matrix W is represented by $W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi \frac{L}{32}} & e^{j2\pi \frac{L+8}{32}} & e^{j2\pi \frac{L+16}{32}} & e^{j2\pi \frac{L+24}{32}} \end{bmatrix},$$

the 0 is a matrix of zeros having 2 rows and 4 columns, the L is a non-negative integer, a coefficient $\alpha$ is used to perform phase adjustment on $\phi_n$ in the $W_2$, the $\phi_n$ represents a phase difference between weighted values of a first antenna group and a second antenna group of a transmit end for a transmission signal from a same transmission layer, the $$\varphi_n \in \{e^{\frac{j2\pi n}{Q}}\},$$

the n is a non-negative integer, the Q is a positive integer, and the first antenna group and the second antenna group belong to a same multi-antenna system; and sending, by the receive end, a precoding matrix indicator PMI to the transmit end, so that the transmit end determines the W according to the PMI.

With reference to the thirteenth aspect, in another implementation manner of the thirteenth aspect, the $W_2$ in the $W_1 \cdot W_2$ is represented by:

$$W_2 = \frac{1}{B}\begin{bmatrix} e_{m1} & e_{m2} \\ \alpha\varphi_n e_{m1} & -\alpha\varphi_n e_{m2} \end{bmatrix};$$

or $$W_2 = \frac{1}{B}\begin{bmatrix} e_{m1} & e_{m2} \\ \alpha\varphi_n e_{m2} & -\alpha\varphi_n e_{m1} \end{bmatrix};$$

or $$W_2 = \frac{1}{B}\begin{bmatrix} e_{m1} & e_{m2} \\ \alpha\varphi_n e_{m1} & \alpha\varphi_n e_{m2} \end{bmatrix};$$

or $$W_2 = \frac{1}{B}\begin{bmatrix} e_{m1} & e_{m1} \\ \alpha\varphi_n e_{m2} & -\alpha\varphi_n e_{m2} \end{bmatrix};$$

where the coefficient $\alpha$ has a functional relationship with at least one of the m1, the m2, the n, and the L; and the $e_{m1}$ represents a 4×1-dimensional column vector, where in the $e_{m1}$ an m1$^{th}$ element is 1 and other elements are all 0, the $e_{m2}$ represents a 4×1-dimensional column vector, where in the $e_{m2}$ an m2$^{th}$ element is 1 and other elements are all 0, the m1 and the m2 are both positive integers less than or equal to 4, and the $e_{m1}$ and the $e_{m2}$ are the same or different.

With reference to the thirteenth aspect or any implementation manner of the foregoing implementation manners, in another implementation manner of the thirteenth aspect, that the coefficient $\alpha$ has a functional relationship with at least one of the m1, the m2, the n, and the L includes: the coefficient $$\alpha = e^{j2\pi \frac{\lfloor L/8 \rfloor}{8}},$$

or the coefficient $$\alpha = e^{j2\pi \cdot \frac{2(m1-1)}{32}},$$

or the coefficient $$\alpha = e^{j2\pi \cdot \frac{2(m2-1)}{32}},$$

or the $$\alpha = e^{j2\pi \frac{4 \cdot \lfloor L/8 \rfloor + 2(m1-1)}{32}},$$

or the $$\alpha = e^{j2\pi \frac{4 \cdot \lfloor L/8 \rfloor + 2(m2-1)}{32}},$$

or the $$\alpha = e^{j2\pi \frac{8 \cdot \lfloor L/8 \rfloor + n}{64}},$$

where $\lfloor \ \rfloor$ is a rounding down operator.

A fourteenth aspect provides a method for receiving a precoding matrix indicator. The method includes: receiving, by a transmit end, a precoding matrix indicator PMI sent by a receive end; and determining, by the transmit end according to the precoding matrix indicator PMI, a precoding matrix W that is selected by the receive end from a codebook and corresponds to a rank indicator, where the rank indicator is 2, the $W=W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient $\alpha$ is used to perform phase adjustment on $\varphi_n$ in the $W_2$, the $\varphi_n$ represents a phase difference between weighted values of a first antenna group and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system.

With reference to the fourteenth aspect, in another implementation manner of the fourteenth aspect, the $W_2$ in the $W_1 \cdot W_2$ is represented by:

$$W_2 = \frac{1}{B}\begin{bmatrix} e_{m1} & e_{m2} \\ \alpha\varphi_n e_{m1} & -\alpha\varphi_n e_{m2} \end{bmatrix};$$

or $$W_2 = \frac{1}{B}\begin{bmatrix} e_{m1} & e_{m2} \\ \alpha\varphi_n e_{m2} & -\alpha\varphi_n e_{m1} \end{bmatrix};$$

or $$W_2 = \frac{1}{B}\begin{bmatrix} e_{m1} & e_{m2} \\ \alpha\varphi_n e_{m1} & \alpha\varphi_n e_{m2} \end{bmatrix};$$

or $$W_2 = \frac{1}{B}\begin{bmatrix} e_{m1} & e_{m2} \\ \alpha\varphi_n e_{m2} & -\alpha\varphi_n e_{m1} \end{bmatrix};$$

where the coefficient α has a functional relationship with at least one of the m1, the m2, the n, and the L; and the $e_{m1}$ represents a 4×1-dimensional column vector, where in the $e_{m1}$ an m1$^{th}$ element is 1 and other elements are all 0, the $e_{m2}$ represents a 4×1-dimensional column vector, where in the $e_{m2}$ an m2$^{th}$ element is 1 and other elements are all 0, the m1 and the m2 are both positive integers less than or equal to 4, and the $e_{m1}$ and the $e_{m2}$ are the same or different.

With reference to the fourteenth aspect or any implementation manner of the foregoing implementation manners, in another implementation manner of the fourteenth aspect, that the coefficient α has a functional relationship with at least one of the m1, the m2, and the L includes:

the coefficient $$\alpha = e^{j2\pi\frac{\lfloor L/8 \rfloor}{8}},$$

or the coefficient $$\alpha = e^{j2\pi\cdot\frac{2(m1-1)}{32}},$$

or the coefficient $$\alpha = e^{j2\pi\cdot\frac{2(m2-1)}{32}},$$

or the $$\alpha = e^{j2\pi\frac{4\cdot\lfloor L/8 \rfloor+2(m1-1)}{32}},$$

or the $$\alpha = e^{j2\pi\frac{4\cdot\lfloor L/8 \rfloor+2(m2-1)}{32}},$$

or the $$\alpha = e^{j2\pi\frac{8\cdot\lfloor L/8 \rfloor+n}{64}},$$

where ⌊ ⌋ is a rounding down operator.

A fifteenth aspect provides a precoding matrix indicator feedback method. The method includes: selecting, by a receive end from a codebook, a precoding matrix $W_{m,m',k}^{(2)}$ corresponding to a rank indicator, where the rank indicator is 2, the $$W_{m,m',k}^{(2)} = \frac{1}{\sqrt{8}}\begin{bmatrix} v_m & v_{m'} \\ \alpha\varphi_k v_{m'} & -\alpha\varphi_k v_m \end{bmatrix}$$

or the $$W_{m,m',k}^{(2)} = \frac{1}{\sqrt{8}}\begin{bmatrix} v_m & v_{m'} \\ \alpha\varphi_k v_m & -\alpha\varphi_k v_{m'} \end{bmatrix}$$

or the $$W_{m,m',k}^{(2)} = \frac{1}{\sqrt{8}}\begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the m=$i_1$+8*$Z_1$, the m'=$i_1$+8*$Z_2$, the $i_1$ is a non-negative integer less than or equal to 15, the $Z_1$ and the $Z_2$ are non-negative integers, the $\phi_k$ represents a phase difference between weighted values of a first antenna group and a second antenna group of a transmit end for a transmission signal from a same transmission layer and the $\phi_k=e^{j\pi k/2}$ the k is a non-negative integer and is determined by $i_2$, the $i_2$ is a non-negative integer less than or equal to 15, the first antenna group and the second antenna group belong to a same multi-antenna system, the coefficient α is used to perform phase adjustment on the $\phi_n$, the coefficient α has a functional relationship with at least one of the $i_1$, the $i_2$, the m, the m', and the k; and sending, by the receive end, a precoding matrix indicator PMI to the transmit end, so that the transmit end determines the $W_{m,m',k}^{(2)}$ according to the PMI.

With reference to the fifteenth aspect, in another implementation manner of the fifteenth aspect, that the coefficient α has a functional relationship with at least one of the $i_1$, the $i_2$, the m, the m', and the k includes:

the coefficient $$\alpha = e^{j2\pi\frac{\lfloor i_1/8 \rfloor}{8}},$$

or the coefficient $$\alpha = e^{j2\pi\frac{(m-i_1)/4}{32}},$$

or the coefficient $$\alpha = e^{j2\pi \frac{(m'-i_1)/4}{32}},$$

or the coefficient $$\alpha = e^{j2\pi \frac{4\lfloor i_1/8 \rfloor + (m-i_1)/4}{32}},$$

or the coefficient $$\alpha = e^{j2\pi \frac{4\lfloor i_1/8 \rfloor + (m'-i_1)/4}{32}},$$

or the coefficient $$\alpha = e^{j2\pi \frac{4\lfloor i_1/8 \rfloor + k/2}{32}},$$

or the coefficient $$\alpha = e^{j2\pi \frac{\lfloor i_2/2 \rfloor}{32}},$$

where $\lfloor \ \rfloor$ is a rounding down operator.

With reference to the fifteenth aspect or any implementation manner of the foregoing implementation manners, in another implementation manner of the fifteenth aspect, a relationship between the precoding matrix $W_{m,m',k}^{(2)}$ included in the codebook and the $i_1$ and the $i_2$ is represented by:

|  | $i_2$ | | | |
| --- | --- | --- | --- | --- |
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
|  | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
|  | $i_2$ | | | |
| $i_1$ | 8 | 9 | 10 | 11 |
| 0-15 | $W_{i_1+8,i_1+24,0}^{(2)}$ | $W_{i_1+8,i_1+24,0}^{(2)}$ | $W_{i_1+8,i_1+24,2}^{(2)}$ | $W_{i_1+8,i_1+24,2}^{(2)}$ |
|  | $i_2$ | | | |
| $i_1$ | 12 | 13 | 14 | 15 |
| 0-15 | $W_{i_1,i_1+16,0}^{(2)}$ | $W_{i_1+8,i_1+24,0}^{(2)}$ | $W_{i_1+16,i_1,0}^{(2)}$ | $W_{i_1+24,i_1+8,0}^{(2)}$ | where, when the $12 \leq i_2 \leq 15$, the $$W_{m,m',k}^{(2)} = \frac{1}{\sqrt{8}} \begin{bmatrix} v_m & v_{m'} \\ \alpha \varphi_k v_{m'} & -\alpha \varphi_k v_m \end{bmatrix};$$

when the $i_2=8$ or $i_2=11$, the $$W_{m,m',k}^{(2)} = \frac{1}{\sqrt{8}} \begin{bmatrix} v_m & v_{m'} \\ \alpha \varphi_k v_m & \alpha \varphi_k v_{m'} \end{bmatrix};$$

and when the $0 \leq i_2 \leq 7$ or $9 \leq i_2 \leq 10$, the $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}.$$

With reference to the fifteenth aspect or any implementation manner of the foregoing implementation manners, in another implementation manner of fifteenth aspect, a relationship between the precoding matrix $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}$$

included in the codebook and the $i_1$ and the $i_2$ is represented by:

|  | $i_2$ | | | |
| --- | --- | --- | --- | --- |
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
|  | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
|  | $i_2$ | | | |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
|  | $i_2$ | | | |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

With reference to the fifteenth aspect or any implementation manner of the foregoing implementation manners, in another implementation manner of the fifteenth aspect, the PMI includes a first index and a second index, the first index is used for indicating the $i_1$, and the second index is used for indicating the $i_2$, so that the transmit end determines the $W_{m,m',k}^{(2)}$ according to the $i_1$ and the $i_2$.

A sixteenth aspect provides a method for receiving a precoding matrix indicator. The method includes: receiving, by a transmit end, a precoding matrix indicator PMI sent by a receive end; and determining, by the transmit end according to the precoding matrix indicator PMI, a precoding matrix $W_{m,m',k}^{(2)}$ that is selected by the receive end from a codebook based on a reference signal and corresponds to a rank indicator, where the rank indicator is 2, the $$W^{(2)}_{m,m',k} = \frac{1}{\sqrt{8}} \begin{bmatrix} v_m & v_{m'} \\ \alpha\varphi_k v_{m'} & -\alpha\varphi_k v_m \end{bmatrix}$$

or the $$W^{(2)}_{m,m',k} = \frac{1}{\sqrt{8}} \begin{bmatrix} v_m & v_{m'} \\ \alpha\varphi_k v_m & -\alpha\varphi_k v_{m'} \end{bmatrix}$$

or the $$W^{(2)}_{m,m',k} = \frac{1}{\sqrt{8}} \begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m = i_1 + 8*Z_1$, the $m' = i_1 + 8*Z_2$, the $i_1$ is a non-negative integer, the $Z_1$ and the $Z_2$ are non-negative integers, the $\varphi_k$ represents a phase difference between weighted values of a first antenna group and a second antenna group of the transmit end for a transmission signal from a same transmission layer and the $\varphi_k = e^{j\pi k/2}$ the k is a non-negative integer and is determined by $i_2$, the $i_2$ is a non-negative integer, the first antenna group and the second antenna group belong to a same multi-antenna system, the coefficient $\alpha$ is used to perform phase adjustment on the $\varphi_k$, and the coefficient $\alpha$ has a functional relationship with at least one of the $i_1$, the $i_2$, the m, the m', and the k.

With reference to the sixteenth aspect, in another implementation manner of the sixteenth aspect, that the coefficient $\alpha$ has a functional relationship with at least one of the the $i_2$, the m, the m', and the k includes: the coefficient $$\alpha = e^{j2\pi \frac{\lfloor i_1/8 \rfloor}{8}},$$

or the coefficient $$\alpha = e^{j2\pi \frac{(m-i_1)/4}{32}},$$

or the coefficient $$\alpha = e^{j2\pi \frac{(m'-i_1)/4}{32}},$$

or the coefficient $$\alpha = e^{j2\pi \frac{4\lfloor i_1/8 \rfloor + (m-i_1)/4}{32}},$$

or
the coefficient $$\alpha = e^{j2\pi \frac{4\lfloor i_1/8 \rfloor + (m'-i_1)/4}{32}},$$

or the coefficient $$\alpha = e^{j2\pi \frac{4\lfloor i_1/8 \rfloor + k/2}{32}},$$

or the coefficient $$\alpha = e^{j2\pi \frac{\lfloor i_2/2 \rfloor}{32}},$$

where $\lfloor \ \rfloor$ is a rounding down operator.

With reference to the sixteenth aspect or any implementation manner of the foregoing implementation manners, in another implementation manner of the sixteenth aspect, the PMI includes a first index and a second index; and the determining, by the transmit end according to the precoding matrix indicator PMI, a precoding matrix $W_{m,m',k}^{(2)}$ that is selected by the receive end from a codebook based on a reference signal and corresponds to a rank indicator includes: determining, by the transmit end, the $i_1$ according to the first index, and determining the $i_2$ according to the second index; and determining, by the transmit end in a stored codebook according to the $i_1$ and the $i_2$, the $W_{m,m',k}^{(2)}$ selected by the receive end.

With reference to the sixteenth aspect or any implementation manner of the foregoing implementation manners, in another implementation manner of the sixteenth aspect, a relationship between the precoding matrix $W_{m,m',k}^{(2)}$ included in the stored codebook and the $i_1$ and the $i_2$ is represented by:

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| | $i_2$ | | | |
|---|---|---|---|---|
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0-15 | $W_{i_1+8,i_1+24,0}^{(2)}$ | $W_{i_1+8,i_1+24,0}^{(2)}$ | $W_{i_1+8,i_1+24,2}^{(2)}$ | $W_{i_1+8,i_1+24,2}^{(2)}$ |

| | $i_2$ | | | |
|---|---|---|---|---|
| $i_1$ | 12 | 13 | 14 | 15 |
| 0-15 | $W_{i_1,i_1+16,0}^{(2)}$ | $W_{i_1+8,i_1+24,0}^{(2)}$ | $W_{i_1+16,i_1,0}^{(2)}$ | $W_{i_1+24,i_1+8,0}^{(2)}$ | where, when the $12 \leq i_2 \leq 15$, the $$W^{(2)}_{m,m',k} = \frac{1}{\sqrt{8}} \begin{bmatrix} v_m & v_{m'} \\ \alpha\varphi_k v_{m'} & -\alpha\varphi_k v_m \end{bmatrix};$$

when the $i_2=8$ or $i_2=11$, the $$W^{(2)}_{m,m',k} = \frac{1}{\sqrt{8}} \begin{bmatrix} v_m & v_{m'} \\ \alpha\varphi_k v_m & \alpha\varphi_k v_{m'} \end{bmatrix};$$

and when the $0 \leq i_2 \leq 7$ or $9 \leq i_2 \leq 10$, the $$W^{(2)}_{m,m',k} = \frac{1}{\sqrt{8}} \begin{bmatrix} v_m & v_{m'} \\ \alpha\varphi_k v_m & -\alpha\varphi_k v_{m'} \end{bmatrix}.$$

With reference to the sixteenth aspect or any implementation manner of the foregoing implementation manners, in another implementation manner of the sixteenth aspect, a relationship between the precoding matrix $$W^{(2)}_{m,m',k} = \frac{1}{\sqrt{8}} \begin{bmatrix} v_m & v_{m'} \\ \alpha\varphi_k v_m & -\alpha\varphi_k v_{m'} \end{bmatrix}$$

included in the stored codebook and the $i_1$ and the $i_2$ is represented by:

| | | $i_2$ | | |
|---|---|---|---|---|
| $i_1$ | 0 | 1 | 2 | 3 |
| 0-15 | $W^{(2)}_{i_1,i_1,0}$ | $W^{(2)}_{i_1,i_1,1}$ | $W^{(2)}_{i_1+8,i_1+8,0}$ | $W^{(2)}_{i_1+8,i_1+8,1}$ |

| | | $i_2$ | | |
|---|---|---|---|---|
| $i_1$ | 4 | 5 | 6 | 7 |
| 0-15 | $W^{(2)}_{i_1+16,i_1+16,0}$ | $W^{(2)}_{i_1+16,i_1+16,1}$ | $W^{(2)}_{i_1+24,i_1+24,0}$ | $W^{(2)}_{i_1+24,i_1+24,1}$ |

| | | $i_2$ | | |
|---|---|---|---|---|
| $i_1$ | 8 | 9 | 10 | 11 |
| 0-15 | $W^{(2)}_{i_1,i_1+8,0}$ | $W^{(2)}_{i_1,i_1+8,1}$ | $W^{(2)}_{i_1+8,i_1+16,0}$ | $W^{(2)}_{i_1+8,i_1+16,1}$ |

| | | $i_2$ | | |
|---|---|---|---|---|
| $i_1$ | 12 | 13 | 14 | 15 |
| 0-15 | $W^{(2)}_{i_1,i_1+24,0}$ | $W^{(2)}_{i_1,i_1+24,1}$ | $W^{(2)}_{i_1+8,i_1+24,0}$ | $W^{(2)}_{i_1+8,i_1+24,1}$ |

A seventeenth aspect provides a receive end. The receive end includes: a selecting unit, configured to select, from a codebook, a precoding matrix W corresponding to a rank indicator, where the rank indicator is 2, the precoding matrix W is represented by $W_1 \cdot W_2$, the $$W_1 = \begin{bmatrix} X_L & 0 \\ 0 & X_L \end{bmatrix},$$

the $$\begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient $\alpha$ is used to perform phase adjustment on $\phi_n$ in the $W_2$, the $\phi_n$ represents a phase difference between weighted values of a first antenna group and a second antenna group of a transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system; and a sending unit, configured to send a precoding matrix indicator PMI to the transmit end, so that the transmit end determines, according to the PMI, the W selected by the selecting unit.

With reference to the seventeenth aspect, in another implementation manner of the seventeenth aspect, the $W_2$ in the $W_1 \cdot W_2$ selected by the selecting unit is represented by:

$$W_2 = \frac{1}{B} \begin{bmatrix} e_{m1} & e_{m2} \\ \alpha\varphi_n e_{m1} & -\alpha\varphi_n e_{m2} \end{bmatrix};$$

or $$W_2 = \frac{1}{B} \begin{bmatrix} e_{m1} & e_{m2} \\ \alpha\varphi_n e_{m2} & -\alpha\varphi_n e_{m1} \end{bmatrix};$$

or $$W_2 = \frac{1}{B} \begin{bmatrix} e_{m1} & e_{m2} \\ \alpha\varphi_n e_{m1} & \alpha\varphi_n e_{m2} \end{bmatrix};$$

or $$W_2 = \frac{1}{B} \begin{bmatrix} e_{m1} & e_{m1} \\ \alpha\varphi_n e_{m2} & -\alpha\varphi_n e_{m2} \end{bmatrix};$$

where the coefficient $\alpha$ has a functional relationship with at least one of the m1, the m2, the n, and the L; and the $e_{m1}$ represents a 4×1-dimensional column vector, where in the $e_{m1}$ an m1$^{th}$ element is 1 and other elements are all 0, the $e_{m2}$ represents a 4×1-dimensional column vector, where in the $e_{m2}$ an m2$^{th}$ element is 1 and other elements are all 0, the m1 and the m2 are both positive integers less than or equal to 4, and the $e_{m1}$ and the $e_{m2}$ are the same or different.

With reference to the seventeenth aspect or any implementation manner of the foregoing implementation manners, in another implementation manner of the seventeenth aspect, that the coefficient $\alpha$ has a functional relationship with at least one of the m1, the m2, the n, and the L includes: the coefficient $$\alpha = e^{j2\pi \frac{\lfloor L/8 \rfloor}{8}},$$

or the coefficient $$\alpha = e^{j2\pi \frac{2(m1-1)}{32}},$$

or the coefficient $$\alpha = e^{j2\pi \frac{2(m2-1)}{32}},$$

or the $$\alpha = e^{j2\pi \frac{4\lfloor L/8 \rfloor + 2(m1-1)}{32}},$$

or the $$\alpha = e^{j2\pi \frac{4\lfloor L/8 \rfloor + 2(m2-1)}{32}},$$

or the $$\alpha = e^{j2\pi \frac{8\lfloor L/8 \rfloor + n}{64}},$$

where $\lfloor \ \rfloor$ is a rounding down operator.

An eighteenth aspect provides a transmit end. The transmit end includes: a receiving unit, configured to receive a precoding matrix indicator PMI sent by a receive end; and a determining unit, configured to determine, according to the precoding matrix indicator PMI received by the receiving unit, a precoding matrix W that is selected by the receive end from a codebook and corresponds to a rank indicator, where the rank indicator is 2, the $W = W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi \frac{L}{32}} & e^{j2\pi \frac{L+8}{32}} & e^{j2\pi \frac{L+16}{32}} & e^{j2\pi \frac{L+24}{32}} \end{bmatrix},$$

the 0 is a matrix of zeros having 2 rows and 4 columns, the L is a non-negative integer, a coefficient $\alpha$ is used to perform phase adjustment on $\phi_n$ in the $W_2$, the $\phi_n$ represents a phase difference between weighted values of a first antenna group and a second antenna group of the transmit end for a transmission signal from a same transmission layer, the $$\varphi_n \in \{e^{\frac{j2\pi n}{Q}}\},$$

the n is a non-negative integer, the Q is a positive integer, and the first antenna group and the second antenna group belong to a same multi-antenna system.

With reference to the eighteenth aspect, in another implementation manner of the eighteenth aspect, the $W_2$ in the $W_1 \cdot W_2$ is represented by:

$$W_2 = \frac{1}{B}\begin{bmatrix} e_{m1} & e_{m2} \\ \alpha\varphi_n e_{m1} & -\alpha\varphi_n e_{m2} \end{bmatrix};$$

or $$W_2 = \frac{1}{B}\begin{bmatrix} e_{m1} & e_{m2} \\ \alpha\varphi_n e_{m2} & -\alpha\varphi_n e_{m1} \end{bmatrix};$$

or $$W_2 = \frac{1}{B}\begin{bmatrix} e_{m1} & e_{m2} \\ \alpha\varphi_n e_{m1} & \alpha\varphi_n e_{m2} \end{bmatrix};$$

or $$W_2 = \frac{1}{B}\begin{bmatrix} e_{m1} & e_{m1} \\ \alpha\varphi_n e_{m2} & -\alpha\varphi_n e_{m2} \end{bmatrix};$$

where the coefficient $\alpha$ has a functional relationship with at least one of the m1, the m2, the n, and the L; and the $e_{m1}$ represents a 4×1-dimensional column vector, wherein the $e_{m1}$ an m1$^{th}$ element is 1 and other elements are all 0, the $e_{m2}$ represents a 4×1-dimensional column vector, wherein the $e_{m2}$ an m2$^{th}$ element is 1 and other elements are all 0, the m1 and the m2 are both positive integers less than or equal to 4, and the $e_{m1}$ and the $e_{m2}$ are the same or different.

With reference to the eighteenth aspect or any implementation manner of the foregoing implementation manners, in another implementation manner of the eighteenth aspect, that the coefficient $\alpha$ has a functional relationship with at least one of the m1, the m2, and the L includes: the coefficient $$\alpha = e^{j2\pi \frac{\lfloor L/8 \rfloor}{8}},$$

or the coefficient $$\alpha = e^{j2\pi \frac{2(m1-1)}{32}},$$

or the coefficient $$\alpha = e^{j2\pi \frac{2(m2-1)}{32}},$$

or the $$\alpha = e^{j2\pi \frac{4\cdot\lfloor L/8\rfloor+2(m1-1)}{32}},$$

or the $$\alpha = e^{j2\pi \frac{4\cdot\lfloor L/8\rfloor+2(m2-1)}{32}},$$

or the $$\alpha = e^{j2\pi \frac{8\cdot\lfloor L/8\rfloor+n}{64}},$$

where $\lfloor\ \rfloor$ is a rounding down operator.

A nineteenth aspect provides a receive end. The receive end includes: a selecting unit, configured to select, from a codebook, a precoding matrix $W_{m,m',k}^{(2)}$ corresponding to a rank indicator, where the rank indicator is 2, the $$W_{m,m',k}^{(2)} = \frac{1}{\sqrt{8}}\begin{bmatrix} v_m & v_{m'} \\ \alpha\varphi_k v_{m'} & -\alpha\varphi_k v_m \end{bmatrix}$$

or the $$W_{m,m',k}^{(2)} = \frac{1}{\sqrt{8}}\begin{bmatrix} v_m & v_{m'} \\ \alpha\varphi_k v_m & -\alpha\varphi_k v_{m'} \end{bmatrix}$$

or the $$W_{m,m',k}^{(2)} = \frac{1}{\sqrt{8}}\begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m=i_1+8*Z_1$, the $m'=i_1+8*Z_2$, the $i_1$ is a non-negative integer less than or equal to 15, the $Z_1$ and the $Z_2$ are non-negative integers, the $\varphi_k$ represents a phase difference between weighted values of a first antenna group and a second antenna group of a transmit end for a transmission signal from a same transmission layer and the $\varphi_k=e^{j\pi k/2}$ the k is a non-negative integer and is determined by $i_2$, the $i_2$ is a non-negative integer less than or equal to 15, the first antenna group and the second antenna group belong to a same multi-antenna system, the coefficient $\alpha$ is used to perform phase adjustment on the $\varphi_k$, and the coefficient $\alpha$ has a functional relationship with at least one of the $i_1$, the $i_2$, the m, the m', and the k; and a sending unit, configured to send a precoding matrix indicator PMI to the transmit end, so that the transmit end determines, according to the PMI, the $W_{m,m',k}^{(2)}$ selected by the selecting unit.

With reference to the nineteenth aspect, in another implementation manner of the nineteenth aspect, that the coefficient $\alpha$ has a functional relationship with at least one of the $i_1$, the $i_2$, the m, the m', and the k includes: the coefficient $$\alpha = e^{j2\pi \frac{\lfloor i_1/8\rfloor}{8}},$$

or the coefficient $$\alpha = e^{j2\pi \frac{(m-i_1)/4}{32}},$$

or the coefficient $$\alpha = e^{j2\pi \frac{(m'-i_1)/4}{32}},$$

or the coefficient $$\alpha = e^{j2\pi \frac{4\lfloor i_1/8\rfloor+(m-i_1)/4}{32}},$$

or the coefficient $$\alpha = e^{j2\pi \frac{4\lfloor i_1/8\rfloor+(m'-i_1)/4}{32}},$$

or the coefficient $$\alpha = e^{j2\pi \frac{4\lfloor i_1/8\rfloor+k/2}{32}},$$

or the coefficient $$\alpha = e^{j2\pi \frac{\lfloor i_2/2\rfloor}{32}},$$

where $\lfloor\ \rfloor$ is a rounding down operator.

With reference to the nineteenth aspect or any implementation manner of the foregoing implementation manners, in another implementation manner of the nineteenth aspect, a relationship between the precoding matrix $W_{m,m',k}^{(2)}$ included in the codebook and the $i_1$ and the $i_2$ is represented by:

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

-continued

| | $i_2$ | | | |
|---|---|---|---|---|
| $i_1$ | 8 | 9 | 10 | 11 |
| 0-15 | $W_{i_1+8,i_1+24,0}^{(2)}$ | $W_{i_1+8,i_1+24,0}^{(2)}$ | $W_{i_1+8,i_1+24,2}^{(2)}$ | $W_{i_1+8,i_1+24,2}^{(2)}$ |

| | $i_2$ | | | |
|---|---|---|---|---|
| $i_1$ | 12 | 13 | 14 | 15 |
| 0-15 | $W_{i_1,i_1+16,0}^{(2)}$ | $W_{i_1+8,i_1+24,0}^{(2)}$ | $W_{i_1+16,i_1,0}^{(2)}$ | $W_{i_1+24,i_1+8,0}^{(2)}$ | where, when the $12 \leq i_2 \leq 15$, the $$W_{m,m',k}^{(2)} = \frac{1}{\sqrt{8}} \begin{bmatrix} v_m & v_{m'} \\ \alpha\varphi_k v_{m'} & -\alpha\varphi_k v_m \end{bmatrix};$$

when the $i_2=8$ or $i_2=11$, the $$W_{m,m',k}^{(2)} = \frac{1}{\sqrt{8}} \begin{bmatrix} v_m & v_{m'} \\ \alpha\varphi_k v_m & \alpha\varphi_k v_{m'} \end{bmatrix};$$

and
when the $0 \leq i_2 \leq 7$ or $9 \leq i_2 \leq 10$, the $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}.$$

With reference to the nineteenth aspect or any implementation manner of the foregoing implementation manners, in another implementation manner of the nineteenth aspect, a relationship between the precoding matrix $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}$$

included in the codebook and the $i_1$ and the $i_2$ is represented by:

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| | $i_2$ | | | |
|---|---|---|---|---|
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| | $i_2$ | | | |
|---|---|---|---|---|
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| | $i_2$ | | | |
|---|---|---|---|---|
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

With reference to the nineteenth aspect or any implementation manner of the foregoing implementation manners, in another implementation manner of the nineteenth aspect, the PMI includes a first index and a second index, the first index is used for indicating the $i_1$, and the second index is used for indicating the $i_2$, so that the transmit end determines the $W_{m,m',k}^{(2)}$ according to the $i_1$ and the $i_2$.

A twentieth aspect provides a transmit end. The transmit end includes: a receiving unit, configured to receive a precoding matrix indicator PMI sent by a receive end; and a determining unit, configured to determine, according to the precoding matrix indicator PMI received by the receiving unit, a precoding matrix $W_{m,m',k}^{(2)}$ that is selected by the receive end from a codebook based on a reference signal and corresponds to a rank indicator, where the rank indicator is 2, the $$W_{m,m',k}^{(2)} = \frac{1}{\sqrt{8}} \begin{bmatrix} v_m & v_{m'} \\ \alpha\varphi_k v_{m'} & -\alpha\varphi_k v_m \end{bmatrix}$$

or the $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}$$

or the $$W_{m,m',k}^{(2)} = \frac{1}{\sqrt{8}} \begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m=i_1+8*Z_1$, the $m'=i_1+8*Z_2$, the $i_1$ is a non-negative integer, the $Z_1$ and the $Z_2$ are non-negative integers, the $\varphi_k$ represents a phase difference between weighted values of a first antenna group and a second antenna group of the transmit end for a transmission signal from a same transmission layer and the $\varphi_k = e^{j\pi k/2}$, the k is a non-negative integer and is determined by $i_2$, the $i_2$ is a non-negative integer, the first antenna group and the second antenna group belong to a same multi-antenna system, the coefficient α is used to perform phase adjustment on the $\varphi_k$, and the coefficient α has a functional relationship with at least one of the $i_1$, the $i_2$, the m, the m', and the k.

With reference to the twentieth aspect, in another implementation manner of the twentieth aspect, that the coefficient α has a functional relationship with at least one of the the $i_2$, the m, the m', and the k includes:

the coefficient $$\alpha = e^{j2\pi\frac{\lfloor i_1/8 \rfloor}{8}},$$

or the coefficient $$\alpha = e^{j2\pi\frac{(m-i_1)/4}{32}},$$

or the coefficient $$\alpha = e^{j2\pi\frac{(m'-i_1)/4}{32}},$$

or the coefficient $$\alpha = e^{j2\pi\frac{4\lfloor i_1/8 \rfloor + (m-i_1)/4}{32}},$$

or the coefficient $$\alpha = e^{j2\pi\frac{4\lfloor i_1/8 \rfloor + (m'-i_1)/4}{32}},$$

or the coefficient $$\alpha = e^{j2\pi\frac{4\lfloor i_1/8 \rfloor + k/2}{32}},$$

or the coefficient $$\alpha = e^{j2\pi\frac{\lfloor i_2/2 \rfloor}{32}},$$

where $\lfloor \; \rfloor$ is a rounding down operator.

With reference to the twentieth aspect or any implementation manner of the foregoing implementation manners, in another implementation manner of the twentieth aspect, the PMI received by the receiving unit includes a first index and a second index; and the determining unit is specifically configured to: determine the $i_1$ according to the first index, and determine the $i_2$ according to the second index; and determine, in a stored codebook according to the $i_1$ and the $i_2$, the $W_{m,m',k}^{(2)}$ selected by the receive end.

With reference to the twentieth aspect or any implementation manner of the foregoing implementation manners, in another implementation manner of the twentieth aspect, a relationship between the precoding matrix $W_{m,m',k}^{(2)}$ included in the stored codebook and the $i_1$ and the $i_2$ is represented by:

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $W_{i_1+8,i_1+24,0}^{(2)}$ | $W_{i_1+8,i_1+24,0}^{(2)}$ | $W_{i_1+8,i_1+24,2}^{(2)}$ | $W_{i_1+8,i_1+24,2}^{(2)}$ |
| | $i_2$ | | | |
| $i_1$ | 12 | 13 | 14 | 15 |
| 0-15 | $W_{i_1,i_1+16,0}^{(2)}$ | $W_{i_1+8,i_1+24,0}^{(2)}$ | $W_{i_1+16,i_1,0}^{(2)}$ | $W_{i_1+24,i_1+8,0}^{(2)}$ | where, when the $12 \leq i_2 \leq 15$, the $$W_{m,m',k}^{(2)} = \frac{1}{\sqrt{8}}\begin{bmatrix} v_m & v_{m'} \\ \alpha\varphi_k v_{m'} & -\alpha\varphi_k v_m \end{bmatrix};$$

when the $i_2=8$ or $i_2=11$, the $$W_{m,m',k}^{(2)} = \frac{1}{\sqrt{8}}\begin{bmatrix} v_m & v_{m'} \\ \alpha\varphi_k v_m & \alpha\varphi_k v_{m'} \end{bmatrix};$$

and
when the $0 \leq i_2 \leq 7$ or $9 \leq i_2 \leq 10$, the $$W_{m,m',k}^{(2)} = \frac{1}{\sqrt{8}}\begin{bmatrix} v_m & v_{m'} \\ \alpha\varphi_k v_m & -\alpha\varphi_k v_{m'} \end{bmatrix}.$$

With reference to the twentieth aspect or any implementation manner of the foregoing implementation manners, in another implementation manner of the twentieth aspect, a relationship between the precoding matrix $$W_{m,m',k}^{(2)} = \frac{1}{\sqrt{8}}\begin{bmatrix} v_m & v_{m'} \\ \alpha\varphi_k v_m & -\alpha\varphi_k v_{m'} \end{bmatrix}$$

included in the stored codebook and the $i_1$ and the $i_2$ is represented by:

| | $i_2$ | | | |
|---|---|---|---|---|
| $i_1$ | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| | $i_2$ | | | |
| $i_1$ | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| | $i_2$ | | | |
| $i_1$ | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |
| | $i_2$ | | | |
| $i_1$ | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

In the embodiments of the present invention, a receive end selects a precoding matrix W from a codebook based on a reference signal, where a coefficient α is used to perform phase adjustment on $\phi_n$ in the W, the $\phi_n$ represents a phase difference between weighted values of a first antenna group of a transmit end and a second antenna group of the transmit end for a transmission signal from a same transmission layer and the $$\varphi_n \in \{e^{\frac{j2\pi n}{Q}}\},$$

Q is a positive integer, n is a non-negative integer, and the first antenna group and the second antenna group belong to a same multi-antenna system. In this way, using the coefficient α to perform the phase adjustment on the $\phi_n$ can increase a size of a codebook set applicable to different antenna configurations, and improve precision of the receive end to feed back a PMI.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 15 is a flowchart of a precoding matrix indicator feedback method according to an embodiment of the present invention;

FIG. 17 is flowchart of a precoding matrix indicator feedback method according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the technical solutions of the present invention may be applied to various communications systems, such as: a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, a Long Term Evolution Advanced (Advanced long term evolution, LTE-A) system, and a Universal Mobile Telecommunications System (Universal Mobile Telecommunication System, UMTS).

It should be further understood that in the embodiments of the present invention, a user equipment (UE, User Equipment) includes but is not limited to a mobile station (MS, Mobile Station), a relay (Relay), a mobile terminal (Mobile Terminal), a mobile telephone (Mobile Telephone), a handset (handset), a portable device (portable equipment), and the like. The user equipment may communicate with one or more core networks by using a radio access network (RAN, Radio Access Network). For example, the user equipment may be a mobile telephone (or referred to as a "cellular" telephone), or a computer having a wireless communication function; the user equipment may further be a portable, pocket-sized, handheld, computer built-in, or in-vehicle mobile apparatus.

In the embodiments of the present invention, a base station may be a base station (Base Transceiver Station, BTS) in GSM or CDMA, may also be a base station (NodeB, NB) in WCDMA, and may further be an evolved NodeB (Evolutional NodeB, eNB or e-NodeB) in LTE, or a relay, or the like, which is not limited in the present invention.

The embodiments of the present invention may be applied to scenarios such as SU-MIMO, MU-MIMO or CoMP, and it should be understood that the embodiments of the present invention are not limited thereto.

In the embodiments of the present invention, a transmit end may be a base station, and correspondingly, a receive end may be a UE; or a transmit end may be a UE, and correspondingly, a receive end may be a base station. It should be understood that the embodiments of the present invention are not limited thereto.

Figure 1:
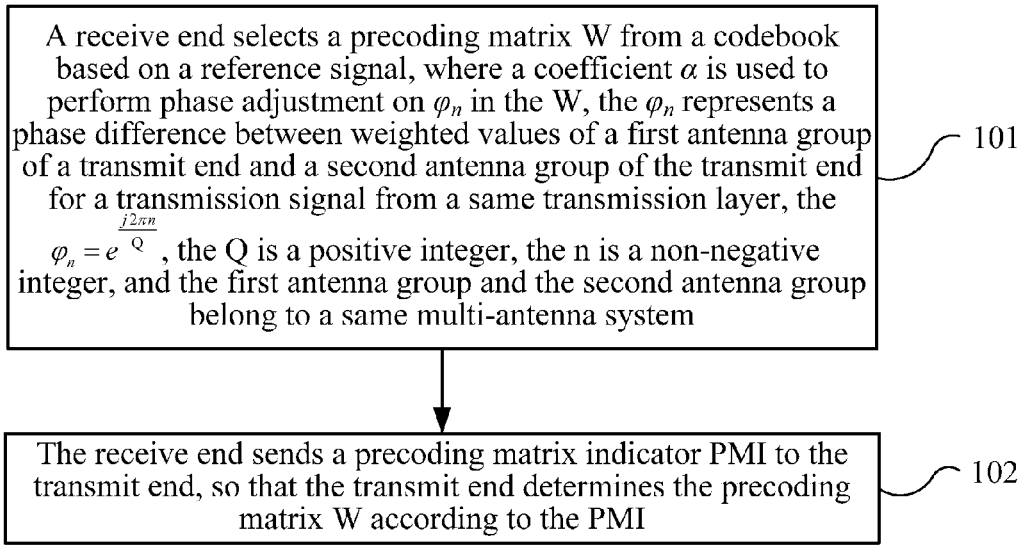
FIG. 1 is a flowchart of a precoding matrix indicator feedback method according to an embodiment of the present invention.

FIG. 1 is a flowchart of a precoding matrix indicator feedback method according to an embodiment of the present invention. The method in FIG. 1 is executed by a receive end.

101. The receive end selects a precoding matrix W from a codebook based on a reference signal, where a coefficient α is used to perform phase adjustment on $\phi_n$ in the W, the $\phi_n$ represents a phase difference between weighted values of a first antenna group of a transmit end and a second antenna group of a transmit end for a transmission signal from a same transmission layer (a weighted value corresponding to the phase difference), the $$\varphi_n = e^{\frac{j2\pi n}{Q}},$$

the n is a non-negative integer, the Q is a positive integer, and the first antenna group and the second antenna group belong to a same multi-antenna system.

102. The receive end sends a precoding matrix indicator PMI to the transmit end, so that the transmit end determines the precoding matrix W according to the PMI.

The multi-antenna system refers to a system in which the transmit end (for example, a base station) and the receive end (for example, a UE) perform communication by using multiple antennas. In contrast to a single-antenna system, multiple antennas of the transmit end and the receive end can form a spatial diversity gain or multiplexing gain, which can effectively improve transmission reliability and increase a system capacity. The diversity gain and multiplexing gain in the multi-antenna system may generally be obtained by using a precoding method at the transmit end and a receive combining algorithm at the receive end. For example, in an LTE system, the transmit end uses 4 antennas, whereas the receive end uses 2 antennas.

In addition, the multi-antenna system in the embodiment of the present invention may also be applied to a scenario of coordinated multi-point transmission. The coordinated multi-point transmission indicates that multiple transmit ends perform coordinated signal transmission for a same user. For example, a transmit end A has 2 antennas, a transmit end B also has 2 antennas, and the two transmit ends perform coordinated transmission for a receive end at the same time. Therefore, a signal received by the receive end may be regarded as a signal sent by a 4-antenna base station.

In the embodiment of the present invention, a receive end selects a precoding matrix W from a codebook based on a reference signal, where a coefficient α is used to perform phase adjustment on $\phi_n$ in the W, the $\phi_n$ represents a phase difference between weighted values of a first antenna group of a transmit end and a second antenna group of the transmit end for a transmission signal from a same transmission layer, and $$\varphi_n \in \{e^{\frac{j2\pi n}{Q}}\},$$

where n is a non-negative integer, Q is a positive integer, and the first antenna group and the second antenna group belong to a same multi-antenna system. In this way, using the coefficient α to perform the phase adjustment on the $\phi_n$ can increase a size of a codebook set applicable to different antenna configurations, and improve precision of the receive end to feed back a PMI.

For ease of description, in the following embodiments, the transmit end is described by using a base station as an example, and the receive end is described by using a UE as an example. It should be understood that the embodiments of the present invention are not limited thereto, the receive end may be a base station, and the transmit end may be a UE.

It should be noted that a type of the reference signal in 101 is not limited in the embodiment of the present invention. For example, the reference signal may be a channel state information reference signal (Channel State Information Reference Signal, CSI RS), a demodulation reference signal (Demodulation RS, DM RS) or a cell-specific reference signal (Cell-specific RS, CRS). The CSI may further include a channel quality indicator (Channel Quality Indicator/Index, CQI). It should be further noted that the UE may obtain a resource configuration of the reference signal by receiving a notification (for example, radio resource control (Radio Resource Control, RRC) signaling or downlink control information (Downlink Control Information, DCI)) of a base station or based on a cell identifier ID and obtain the reference signal in a corresponding resource or subframe.

It should be further noted that an antenna configuration manner of the multi-antenna system in the embodiment of the present invention is not limited thereto, and may be, for example, a uniform linear array (Uniform Linear Array, ULA), a dual-polarized antenna, or the like.

Optionally, in step 101, the receive end may acquire a channel estimation value based on the reference signal, calculate a channel capacity or a throughput or a chordal distance or the like based on the channel estimation value, and select the precoding matrix from the codebook according to a criterion, such as a channel capacity or throughput maximization criterion or a chordal distance minimization criterion, predefined at the receive end.

Further, the receive end may further determine a rank indicator RI based on the reference signal. The rank indicator RI corresponds to the number of useful transmission layers. For example, the UE may obtain the RI based on the number of ports of the reference signal and a unique value of an allowable RI corresponding to a codebook subset limitation; or the UE acquires the channel estimation value based on the reference signal, calculates a metric value such as the channel capacity or throughput based on the channel estimation value with respect to the value of each allowable rank indicator RI and a corresponding precoding matrix, and selects a rank indicator RI that optimizes the metric value as the determined rank indicator RI. In step 101, the receive end may select, from the codebook based on the reference signal, the precoding matrix W corresponding to the rank indicator. Specifically, a codebook subset corresponding to the rank indicator may be determined in the codebook, and the precoding matrix W is then selected from the codebook subset, or the precoding matrix W may further be directly determined by using the rank indicator.

Optionally, the codebook subset may be predefined, or the receive end reports the codebook to the transmit end and the transmit end determines the codebook subset and notifies the receive end of the codebook subset; or the receive end determines and reports the codebook subset. For example, the base station may notify the UE of the codebook subset limitation by using a higher layer signaling such as an RRC signaling. Optionally, in step 102, the UE may send the precoding matrix indicator PMI to the base station through a physical uplink control channel (Physical Uplink Control Channel, PUCCH) or a physical uplink shared channel (Physical Uplink Shared Channel, PUSCH). It should be understood that the embodiment of the present invention is not limited thereto.

Moreover, the precoding matrix indicator PMI and the rank indicator RI may be sent in a same subframe, and may also be sent in different subframes.

Optionally, as an embodiment, in step 101, the precoding matrix W corresponds to the rank indicator, and the rank indicator corresponds to the number of useful transmission layers.

Specifically, in a scenario of 4 antennas, when the rank indicator is 1, the precoding matrix W may be:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix} \quad (1)$$

or when the rank indicator is 2, the precoding matrix W may be:

$$W = W_1 \cdot W_2 = \begin{bmatrix} X_L & 0 \\ 0 & X_L \end{bmatrix} \cdot \begin{bmatrix} Y_1 & Y_1 \\ \alpha\varphi_n Y_2 & -\alpha\varphi_n Y_2 \end{bmatrix} = \begin{bmatrix} X_L & 0 \\ 0 & X_L \end{bmatrix} \cdot \begin{bmatrix} e_{m1} & e_{m1} \\ \alpha\varphi_n e_{m2} & -\alpha\varphi_n e_{m2} \end{bmatrix} \quad (2)$$

or when the rank indicator is 2, the precoding matrix W may be:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_1 & -\alpha\varphi_n Y_2 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m1} & -\alpha\varphi_n e_{m2} \end{bmatrix} \quad (3)$$

or when the rank indicator is 2, the precoding matrix W may be:

$$W = W_1 \cdot W_2 = \begin{bmatrix} X_L & 0 \\ 0 & X_L \end{bmatrix} \cdot \begin{bmatrix} Y_1 & Y_2 \\ \alpha\varphi_n Y_2 & -\alpha\varphi_n Y_1 \end{bmatrix} = \begin{bmatrix} X_L & 0 \\ 0 & X_L \end{bmatrix} \cdot \begin{bmatrix} e_{m1} & e_{m2} \\ \alpha\varphi_n e_{m2} & -\alpha\varphi_n e_{m1} \end{bmatrix} \quad (4)$$

where the $$X_L = \begin{bmatrix} 1 & 1 & \cdots & 1 \\ e^{j2\pi \frac{L}{M}} & e^{j2\pi \frac{L+1}{M}} & \cdots & e^{j2\pi \frac{L+(P-1)}{M}} \end{bmatrix};$$

the L, the P and the M are all positive integers; the L is less than the M; the $Y_1$ and $e_{m1}$ represent a P×1-dimensional column vector, where in the $e_{m1}$ an $m1^{th}$ element is 1 and other elements are all 0; the $Y_2$ and $e_{m2}$ represent P×1-dimensional column vector, where in the $e_{m2}$ an $m2^{th}$ element is 1 and other elements are all 0; and the m1 and the m2 are both positive integers. The $e_{m1}$ and $e_{m2}$ are the same or different, that is, the m1 and the m2 may be the same or different. Optionally, the $W_1$ is a matrix representing a channel characteristic of a wideband, and the $W_2$ is a matrix representing a channel characteristic of a subband.

It should be understood that a representation form of the $X_L$ in the embodiment of the present invention is not limited thereto and the $X_L$ in the foregoing formulas (1) to (4) may further be represented by:

$$X_L = \begin{bmatrix} 1 & 1 & 1 & 1 \\ e^{j2\pi \frac{L+t_1}{M}} & e^{j2\pi \frac{L+t_2}{M}} & \cdots & e^{j2\pi \frac{L+t_{num}}{M}} \end{bmatrix},$$

where the num is a positive integer, and the $t_1, t_2, \ldots, t_{num}$ are all integers and have nonconsecutive values. For example, when the M=32, the num=4, the $t_1$=0, the $t_2$=8, the $t_1$=16, and the $t_2$=24, the $$X_L = \begin{bmatrix} 1 & 1 & 1 & 1 \\ e^{j2\pi \frac{L}{32}} & e^{j2\pi \frac{L+8}{32}} & e^{j2\pi \frac{L+16}{32}} & e^{j2\pi \frac{L+24}{32}} \end{bmatrix}.$$

The foregoing example is only exemplary but is not to limit the scope of the present invention. The codebook in the present invention may further be a codebook whose rank indicator has another value. For ease of description, in the present invention, a codebook whose rank indicator is 1 and a codebook whose rank indicator is 2 are used as an example for description, and it should be understood that the present invention is not limited thereto.

It should be further understood that the foregoing codebook is represented in a structural form of double codebooks, and certainly may also be represented in a structural form of a single codebook, which is not limited in the present invention.

Preferably, the embodiment of the present invention is described by using the scenario of 4 antennas as an example. The 4 antennas are classified into two antenna groups. Each group includes two antennas. It should be understood that the embodiment of the present invention is not limited thereto. For example, the embodiment of the present invention may further be applied to a scenario of 8 antennas.

Optionally, the coefficient $\alpha = e^{j2\pi \cdot f(m1)}$, where the $f(m_1)$ represents a function of the $m_1$; in other words, the coefficient $\alpha$ is determined by the m1. Alternatively, the $\alpha = e^{j2\pi \cdot f(m2)}$, where the $f(m_2)$ represents a function of the $m_2$; in other words, the coefficient $\alpha$ is determined by the m2. Because the coefficient $\alpha$ is determined by the m1 and m2, no additional feedback resource needs to be added for feeding back the coefficient $\alpha$.

Specifically, a value of the coefficient $\alpha$ may be:

$$\alpha = e^{j2\pi \frac{\lfloor (m1-1)/k \rfloor}{A}} \quad (5)$$

or a value of the coefficient $\alpha$ may be:

$$\alpha = e^{j2\pi \frac{\lfloor (m2-1)/k \rfloor}{A}} \quad (6)$$

where the A is a positive integer, the k=P/2, and $\lfloor \; \rfloor$ is a rounding down operator.

Specifically, the value of the coefficient $\alpha$ may be:

$$\alpha = e^{j2\pi \frac{(m1-1)\bmod 2}{A}} \quad (7)$$

or $$\alpha = e^{j2\pi \frac{(m2-1)\bmod 2}{A}} \quad (8)$$

where the A is a positive integer, the k=P/2, and mod is a modulo operator, for example, 3 mod 2=1.

It should be understood that a manner of determining the value of the coefficient $\alpha$ is not limited in the embodiment of the present invention.

For example, the rank indicator is 1, and when the M=16, P=2, Q=4, and A=8, the $$X_l = \begin{bmatrix} 1 & 1 \\ e^{j2\pi \frac{L}{16}} & e^{j2\pi \frac{L+1}{16}} \end{bmatrix}$$

and $$\varphi_n \in \left\{ 1, e^{\frac{j2\pi}{4}}, e^{\frac{j2\pi \cdot 2}{4}}, e^{\frac{j2\pi \cdot 3}{4}} \right\}.$$

If the m1=m2, by using the foregoing formula (6) as an example, when the m2=1, the $$e_{m2} = \begin{bmatrix} 1 \\ 0 \end{bmatrix},$$

$\alpha=1$, and $$\alpha\varphi_n \in \left\{ 1, e^{\frac{j2\pi}{4}}, e^{\frac{j2\pi \cdot 2}{4}}, e^{\frac{j2\pi \cdot 3}{4}} \right\};$$

when the m2=2, the $$e_{m2} = \begin{bmatrix} 0 \\ 1 \end{bmatrix}, \alpha = e^{j\frac{2\pi}{8}}$$

and $$\alpha\varphi_n \in \left\{ e^{\frac{j2\pi}{8}}, e^{\frac{j2\pi \cdot 3}{8}}, e^{\frac{j2\pi \cdot 5}{8}}, e^{\frac{j2\pi \cdot 7}{8}} \right\}.$$

In the ULA antenna configuration, a codeword needs to meet the following form:

$$W = \begin{bmatrix} 1 \\ e^{j\theta} \\ e^{j2\theta} \begin{pmatrix} 1 \\ e^{j\theta} \end{pmatrix} \end{bmatrix},$$

that is, the $\alpha\phi_n$ needs to meet the $\alpha\phi_n = e^{j2\theta_L}$. After phase rotation by using the coefficient $\alpha$, 16 values in the present invention meet the $\alpha\phi_n = e^{j2\theta_L}$ (that is, suitable for a DFT phase), which are:

when the L=0, $$2\theta_0 \in \left\{ 2\pi 0, 2\pi \frac{1}{8} \right\};$$

when the L=2, $$2\theta_0 \in \left\{ 2\pi \frac{2}{8}, 2\pi \frac{3}{8} \right\};$$

when the L=4, $$2\theta_4 \in \left\{ 2\pi \frac{4}{8}, 2\pi \frac{5}{8} \right\};$$

when the L=6, $$2\theta_6 \in \left\{ 2\pi \frac{6}{8}, 2\pi \frac{7}{8} \right\};$$

when the L=8, $$2\theta_8 \in \left\{ 2\pi \frac{8}{8}, 2\pi \frac{9}{8} \right\};$$

when the L=10, $$2\theta_{10} \in \left\{ 2\pi \frac{10}{8}, 2\pi \frac{11}{8} \right\};$$

when the L=12, $$2\theta_{12} \in \left\{ 2\pi \frac{12}{8}, 2\pi \frac{13}{8} \right\};$$

and when the L=14, $$2\theta_{14} \in \left\{2\pi\frac{14}{8}, 2\pi\frac{15}{8}\right\}.$$

In an existing codebook, there are 8 values $$\left(2\theta_L \in \left\{0, 2\pi\frac{2}{8}, 2\pi\frac{4}{8}, 2\pi\frac{6}{8}, 2\pi\frac{8}{8}, 2\pi\frac{10}{8}, 2\pi\frac{12}{8}, 2\pi\frac{14}{8}\right\}\right)$$

suitable for the DFT phase (meeting the $\phi_n = e^{j2\theta_L}$) in the ULA antenna configuration, that is, the number of codewords is 8. In the embodiment of the present invention, the coefficient α enables the phase rotation, which increases a size of a codebook set suitable for the ULA antenna configuration, and the number of codewords is 16.

In addition, because the coefficient α is determined by the m1 and m2, the receive end does not need to add an additional feedback resource to indicate the coefficient α during the feedback of the PMI.

Optionally, in step 102, the receive end may send a first precoding matrix indicator $PMI_1$ and a second precoding matrix indicator $PMI_2$ to the transmit end, that is, the precoding matrix indicator PMI includes the $PMI_1$ and the $PMI_2$. Furthermore, the $PMI_1$ and the $PMI_2$ are sent by a same time period or different time periods. The $PMI_1$ is used for indicating the $W_1$, and the $PMI_2$ is used for indicating the $W_2$. In other words, the $PMI_1$ and the $PMI_2$ may have a same or different time domain or frequency domain granularities (or may be based on different subframe periods or subband sizes).

For example, when the $W_1$ is a matrix representing a long-term channel characteristic, and the $W_2$ is a matrix representing a short-term channel characteristic, correspondingly, the receive end may send the $PMI_1$ to the transmit end at a long interval and send the $PMI_2$ to the transmit end at a short interval.

Certainly, the receive end may directly indicate the selected precoding matrix W by using one PMI. For example, a codebook has 256 precoding matrixes in total. When the PMI sent by the receive end is 0, a 1st precoding matrix of the 256 precoding matrixes is indicated to the transmit end; when the PMI sent by the receive end is 1, a 2nd precoding matrix of the 256 precoding matrixes is indicated to the transmit end; .... That is, the values 0 to 255 of the PMI correspond to the 256 precoding matrixes respectively. It should be understood that a manner in which the receive end indicates a precoding matrix is not limited in the embodiment of the present invention.

Optionally, the receive end may send the precoding matrix indicator PMI to the transmit end through a physical control channel or a physical shared channel. For example, the UE may send the precoding matrix indicator PMI to the base station through the physical uplink control channel or the physical uplink shared channel. It should be understood that the embodiment of the present invention is not limited thereto.

It should be noted that manners of representing the foregoing codebook (or precoding matrix) by using other equivalent matrixes all fall within the scope of the present invention. For example, a precoding matrix obtained after row or column permutation is performed on the precoding matrix W in the embodiment of the present invention also falls within the scope of the present invention. For example, different antenna serial numbers correspondingly lead to row permutation of a precoding matrix.

Optionally, in step 101, the receive end may select, from the codebook, the precoding matrix W corresponding to the rank indicator, where the rank indicator is 2, the precoding matrix W is represented by $W_1 \cdot W_2$, the $$W_1 \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, the coefficient α is used to perform the phase adjustment on the $\phi_n$ in the $W_2$, the $\phi_n$ represents a phase difference between weighted values of a first antenna group and a second antenna group of the transmit end for a transmission signal from a same transmission layer, the $$\varphi_n \in \left\{e^{\frac{j2\pi n}{Q}}\right\},$$

the n is a non-negative integer, the Q is a positive integer, and the first antenna group and the second antenna group belong to a same multi-antenna system. Reference may be made to an embodiment in FIG. 15 for the detailed description of this embodiment, which is not described herein again.

Optionally, in step 101, the receive end may select, from the codebook, a precoding matrix $W_{m,m',k}^{(2)}$ corresponding to the rank indicator, where the rank indicator is 2, the $$W_{m,m',k}^{(2)} = \frac{1}{\sqrt{8}}\begin{bmatrix} v_m & v_{m'} \\ \alpha\varphi_k v_{m'} & -\alpha\varphi_k v_m \end{bmatrix}$$

or the $$W_{m,m',k}^{(2)} = \frac{1}{\sqrt{8}}\begin{bmatrix} v_m & v_{m'} \\ \alpha\varphi_k v_m & -\alpha\varphi_k v_{m'} \end{bmatrix}$$

or the $$W_{m,m',k}^{(2)} = \frac{1}{\sqrt{8}}\begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the m=$i_1$+8*$Z_1$, the m'=$i_1$+8*$Z_2$, the $i_1$ is a non-negative integer, the $Z_1$ and the $Z_2$ are non-negative integers, the $\phi_k$ represents a phase difference between weighted values of a first antenna group and a second antenna group of the transmit end for a transmission signal from a same transmission layer and the $\phi_k = e^{j\pi k/2}$ the k is a non-negative integer and is determined by $i_2$, the the $i_2$ is a non-negative integer, the first antenna group and the second antenna group belong to a same multi-antenna system, the coefficient α is used to perform phase adjustment on the $\phi_k$, and the coefficient α has a functional relationship with at least one of the $i_1$, the $i_2$, the m, the m', and the k. Reference may be made to an embodiment in FIG. 17 for the detailed description of this embodiment, which is not described herein again.

Figure 2:
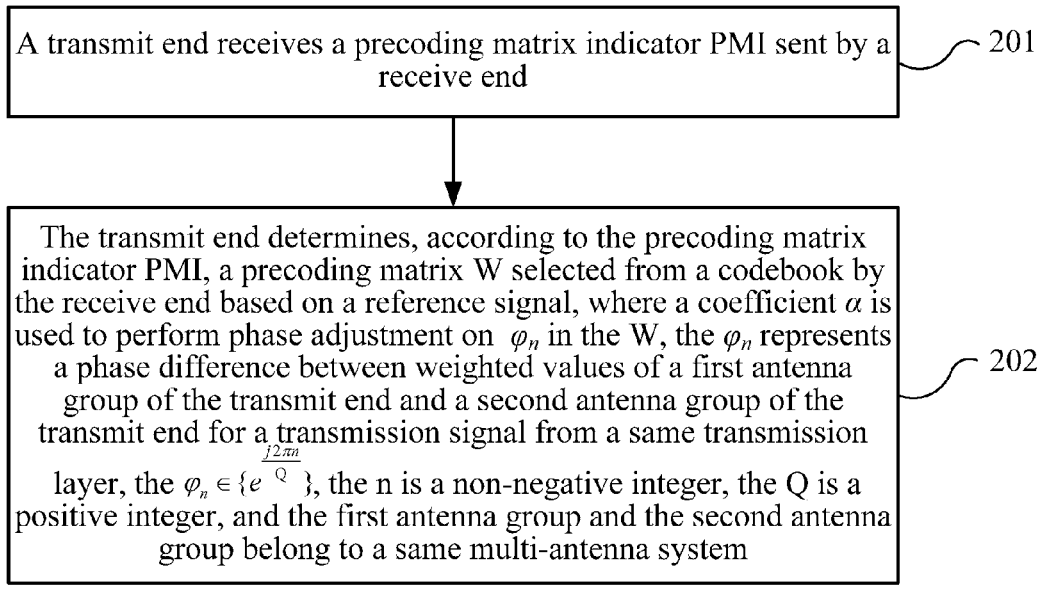
FIG. 2 is a flowchart of a method for receiving a precoding matrix indicator according to another embodiment of the present invention.

FIG. 2 is a flowchart of a precoding method according to another embodiment of the present invention. The method in FIG. 2 is executed by a transmit end, and corresponds to the method in FIG. 1. Therefore, description repeating that in the embodiment in FIG. 1 is properly omitted.

201. The transmit end receives a precoding matrix indicator PMI sent by a receive end.

202. The transmit end determines, according to the precoding matrix indicator PMI, a precoding matrix W selected from a codebook by the receive end based on a reference signal, where a coefficient α is used to perform phase adjustment on $\phi_n$ in the W, the $\phi_n$ represents a phase difference between weighted values of a first antenna group of the transmit end and a second antenna group of the transmit end for a transmission signal from a same transmission layer and the $$\varphi_n \in \left\{ e^{\frac{j2\pi n}{Q}} \right\},$$

the n is a non-negative integer, the Q is a positive integer, and the first antenna group and the second antenna group belong to a same multi-antenna system; and the receive end sends the precoding matrix indicator PMI to the transmit end, so that the transmit end determines the W according to the PMI.

In the embodiment of the present invention, a transmit end receives a PMI sent by a receive end, and determines, according to the precoding matrix indicator PMI, a precoding matrix W selected from a codebook by the receive end based on a reference signal, where a coefficient α is used to perform phase adjustment on $\phi_n$ in the W, the $\phi_n$ represents a phase difference between weighted values of a first antenna group of the transmit end and a second antenna group of the transmit end for a transmission signal from a same transmission layer, the $$\varphi_n \in \left\{ e^{\frac{j2\pi n}{Q}} \right\},$$

the Q is a positive integer, the n is a non-negative integer, and the first antenna group and the second antenna group belong to a same multi-antenna system. In this way, using the coefficient α to perform the phase adjustment on the $\phi_n$ can increase a size of a codebook set applicable to different antenna configurations, and improve precision of the receive end to feed back a PMI.

Optionally, the reference signal in step 202 may be a CSI RS, a DM RS or a CRS. The CSI may further include a channel quality indicator CQI. It should be further noted that a UE may obtain a resource configuration of the reference signal by receiving a notification (for example, an RRC signaling or DCI) of a base station or based on a cell identifier ID and obtain the reference signal in a corresponding resource or subframe.

Optionally, in step 201, the transmit end may receive, through a physical control channel or a physical shared channel, the precoding matrix indicator PMI sent by the receive end. For example, the base station may receive, through the PUCCH or the PUSCH, the precoding matrix indicator PMI sent by the UE. It should be understood that the embodiment of the present invention is not limited thereto.

Preferably, the embodiment of the present invention is applied to a scenario of 4 antennas. The 4 antennas are classified into two antenna groups. Each group includes two antennas. It should be understood that the embodiment of the present invention is not limited thereto. For example, the embodiment of the present invention may further be applied to a scenario of 8 antennas. For ease of description, the following example uses the scenario of 4 antennas as an example for description.

Optionally, as an embodiment, the precoding matrix W corresponds to a rank indicator, and the rank indicator corresponds to the number of useful transmission layers. The rank indicator may be determined by the receive end. For a specific example, reference may be made to the foregoing description, which is not described herein again. Specifically, the W may be represented in a structural form of double codebooks, namely, W=$W_1 \cdot W_2$. In the scenario of 4 antennas, the precoding matrix whose rank indicator is 1 may be the foregoing formula (1); or the precoding matrix whose rank indicator is 2 may be any one of the foregoing formulas (2) to (4). Optionally, the $W_1$ is a matrix representing a channel characteristic of a wideband, and the $W_2$ is a matrix representing a channel characteristic of a subband.

The foregoing example is only exemplary but is not to limit the scope of the present invention. The codebook in the present invention may further be a codebook whose rank indicator has another value. For ease of description, in the present invention, the codebook whose rank indicator is 1 and the codebook whose rank indicator is 2 are used as an example for description, and it should be understood that the present invention is not limited thereto.

It should be further understood that the foregoing codebook is represented in the structural form of double codebooks, and certainly may also be represented in a structural form of a single codebook, which is not limited in the present invention.

Optionally, the coefficient $\alpha = e^{j2\pi \cdot f(m1)}$, where the $f(m_1)$ represents a function of the $m_1$; in other words, the coefficient α is determined by the m1. Alternatively, the $\alpha = e^{j2\pi \cdot f(m2)}$, where the $f(m_2)$ represents a function of the $m_2$; in other words, the coefficient α is determined by the m2. Because the coefficient α is determined by the m1 and m2, no additional feedback resource needs to be added for feeding back the coefficient α. Specifically, a value of the coefficient α may be determined in any manner of the foregoing formulas (5) to (8).

It should be understood that the manner of determining the value of the coefficient α is not limited in the embodiment of the present invention.

For a specific example, reference may be made to the foregoing description, which is not described herein again.

Optionally, in step 201, the transmit end receives a first precoding matrix indicator PMI$_1$ and a second precoding matrix indicator PMI$_2$ sent by the receive end. The precoding matrix indicator PMI includes the PMI$_1$ and the PMI$_2$. Furthermore, the PMI$_1$ and the PMI$_2$ sent by the receive end are received by a same time period or different time periods. In other words, the PMI$_1$ and the PMI$_2$ may have the same or different time domain or frequency domain granularities (or may be based on different subframe periods or subband sizes). In step 202, the transmit end determines, according to the PMI$_1$, the W$_1$ selected from the codebook by the receive end based on the reference signal, and determines, according to the PMI$_2$, the W$_2$ selected from the codebook by the UE, and the transmit end may determine the precoding matrix W according to the W$_1$ and the W$_2$.

For example, when the W$_1$ is a matrix representing a long-term channel characteristic, and the W$_2$ is a matrix representing a short-term channel characteristic, correspondingly, the receive end may send the PMI$_1$ to the transmit end at a long interval and send the PMI$_2$ to the transmit end at a short interval.

Certainly, the transmit end may directly determine the selected precoding matrix W by using one PMI sent by the receive end. For example, a codebook has 256 precoding matrixes in total. When the PMI sent by the receive end and received by the transmit end is 0, the transmit end determines that the receive end selects a 1st precoding matrix of the 256 precoding matrixes from the codebook; when the PMI sent by the receive end and received by the transmit end is 1, the transmit end determines that the receive end selects a 2nd precoding matrix of the 256 precoding matrixes from the codebook; . . . . That is, the values 0 to 255 of the PMI correspond to the 256 precoding matrixes, respectively. It should be understood that a manner in which the UE indicates a precoding matrix is not limited in the embodiment of the present invention.

It should be understood that a manner in which the receive end indicates a precoding matrix is not limited in the embodiment of the present invention.

Optionally, the transmit end may receive, through the physical control channel or the physical shared channel, the precoding matrix indicator PMI sent by the receive end. It should be understood that the embodiment of the present invention is not limited thereto.

It should be noted that manners of representing the foregoing codebook (or precoding matrix) by using other equivalent matrixes all fall within the scope of the present invention. For example, a precoding matrix obtained after row or column permutation is performed on the precoding matrix W in the embodiment of the present invention also falls within the scope of the present invention. For example, different antenna serial numbers correspondingly lead to row permutation of a precoding matrix.

In an existing feedback mode, the granularity of a subband (the number of resource blocks (Resource Block, RB) included in the subband) of a system bandwidth is large, which decreases precision of channel state information (such as a PMI or CQI) feedback (especially in the case of MU-MIMO). When the granularity of the subband is excessively small, a feedback amount increases, resulting in a high overhead. That is, the granularity of the subband affects system performance.

Optionally, in step 202, the transmit end may determine, according to the precoding matrix indicator PMI, the precoding matrix W that is selected by the receive end from the codebook and corresponds to the rank indicator, where the rank indicator is 2, the precoding matrix W is represented by W$_1 \cdot$W$_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, the coefficient $\alpha$ is used to perform the phase adjustment on the $\phi_n$ in the W$_2$, the $\phi_n$ represents a phase difference between weighted values of a first antenna group and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system. Reference may be made to an embodiment in FIG. 16 for the detailed description of this embodiment, which is not described herein again.

Optionally, in 202, the transmit end may determine, according to the precoding matrix indicator PMI, a precoding matrix W$_{m,m',k}^{(2)}$ that is selected by the receive end from the codebook based on the reference signal and corresponds to the rank indicator, where the rank indicator is 2, the $$W_{m,m',k}^{(2)} = \frac{1}{\sqrt{8}} \begin{bmatrix} v_m & v_{m'} \\ \beta\varphi_k v_{m'} & -\beta\varphi_k v_m \end{bmatrix}$$

or the $$W_{m,m',k}^{(2)} = \frac{1}{\sqrt{8}} \begin{bmatrix} v_m & v_{m'} \\ \beta\varphi_k v_m & -\beta\varphi_k v_{m'} \end{bmatrix}$$

or the $$W_{m,m',k}^{(2)} = \frac{1}{\sqrt{8}} \begin{bmatrix} v_m & v_{m'} \\ \beta\varphi_k v_m & \beta\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m=i_1+8*Z_1$, the $m'=i_1+8*Z_2$, the $i_1$ is a non-negative integer, the $Z_1$ and the $Z_2$ are non-negative integers, the $\phi_k$ represents a phase difference between weighted values of a first antenna group and a second antenna group of the transmit end for a transmission signal from a same transmission layer and the $\phi_k=e^{j\pi k/2}$, the k is a non-negative integer and is determined by $i_2$, the $i_2$ is a non-negative integer, the first antenna group and the second antenna group belong to a same multi-antenna system, a coefficient β is used to perform phase adjustment on the $\phi_k$, the coefficient β has a functional relationship with at least one of the $i_1$, the $i_2$, the m, the m', and the k. Reference may be made to an embodiment in FIG. 18 for the detailed description of this embodiment, which is not described herein again.

Figure 3:
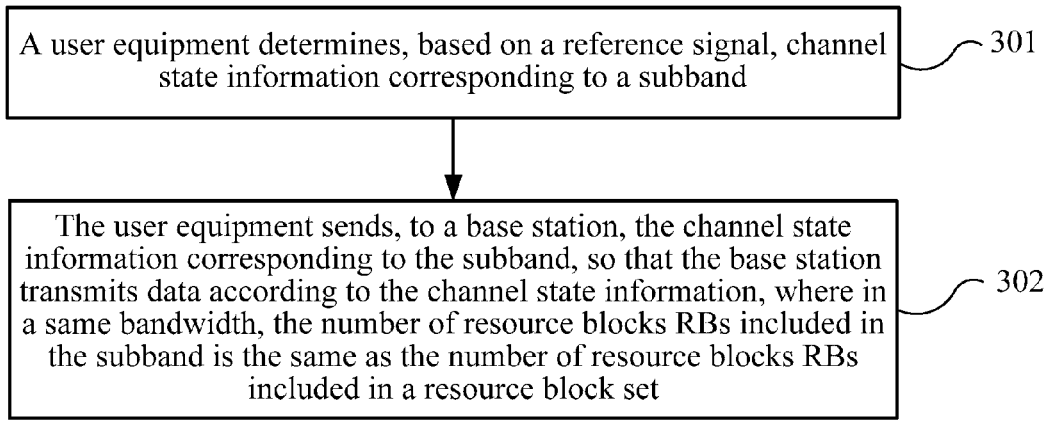
FIG. 3 is a flowchart of a method for feeding back channel state information according to an embodiment of the present invention.

FIG. 3 is a flowchart of a method for feeding back channel state information according to an embodiment of the present invention. The method in FIG. 3 is executed by a user equipment.

301. A user equipment determines, based on a reference signal, channel state information corresponding to each subband of a system bandwidth.

302. The user equipment sends, to a base station, the channel state information corresponding to each subband of the system bandwidth, where the number of resource blocks RBs included in each subband of the system bandwidth is the same as the number of resource blocks RBs included in a corresponding resource block set.

By means of the foregoing solution, a user equipment determines, based on a reference signal, channel state information corresponding to each subband in a system bandwidth and sends the channel state information to a base station. The number of resource blocks RBs included in the subband is the same as the number of resource blocks RBs included in a resource block set. Therefore, precision of channel state information feedback can be increased, and proper selection of a granularity of the subband effectively enhances system performance.

It should be noted that, in the embodiment of the present invention, the subband is in a one-to-one correspondence with the resource block set in the system bandwidth. A resource block set in the system bandwidth includes M RBs, where the M is a positive integer, and a subband corresponding to the resource block set also includes M RBs. Optionally, when the M>1, the M RBs are consecutive M RBs. It should be understood that the number of multiple subbands (or the number of resource block sets) included in the system bandwidth is not limited in the embodiment of the present invention.

Optionally, as another embodiment, the resource block set may be a resource block group (Resource Block Group, RBG), or the resource block set may be a precoding resource group (Precoding Resource Group, PRG).

Optionally, in a possible implementation manner, for a resource allocation type 0 (Type 0) of a physical downlink shared channel (Physical Downlink Shared Channel, PDSCH), a resource is allocated by RBG. It may be defined that the granularity of the subband (for example, in a PUSCH3-2 feedback mode) is the same as the granularity of the RBG, which may be schematically shown in Table 1.

TABLE 1

RBG Granularity and Subband Granularity Corresponding to a System Bandwidth

| System bandwidth (in RBs) | Number of RBs included in an RBG | Number of RBs included in a subband |
|---|---|---|
| ≤10 | 1 | 1 |
| 11-26 | 2 | 2 |
| 27-63 | 3 | 3 |
| 64-110 | 4 | 4 |

In another possible implementation manner, it may be defined that the granularity of the subband (for example, in the PUSCH3-2 feedback mode) is the same as the granularity of a PRG defined in an LTE R10 system, which may be schematically shown in Table 2.

TABLE 2

PRG Granularity and Subband Granularity Corresponding to a System Bandwidth

| System bandwidth (in RBs) | Number of RBs included in a PRG | Number of RBs included in a subband |
|---|---|---|
| ≤10 | 1 | 1 |
| 11-26 | 2 | 2 |
| 27-63 | 3 | 3 |
| 64-110 | 2 | 2 |

Furthermore, in the PUSCH3-2 feedback mode, in the case of the system bandwidth (the number of RBs)≤10 RBs, when the system bandwidth is 6 or 7 RBs, no subband is defined and only a wideband is defined; when the system bandwidth is 8-10 RBs, a size of the subband corresponding to PUSCH3-2 is 1 RB, which may be schematically shown in Table 3.

TABLE 3

Subband Granularity Corresponding to a System Bandwidth in a PUSCH3-2 Feedback Mode

| System bandwidth (in RBs) | Number of RBs included in a subband |
|---|---|
| 6-7 | N/A |
| 8-10 | 1 |

Furthermore, in the PUSCH3-2 feedback mode, in the case of the system bandwidth (the number of RBs)≤10 RBs, when the system bandwidth is 6-10 RBs, a size of the subband corresponding to PUSCH3-2 is 1 RB, which may be schematically shown in Table 4.

TABLE 4

Subband Granularity Corresponding to a System Bandwidth in a PUSCH3-2 Feedback Mode

| System bandwidth ≤10 (RB) | Number of RBs included in a subband |
|---|---|
| 6-10 | 1 |

Furthermore, in a system bandwidth, the size of a subband (the number of RBs included in a subband) may be an integral multiple of the size of a PRG. As shown in Table 2, when the system bandwidth≤10 RBs, the size of the subband is 1 RB. In consideration of a compromise between a feedback amount and performance, it may be further defined that the size of a subband is 2 RBs, correspondingly, that is, one resource block set includes 2 RBs. Similarly, when the system bandwidth is 64-110 RBs, it may further be defined that the size of the subband is 4 RBs, correspondingly, that is, one resource block set includes 4 RBs.

Figure 4:
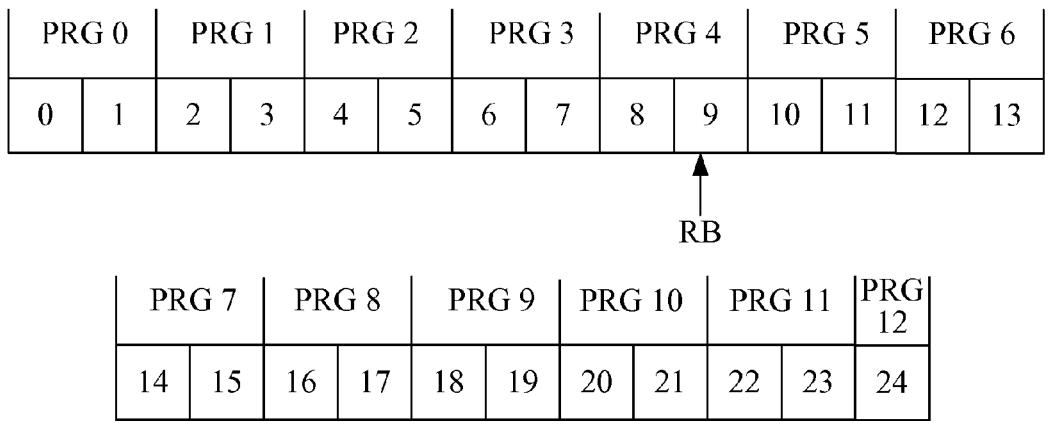
FIG. 4 is a schematic diagram of a PRG in a bandwidth of 25 RBs according to an embodiment of the present invention.

Optionally, in the system bandwidth, the RB included in each subband may be the same as the RB included in the corresponding resource block set. On a base station side, the base station uses a same precoding matrix to precode multiple RBs of a same PRG inside one system bandwidth for one UE. Therefore, the base station may perform coordinated channel estimation on the multiple RBs of the same PRG. For example, as shown in FIG. 4, when the system bandwidth is 25 RBs, each PRG includes 2 RBs, RBs whose serial numbers are 2i and 2i+1 belong to a same PRG, and a subband corresponding to the PRG also includes the RBs whose serial numbers are 2i and 2i+1 (for example, a PRG4 includes an RB8 and an RB9, and a subband corresponding to the PRG4 also includes the RB8 and the RB9), where i is an integer and has a value from 0 to 10, and a PRG12 includes an RB24. The base station uses a same precoding matrix to precode the RB8 and the RB9 included in the PRG4, which enables coordinated channel estimation.

When performing channel estimation, the UE assumes that a same precoding matrix is used to precode all RBs of one PRG. When performing precoding, the base station also uses a same precoding matrix to precode all RBs of the PRG. Therefore, on one hand, it is meaningless to define a granularity of the subband smaller than a granularity of the PRG corresponding to the subband. Assuming that a subband has one RB and a PRG has two RBs, the UE may feed back PMIs of subbands corresponding to the two RBs and corresponding CQIs. For example, for a first RB of the two RBs, the UE feeds back a PMI1 and a CQI1, and for a second RB of the two RBs, the UE feeds back a PMI2 and a CQI2. When the base station precodes the PRG corresponding to the two RBs, for example, when an eNB can use only one PMI (for example, use the PMI1) to precode the two RBs that belong to the same PRG, the base station does not know a corresponding CQI for precoding the second RB by using the PMI1. Therefore, the base station cannot correctly select a modulation and coding scheme when sending data. On the other hand, if an excessively large granularity of the subband is defined, and when channel frequency selection is great, in a subband, only one PMI cannot desirably match channels of all RBs in the subband, which decreases the feedback precision. Therefore, by defining that the granularity of the subband is the same as the granularity of the PRG, a feedback mode can be effectively utilized, thereby enhancing system performance.

Figure 5:
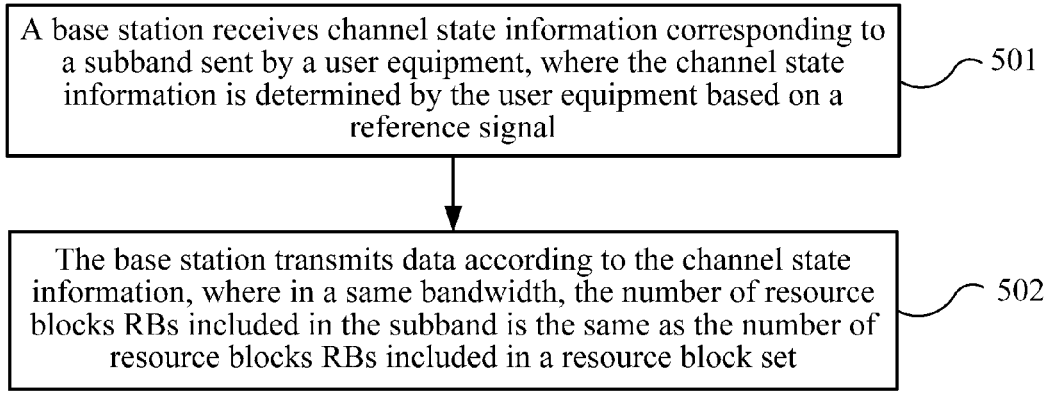
FIG. 5 is a flowchart of a method for receiving channel state information according to another embodiment of the present invention.

FIG. 5 is a flowchart of a method for receiving channel state information according to another embodiment of the present invention. The method in FIG. 5 is executed by a base station, and corresponds to the method in FIG. 3. Therefore, description repeating that in the embodiment in FIG. 3 is properly omitted.

501. The base station receives channel state information corresponding to each subband in a system bandwidth sent by a user equipment, where the channel state information corresponding to each subband in the system bandwidth is determined by the user equipment based on a reference signal.

502. The base station transmits data according to the channel state information corresponding to each subband in the system bandwidth, where the number of resource blocks RBs included in each subband in the system bandwidth is the same as the number of resource blocks RBs included in a corresponding resource block set.

By means of the foregoing solution, a base station transmits data according to channel state information corresponding to a subband sent by a user equipment, where the channel state information corresponding to each subband in a system bandwidth is determined by the user equipment based on a reference signal. The number of resource blocks RBs included in the subband is the same as the number of resource blocks RBs included in a resource block set. In this way, precision of channel state information feedback can be increased, and proper selection of a granularity of the subband effectively enhances system performance.

It should be noted that the subband is in a one-to-one correspondence with the resource block set in the system bandwidth. In the embodiment of the present invention, a resource block set in the system bandwidth includes M RBs, where the M is a positive integer, and a subband corresponding to the resource block set also includes M RBs. Optionally, when the M>1, the M RBs are consecutive M RBs. It should be understood that the number of multiple subbands (or the number of resource block sets) included in the system bandwidth is not limited in the embodiment of the present invention.

Optionally, as an embodiment, the channel state information includes at least one of the following: a rank indicator RI, a PMI, and a CQI. It should be understood that the embodiment of the present invention is not limited thereto. In a PUSCH3-2 feedback mode, the user equipment feeds back both the PMI and the CQI to the base station.

Optionally, as another embodiment, the resource block set may be an RBG or a PRG.

Optionally, in a possible implementation manner, for a resource allocation type 0 (Type 0) of a PDSCH, a resource is allocated by RBG. It may be defined that the granularity of the subband (for example, in the PUSCH3-2 feedback mode) is the same as the granularity of the RBG, which may be schematically shown in the foregoing Table 1.

In another possible implementation manner, it may be defined that the granularity of the subband (for example, in the PUSCH3-2 feedback mode) is the same as the granularity of a PRG defined in an LTE R10 system, which may be schematically shown in the foregoing Table 2.

Furthermore, in the PUSCH3-2 feedback mode, in the case of the system bandwidth (the number of RBs)≤10 RBs, when the system bandwidth is 6 or 7 RBs, no subband is defined and only a wideband is defined; when the system bandwidth is 8-10 RBs, a size of the subband corresponding to PUSCH3-2 is 1 RB, which may be schematically shown in the foregoing Table 3. Alternatively, when the system bandwidth is 6-10 RBs, a size of the subband corresponding to PUSCH3-2 is 1 RB, which may be schematically shown in the foregoing Table 4.

Optionally, in the system bandwidth, the RB included in each subband may be the same as the RB included in the corresponding resource block set.

Optionally, when the channel state information includes the precoding matrix indicator PMI and the channel quality indicator CQI, in step 502, the base station may determine, according to the CQI corresponding to each subband in the system bandwidth, a resource block set used for sending the data, precode the data according to the PMI corresponding to the subband corresponding to the determined resource block set, and transmit the data on in RB of the determined resource block set.

Optionally, when the channel state information includes the precoding matrix indicator PMI, in step 502, the base station may precode the data according to the PMI corresponding to the subband corresponding to the resource block set, and transmit the data in an RB of the resource block set.

Optionally, when the channel state information includes the channel quality indicator CQI, in step 502, the base station may determine, according to the CQI corresponding to each subband in the system bandwidth, a resource block set used for sending the data, and transmit the data in an RB of the resource block set.

The base station uses a same precoding matrix to precode multiple RBs of a same PRG inside one system bandwidth. Therefore, the base station may perform coordinated channel estimation on the multiple RBs of the same PRG. It is defined that the granularity of the subband is the same as the granularity of the PRG, which can effectively utilize a feedback mode and enhance system performance. For a specific example, reference may be made to the foregoing description, which is not described herein again.

Figure 6:
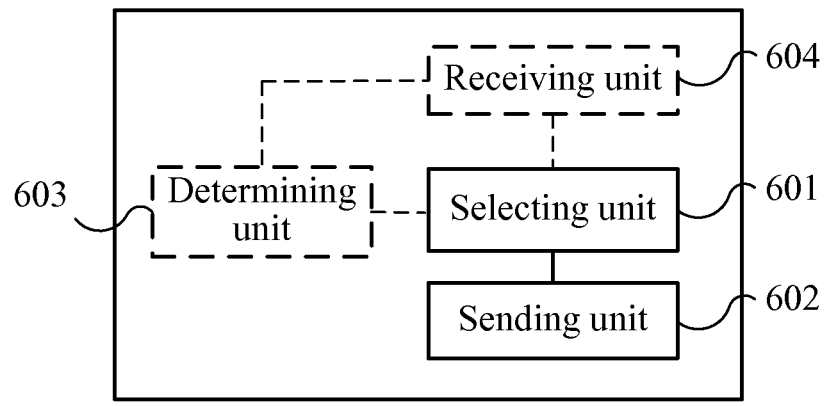
FIG. 6 is a structural block diagram of a receive end according to an embodiment of the present invention.

FIG. 6 is a structural block diagram of a receive end according to an embodiment of the present invention. A receive end 600 includes a selecting unit 601 and a sending unit 602.

The selecting unit 601 is configured to select a precoding matrix W from a codebook based on a reference signal, where a coefficient α is used to perform phase adjustment on $\phi_n$ in the W, the $\phi_n$ represents a phase difference between weighted values of a first antenna group of a transmit end and a second antenna group of the transmit end for a transmission signal from a same transmission layer, the n is a non-negative integer, the $$\varphi_n = e^{\frac{j2\pi n}{Q}},$$

the Q is a positive integer, and the first antenna group and the second antenna group belong to a same multi-antenna system.

The sending unit 602 is configured to send a precoding matrix indicator PMI to the transmit end, so that the transmit end determines, according to the PMI, the precoding matrix W selected by the selecting unit 601.

The multi-antenna system refers to a system in which the transmit end (for example, a base station) and the receive end (for example, a UE) perform communication by using multiple antennas. In contrast to a single-antenna system, multiple antennas of the transmit end and the receive end can form a spatial diversity gain or multiplexing gain, which can effectively improve transmission reliability and increase a system capacity. The diversity gain and multiplexing gain in the multi-antenna system may generally be obtained by using a precoding method at the transmit end and a receive combining algorithm at the receive end. For example, in an LTE system, the transmit end uses 4 antennas, whereas the receive end uses 2 antennas.

In addition, the multi-antenna system in the embodiment of the present invention may also be applied to a scenario of coordinated multi-point transmission. The coordinated multi-point transmission indicates that multiple transmit ends perform coordinated signal transmission for a same user. For example, a transmit end A has 2 antennas, a transmit end B also has 2 antennas, and the two transmit ends perform coordinated transmission for a receive end at the same time. Therefore, a signal received by the receive end may be regarded as a signal sent by a 4-antenna base station.

In the embodiment of the present invention, a receive end selects a precoding matrix W from a codebook based on a reference signal, where a coefficient α is used to perform phase adjustment on $\phi_n$ in the W, the $\phi_n$ represents a phase difference between weighted values of a first antenna group of a transmit end and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system. In this way, using the coefficient α to perform the phase adjustment on the $\phi_n$ can increase a size of a codebook set applicable to different antenna configurations, and improve precision of the receive end to feed back a PMI.

In the embodiment of the present invention, the transmit end may be a base station, and correspondingly, the receive end may be a UE; or the transmit end may be a UE, and correspondingly, the receive end may be a base station. It should be understood that the embodiment of the present invention is not limited thereto.

The receive end 600 may implement steps involving a receive end in the methods in FIG. 1 and FIG. 2, which are not described in detail to avoid repetition.

Optionally, as an embodiment, the receive end 600 may further include a determining unit 603. The determining unit 603 is configured to determine a rank indicator based on the reference signal, where the rank indicator corresponds to the number of useful transmission layers. The selecting unit 601 is specifically configured to select, from the codebook based on the reference signal, the precoding matrix W corresponding to the rank indicator determined by the determining unit 603.

Specifically, when the rank indicator determined by the determining unit 603 is 1, the precoding matrix selected by the selecting unit 601 may be the foregoing formula (1); or when the rank indicator determined by the determining unit 603 is 2, the precoding matrix selected by the selecting unit 601 may be any one of the foregoing formulas (2) to (4). Optionally, the $W_1$ is a matrix representing a channel characteristic of a wideband, and the $W_2$ is a matrix representing a channel characteristic of a subband.

The foregoing example is only exemplary but is not to limit the scope of the present invention. The codebook in the present invention may further be a codebook whose rank indicator has another value. For ease of description, in the present invention, a codebook whose rank indicator is 1 and a codebook whose rank indicator is 2 are used as an example for description, and it should be understood that the present invention is not limited thereto.

It should be further understood that the foregoing codebook is represented in a structural form of double codebooks, and certainly may also be represented in a structural form of a single codebook, which is not limited in the present invention.

Optionally, the coefficient $\alpha = e^{j2\pi \cdot f(m1)}$, where the $f(m_1)$ represents a function of the $m_1$; in other words, the coefficient α is determined by the m1. Alternatively, the $\alpha = e^{j2\pi \cdot f(m2)}$, where the $f(m_2)$ represents a function of the $m_2$; in other words, the coefficient α is determined by the m2. Because the coefficient α is determined by the m1 and m2, no additional feedback resource needs to be added for feeding back the coefficient α. Specifically, a value of the coefficient α may be determined in any manner of the foregoing formulas (5) to (8).

It should be understood that the manner of determining the value of the coefficient α is not limited in the embodiment of the present invention.

For a specific example, reference may be made to the foregoing description, which is not described herein again.

Optionally, the precoding matrix indicator PMI sent by the sending unit 602 may include a first precoding matrix indicator $PMI_1$ and a second precoding matrix indicator $PMI_2$, where the $PMI_1$ is used for indicating the $W_1$, and the $PMI_2$ is used for indicating $W_2^1$ or $W_2^2$. When the $W_1$ is a matrix representing a long-term channel characteristic, and the $W_2$ is a matrix representing a short-term channel characteristic, correspondingly, the sending unit 602 may send the $PMI_1$ to the transmit end at a long interval and send the $PMI_2$ to the transmit end at a short interval.

Optionally, as another embodiment, the selecting unit 601 may further be configured to perform row permutation or column permutation on the precoding matrix W according to an antenna serial number. It should be noted that manners of representing the foregoing codebook (or precoding matrix) by using other equivalent matrixes all fall within the scope of the present invention.

Optionally, the sending unit 602 may send the precoding matrix indicator PMI to the transmit end through a physical control channel or a physical shared channel. It should be understood that the embodiment of the present invention is not limited thereto.

Optionally, as another embodiment, the receive end 600 may further include a receiving unit 604. The receiving unit 604 is configured to receive the reference signal sent by the transmit end. The determining unit 603 is specifically configured to determine the rank indicator based on the reference signal received by the receiving unit 604; or the selecting unit 601 is specifically configured to select the precoding matrix W from the codebook based on the reference signal received by the receiving unit 604. The reference signal includes at least one of the following: a CSI RS, a DM RS, a CRS, and the like.

Figure 7:
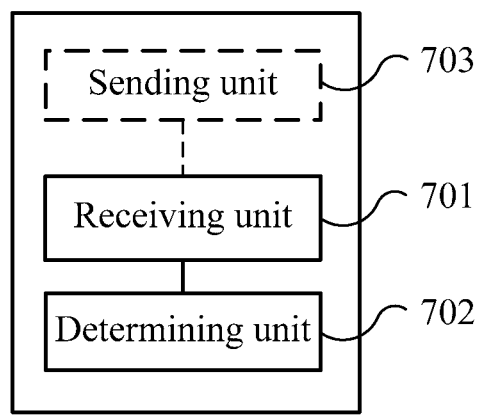
FIG. 7 is a structural block diagram of a transmit end according to an embodiment of the present invention.

FIG. 7 is a structural block diagram of a transmit end according to an embodiment of the present invention. A transmit end 700 in FIG. 7 includes a receiving unit 701 and a determining unit 702.

The receiving unit 701 is configured to receive a precoding matrix indicator PMI sent by a receive end.

The determining unit 702 is configured to determine, according to the precoding matrix indicator PMI received by the receiving unit 701, a precoding matrix W selected from a codebook by the receive end based on a reference signal, where a coefficient α is used to perform phase adjustment on $\phi_n$ in the W, the $\phi_n$ represents a phase difference between weighted values of a first antenna group of the transmit end and a second antenna group of the transmit end for a transmission signal from a same transmission layer, the $$\varphi_n = e^{\frac{j2\pi n}{Q}},$$

the n is a non-negative integer, the Q is a positive integer, and the first antenna group and the second antenna group belong to a same multi-antenna system.

In the embodiment of the present invention, a transmit end receives a PMI sent by a receive end, and determines, according to the precoding matrix indicator PMI, a precoding matrix W selected from a codebook by the receive end based on a reference signal, where a coefficient α is used to perform phase adjustment on $\phi_n$ in the W, the $\phi_n$ represents a phase difference between weighted values of a first antenna group of the transmit end and a second antenna group of the transmit end for a transmission signal from a same transmission layer, the $$\varphi_n \in \left\{ e^{\frac{j2\pi n}{Q}} \right\},$$

the Q is a positive integer, the n is a non-negative integer, and the first antenna group and the second antenna group belong to a same multi-antenna system. In this way, using the coefficient α to perform the phase adjustment on the $\phi_n$ can increase a size of a codebook set applicable to different antenna configurations, and improve precision of the receive end to feed back a PMI.

The transmit end 700 may implement steps involving a transmit end in the methods in FIG. 1 and FIG. 2, which are not described in detail to avoid repetition.

Optionally, as an embodiment, the precoding matrix W corresponds to a rank indicator, and the rank indicator corresponds to the number of useful transmission layers.

Specifically, a codebook whose rank indicator is 1 may be the foregoing formula (1); or a codebook whose rank indicator is 2 may be any one of the foregoing formulas (2) to (4). Optionally, the $W_1$ is a matrix representing a channel characteristic of a wideband, and the $W_2$ is a matrix representing a channel characteristic of a subband.

The codebook in the present invention may further be a codebook whose rank indicator has another value. For ease of description, in the present invention, the codebook whose rank indicator is 1 and the codebook whose rank indicator is 2 are used as an example for description, and it should be understood that the present invention is not limited thereto.

It should be further understood that the foregoing codebook is represented in a structural form of a single codebook, and certainly may also be represented in a structural form of double codebooks, which is not limited in the present invention.

Optionally, the coefficient $\alpha = e^{j2\pi \cdot f(m_1)}$, where the $f(m_1)$ represents a function of the $m_1$; in other words, the coefficient α is determined by the m1. Alternatively, the $\alpha = e^{j2\pi \cdot f(m_2)}$, where the $f(m_2)$ represents a function of the $m_2$; in other words, the coefficient α is determined by the m2. Because the coefficient α is determined by the m1 and m2, no additional feedback resource needs to be added for feeding back the coefficient α. Specifically, a value of the coefficient α may be determined in any manner of the foregoing formulas (5) to (8).

It should be understood that the manner of determining the value of the coefficient α is not limited in the embodiment of the present invention.

For a specific example, reference may be made to the foregoing description, which is not described herein again.

Optionally, the precoding matrix indicator PMI that the receiving unit 701 may be specifically configured to receive may include a first precoding matrix indicator $PMI_1$ and a second precoding matrix indicator $PMI_2$. Optionally, the $PMI_1$ and the $PMI_2$ may have a same or different time domain or frequency domain granularities (or may be based on different subframe periods or subband sizes). When the $W_1$ is a matrix representing a long-term channel characteristic, and the $W_2$ is a matrix representing a short-term channel characteristic, correspondingly, the receiving unit 701 may be specifically configured to receive, at a long interval, the $PMI_1$ sent by the receive end, and receive, at a short interval, the $PMI_2$ sent by the receive end. The determining unit 702 may be specifically configured to determine, according to the $PMI_1$, the $W_1$ selected from the codebook by the receive end based on the reference signal, and determine, according to the $PMI_2$, the $W_2$ selected from the codebook by the receive end.

Correspondingly, the determining unit 702 may further be specifically configured to determine the precoding matrix W according to the $W_1$ and the $W_2$.

Certainly, the determining unit 702 may be specifically configured to determine directly, according to one PMI received by the receiving unit 701 and sent by the receive end, the selected precoding matrix W. For example, a codebook has 256 precoding matrixes in total. When the PMI received by the receiving unit 701 and sent by the receive end is 0, the determining unit 702 determines that the receive end selects a 1st precoding matrix of the 256 precoding matrixes from the codebook; when the PMI received by the receiving unit 701 and sent by the receive end is 1, the determining unit 702 determines that the receive end selects a 2nd precoding matrix of the 256 precoding matrixes from the codebook; .... That is, the values 0 to 255 of the PMI correspond to the 256 precoding matrixes, respectively. It should be understood that a manner in which a UE indicates a precoding matrix is not limited in the embodiment of the present invention.

Optionally, the receiving unit 701 may receive, through a physical control channel or a physical shared channel, the precoding matrix indicator PMI sent by the receive end. It should be understood that the embodiment of the present invention is not limited thereto.

Optionally, as another embodiment, the transmit end 700 may further include a sending unit 703. The sending unit 703 is configured to send the reference signal to the receive end, so that the receive end selects the precoding matrix W from the codebook based on the reference signal. The reference signal includes at least one of the following: a CSI RS, a DM RS, a CRS, and the like.

Figure 8:
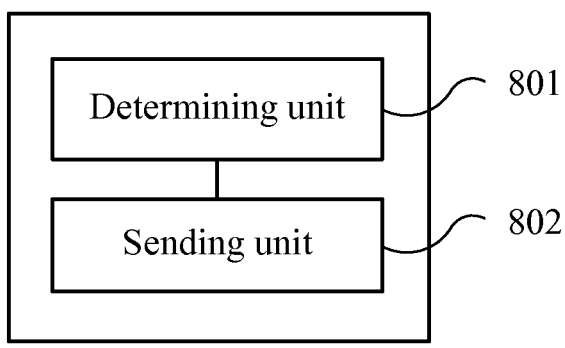
FIG. 8 is a structural block diagram of a user equipment according to an embodiment of the present invention.

FIG. 8 is a structural block diagram of a user equipment according to an embodiment of the present invention. A user equipment 800 includes a determining unit 801 and a sending unit 802.

The determining unit 801 is configured to determine, based on a reference signal, channel state information corresponding to each subband in a system bandwidth.

The sending unit 802 is configured to send, to a base station, the channel state information corresponding to each subband in the system bandwidth determined by the determining unit 801. The number of resource blocks RBs included in each subband in the system bandwidth is the same as the number of resource blocks RBs included in a corresponding resource block set.

By means of the foregoing solution, a user equipment determines, based on a reference signal, channel state information corresponding to each subband in a system bandwidth and sends the channel state information to a base station. The number of resource blocks RBs included in the subband is the same as the number of resource blocks RBs included in a resource block set. Therefore, precision of channel state information feedback can be increased, and proper selection of a granularity of the subband effectively enhances system performance.

It should be noted that, the subband is in a one-to-one correspondence with the resource block set in the system bandwidth. In the embodiment of the present invention, a resource block set in the system bandwidth includes M RBs, where the M is a positive integer, and a subband corresponding to the resource block set also includes M RBs. Optionally, when the M>1, the M RBs are consecutive M RBs. It should be understood that the number of multiple subbands (or the number of resource block sets) included in the system bandwidth is not limited in the embodiment of the present invention.

The user equipment 800 may implement steps involving a receive end in the methods in FIG. 3 to FIG. 5, which are not described in detail to avoid repetition.

Optionally, as an embodiment, the channel state information includes at least one of the following: a rank indicator RI, a PMI, and a CQI. It should be understood that the embodiment of the present invention is not limited thereto. In a PUSCH3-2 feedback mode, the user equipment feeds back both the PMI and the CQI to the base station.

Optionally, as another embodiment, the resource block set may be an RBG or a PRG.

Optionally, in a possible implementation manner, for a resource allocation type 0 (Type 0) of a PDSCH, a resource is allocated by RBG. It may be defined that the granularity of the subband (for example, in the PUSCH3-2 feedback mode) is the same as the granularity of the RBG, which may be schematically shown in the foregoing Table 1.

In another possible implementation manner, it may be defined that the granularity of the subband (for example, in the PUSCH3-2 feedback mode) is the same as the granularity of a PRG defined in an LTE R10 system, which may be schematically shown in the foregoing Table 2.

Furthermore, in the PUSCH3-2 feedback mode, in the case of the system bandwidth (the number of RBs)≤10 RBs, when the system bandwidth is 6 or 7 RBs, no subband is defined, and only a wideband is defined; when the system bandwidth is 8-10 RBs, a size of the subband corresponding to PUSCH3-2 is 1 RB, which may be schematically shown in the foregoing Table 3. Alternatively, when the system bandwidth is 6-10 RBs, a size of the subband corresponding to PUSCH3-2 is 1 RB, which may be schematically shown in the foregoing Table 4.

Optionally, in the system bandwidth, the RB included in each subband may be the same as the RB included in the corresponding resource block set. The base station uses a same precoding matrix to precode multiple RBs of a same PRG inside one system bandwidth. Therefore, the base station may perform coordinated channel estimation on the multiple RBs of the same PRG. It is defined that the granularity of the subband is the same as the granularity of the PRG, which can effectively utilize a feedback mode and enhance system performance.

For a specific example, reference may be made to the foregoing description, which is not described herein again.

Figure 9:
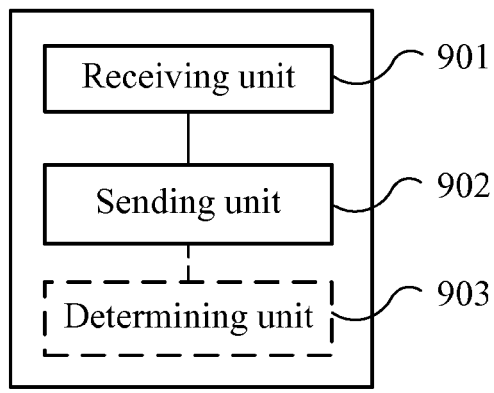
FIG. 9 is a structural block diagram of a base station according to an embodiment of the present invention.

FIG. 9 is a structural block diagram of a base station according to an embodiment of the present invention. A base station 900 in FIG. 9 includes a receiving unit 901 and a sending unit 902.

The receiving unit 901 is configured to receive channel state information corresponding to each subband in a system bandwidth sent by a user equipment, where the channel state information corresponding to each subband in the system bandwidth is determined by the user equipment based on a reference signal.

The sending unit 902 is configured to transmit data according to the channel state information corresponding to each subband in the system bandwidth received by the receiving unit 901, where the number of resource blocks RBs included in each subband in the system bandwidth is the same as the number of resource blocks RBs included in a corresponding resource block set.

By means of the foregoing solution, a base station transmits data according to channel state information corresponding to a subband sent by a user equipment, where the channel state information corresponding to each subband in a system bandwidth is determined by the user equipment based on a reference signal. The number of resource blocks RBs included in the subband is the same as the number of resource blocks RBs included in a resource block set. In this way, precision of channel state information feedback can be increased, and proper selection of a granularity of the subband effectively enhances system performance.

It should be noted that the subband is in a one-to-one correspondence with the resource block set in the system bandwidth. In the embodiment of the present invention, a resource block set in the system bandwidth includes M RBs, where the M is a positive integer, and a subband corresponding to the resource block set also includes M RBs. Optionally, when the M>1, the M RBs are consecutive M RBs. It should be understood that the number of multiple subbands (or the number of resource block sets) included in the system bandwidth is not limited in the embodiment of the present invention.

The base station 900 may implement steps involving a transmit end in the methods in FIG. 3 to FIG. 5, which are not described in detail to avoid repetition.

Optionally, as an embodiment, the channel state information includes at least one of the following: a rank indicator RI, a PMI, and a CQI. It should be understood that the embodiment of the present invention is not limited thereto. In a PUSCH3-2 feedback mode, the user equipment feeds back both the PMI and the CQI to the base station.

Optionally, as another embodiment, the resource block set may be an RBG or a PRG.

Optionally, in a possible implementation manner, for a resource allocation type 0 (Type 0) of a PDSCH, a resource is allocated by RBG. It may be defined that the granularity of the subband (for example, in the PUSCH3-2 feedback mode) is the same as the granularity of the RBG, which may be schematically shown in the foregoing Table 1.

In another possible implementation manner, it may be defined that the granularity of the subband (for example, in the PUSCH3-2 feedback mode) is the same as the granularity of a PRG defined in an LTE R10 system, which may be schematically shown in the foregoing Table 2.

Furthermore, in the PUSCH3-2 feedback mode, in the case of the system bandwidth (the number of RBs)≤10 RBs, when the system bandwidth is 6 or 7 RBs, no subband is defined, and only a wideband is defined; when the system bandwidth is 8-10 RBs, a size of the subband corresponding to PUSCH3-2 is 1 RB, which may be schematically shown in the foregoing Table 3. Alternatively, when the system bandwidth is 6-10 RBs, a size of the subband corresponding to PUSCH3-2 is 1 RB, which may be schematically shown in the foregoing Table 4.

Optionally, in the system bandwidth, the RB included in each subband may be the same as the RB included in the corresponding resource block set.

Optionally, in the case in which the channel state information includes the precoding matrix indicator PMI and the channel quality indicator CQI, the base station 900 may further include a determining unit 903. The determining unit 903 is configured to determine, according to the CQI corresponding to each subband in the system bandwidth, a resource block set used for sending the data. The sending unit 902 precodes data according to the PMI corresponding to the subband corresponding to the resource block set determined by the determining unit 903, and transmits the data in an RB of the determined resource block set.

Optionally, in the case in which the channel state information includes the precoding matrix indicator PMI, the sending unit 902 may further be configured to precode the data according to the PMI corresponding to the subband corresponding to the resource block set, and transmit the data in an RB of the resource block set.

Optionally, in the case in which the channel state information includes the precoding matrix indicator PMI, the sending unit 902 may further be configured determine, according to the CQI corresponding to each subband in the system bandwidth, a resource block set used for sending the data, and transmit the data in an RB of the resource block set.

The base station uses a same precoding matrix to precode multiple RBs of a same PRG inside one system bandwidth. Therefore, the base station may perform coordinated channel estimation on the multiple RBs of the same PRG. It is defined that the granularity of the subband is the same as the granularity of the PRG, which can effectively utilize a feedback mode and enhance system performance.

For a specific example, reference may be made to the foregoing description, which is not described herein again.

Figure 10:
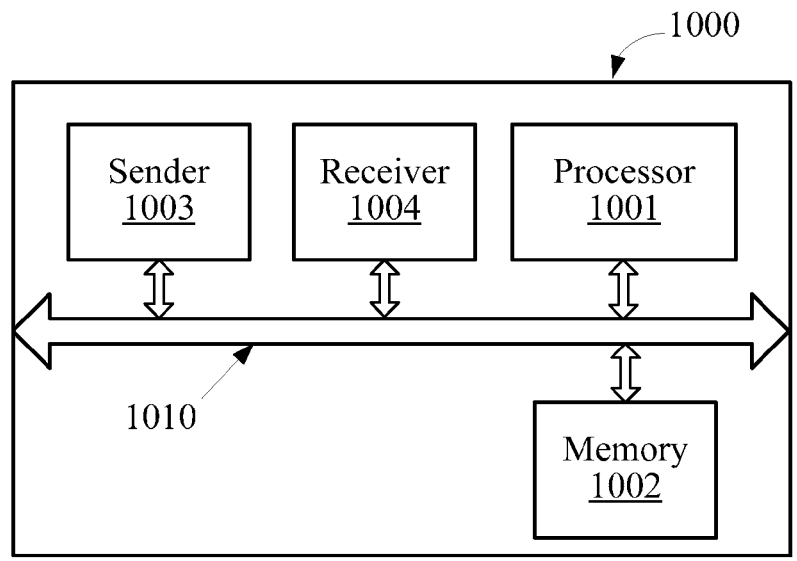
FIG. 10 is a block diagram of a device according to an embodiment of the present invention.

In the embodiments of the present invention, apparatus embodiments for implementing steps and methods in the foregoing method embodiments are further provided. FIG. 10 shows an embodiment of a device. In this embodiment, a device 1000 includes a processor 1001, a memory 1002, a sender 1003, and a receiver 1004. The processor 1001 controls an operation of the device 1000. The processor 1001 may further be referred to as a CPU (Central Processing Unit, central processing unit). The memory 1002 may include a read-only memory and a random access memory, and provide the processor 1001 with an instruction and data. A part of the memory 1002 may further include a non-volatile random access memory (NVRAM). The processor 1001, the memory 1002, the sender 1003, and the receiver 1004 are coupled together by means of a bus system 1010, where the bus system 1010 includes a power bus, a control bus, and a status signal bus in addition to a data bus. However, for clear description, the buses in the drawing are all marked as the bus system 1010.

The foregoing device 1000 may be applied in the methods disclosed in the foregoing embodiments of the present invention. The processor 1001 may be an integrated circuit chip and has a signal processing capability. In the implementation process, the steps of the foregoing methods may be implemented by an integrated logic circuit of hardware or an instruction in a software form in the processor 1001.

Figure 11:
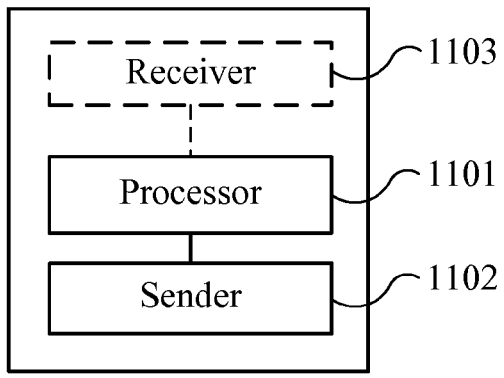
FIG. 11 is a structural block diagram of a receive end according to another embodiment of the present invention.

Furthermore, FIG. 11 is a structural block diagram of a receive end according to another embodiment of the present invention. A receive end 1100 includes a processor 1101 and a sender 1102.

The processor 1101 is configured to select a precoding matrix W from a codebook based on a reference signal, where a coefficient α is used to perform phase adjustment on $\phi_n$ in the W, the $\phi_n$ represents a phase difference between weighted values of a first antenna group of a transmit end and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system.

The sender 1102 is configured to send a precoding matrix indicator PMI to the transmit end, so that the transmit end determines, according to the PMI, the precoding matrix W selected by the processor 1101.

The multi-antenna system refers to a system in which the transmit end (for example, a base station) and the receive end (for example, a UE) perform communication by using multiple antennas. In contrast to a single-antenna system, multiple antennas of the transmit end and the receive end can form a spatial diversity gain or multiplexing gain, which can effectively improve transmission reliability and increase a system capacity. The diversity gain and multiplexing gain in the multi-antenna system may generally be obtained by using a precoding method at the transmit end and a receive combining algorithm at the receive end. For example, in an LTE system, the transmit end uses 4 antennas, whereas the receive end uses 2 antennas.

In addition, the multi-antenna system in the embodiment of the present invention may also be applied to a scenario of coordinated multi-point transmission. The coordinated multi-point transmission indicates that multiple transmit ends perform coordinated signal transmission for a same user. For example, a transmit end A has 2 antennas, a transmit end B also has 2 antennas, and the two transmit ends perform coordinated transmission for a receive end at the same time. Therefore, a signal received by the receive end may be regarded as a signal sent by a 4-antenna base station.

In the embodiment of the present invention, a receive end selects a precoding matrix W from a codebook based on a reference signal, where a coefficient $\alpha$ is used to perform phase adjustment on $\phi_n$ in the W, the $\phi_n$ represents a phase difference between weighted values of a first antenna group of a transmit end and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system. In this way, using the coefficient $\alpha$ to perform the phase adjustment on the $\phi_n$ can increase a size of a codebook set applicable to different antenna configurations, and improve precision of the receive end to feed back a PMI.

In the embodiment of the present invention, the transmit end may be a base station, and correspondingly, the receive end may be a UE; or the transmit end may be a UE, and correspondingly, the receive end may be a base station. It should be understood that the embodiment of the present invention is not limited thereto.

The receive end 1100 may implement steps involving a receive end in the methods in FIG. 1 and FIG. 2, which are not described in detail to avoid repetition.

Optionally, as an embodiment, the processor 1101 may further be configured to determine a rank indicator based on the reference signal, where the rank indicator corresponds to the number of useful transmission layers. The processor 1101 is specifically configured to select, from the codebook based on the reference signal, the precoding matrix W corresponding to the determined rank indicator.

Specifically, when the rank indicator determined by the processor 1101 is 1, the selected precoding matrix may be the foregoing formula (1); or when the rank indicator determined by the processor 1101 is 2, the selected precoding matrix may be any one of the foregoing formulas (2) to (4). Optionally, the $W_1$ is a matrix representing a channel characteristic of a wideband, and the $W_2$ is a matrix representing a channel characteristic of a subband.

The foregoing example is only exemplary but is not to limit the scope of the present invention. The codebook in the present invention may further be a codebook whose rank indicator has another value. For ease of description, in the present invention, the codebook whose rank indicator is 1 and the codebook whose rank indicator is 2 are used as an example for description, and it should be understood that the present invention is not limited thereto.

It should be further understood that the foregoing codebook is represented in a structural form of double codebooks, and certainly may also be represented in a structural form of a single codebook, which is not limited in the present invention.

Optionally, the coefficient $\alpha = e^{j2\pi \cdot f(m1)}$, where the $f(m_1)$ represents a function of the $m_1$; in other words, the coefficient $\alpha$ is determined by the m1. Alternatively, the $\alpha = e^{j2\pi \cdot f(m2)}$, where the $f(m_2)$ represents a function of the $m_2$; in other words, the coefficient $\alpha$ is determined by the m2. Because the coefficient $\alpha$ is determined by the m1 and m2, no additional feedback resource needs to be added for feeding back the coefficient $\alpha$. Specifically, a value of the coefficient $\alpha$ may be determined in any manner of the foregoing formulas (5) to (8).

It should be understood that the manner of determining the value of the coefficient $\alpha$ is not limited in the embodiment of the present invention.

For a specific example, reference may be made to the foregoing description, which is not described herein again.

Optionally, the precoding matrix indicator PMI sent by the sender 1102 may include a first precoding matrix indicator $PMI_1$ and a second precoding matrix indicator $PMI_2$. The $PMI_1$ is used for indicating the $W_1$, and the $PMI_2$ is used for indicating $W_2^1$ or $W_2^2$. When the $W_1$ is a matrix representing a long-term channel characteristic, and the $W_2$ is a matrix representing a short-term channel characteristic, correspondingly, the sender 1102 may be configured to send the $PMI_1$ to the transmit end at a long interval and send the $PMI_2$ to the transmit end at a short interval.

Optionally, as another embodiment, the processor 1101 may further be configured to perform row permutation or column permutation on the precoding matrix W according to an antenna serial number. It should be noted that manners of representing the foregoing codebook (or precoding matrix) by using other equivalent matrixes all fall within the scope of the present invention.

Optionally, the sender 1102 may send the precoding matrix indicator PMI to the transmit end through a physical control channel or a physical shared channel. It should be understood that the embodiment of the present invention is not limited thereto.

Optionally, as another embodiment, the receive end 1100 may further include a receiver 1103. The receiver 1103 is configured to receive the reference signal sent by the transmit end. The processor 1101 is specifically configured to determine the rank indicator based on the reference signal received by the receiver 1103; or the processor 1101 is specifically configured to select the precoding matrix W from the codebook based on the reference signal received by the receiver 1103. The reference signal includes at least one of the following: a CSI RS, a DM RS, a CRS, and the like.

Figure 12:
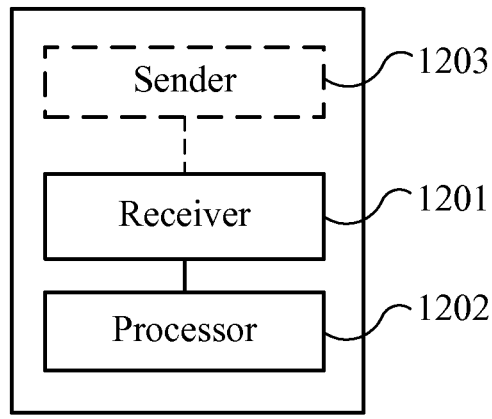
FIG. 12 is a structural block diagram of a transmit end according to another embodiment of the present invention.

FIG. 12 is a structural block diagram of a transmit end according to an embodiment of the present invention. A transmit end 1200 in FIG. 12 includes a receiver 1201 and a processor 1202.

The receiver 1201 is configured to receive a precoding matrix indicator PMI sent by a receive end.

The processor 1202 is configured to determine, according to the precoding matrix indicator PMI received by the receiver 1201, a precoding matrix W selected from a codebook by the receive end based on a reference signal, where a coefficient α is used to perform phase adjustment on $\phi_n$ in the W, the $\phi_n$ represents a phase difference between weighted values of a first antenna group of the transmit end and a second antenna group of the transmit end for a transmission signal from a same transmission layer, the $$\varphi_n \in \{e^{\frac{j2\pi n}{Q}}\},$$

the n is a non-negative integer, the Q is a positive integer, and the first antenna group and the second antenna group belong to a same multi-antenna system.

In the embodiment of the present invention, a transmit end receives a PMI sent by a receive end, and determines, according to the precoding matrix indicator PMI, a precoding matrix W selected from a codebook by the receive end based on a reference signal, where a coefficient α is used to perform phase adjustment on $\phi_n$ in the W, the $\phi_n$ represents a phase difference between weighted values of a first antenna group of the transmit end and a second antenna group of the transmit end for a transmission signal from a same transmission layer, the $$\varphi_n \in \{e^{\frac{j2\pi n}{Q}}\},$$

the n is a non-negative integer, the Q is a positive integer, and the first antenna group and the second antenna group belong to a same multi-antenna system. In this way, using the coefficient α to perform the phase adjustment on the $\phi_n$ can increase a size of a codebook set applicable to different antenna configurations, and improve precision of the receive end to feed back a PMI.

The transmit end 1200 may implement steps involving a transmit end in the methods in FIG. 1 and FIG. 2, which are not described in detail to avoid repetition.

Optionally, as an embodiment, the precoding matrix W corresponds to a rank indicator, and the rank indicator corresponds to the number of useful transmission layers.

Specifically, a codebook whose rank indicator is 1 may be the foregoing formula (1); or a codebook whose rank indicator is 2 may be any one of the foregoing formulas (2) to (4). Optionally, the $W_1$ is a matrix representing a channel characteristic of a wideband, and the $W_2$ is a matrix representing a channel characteristic of a subband.

The codebook in the present invention may further be a codebook whose rank indicator has another value. For ease of description, in the present invention, the codebook whose rank indicator is 1 and the codebook whose rank indicator is 2 are used as an example for description, and it should be understood that the present invention is not limited thereto.

It should be further understood that the foregoing codebook is represented in a structural form of a single codebook, and certainly may also be represented in a structural form of double codebooks, which is not limited in the present invention.

Optionally, the coefficient $\alpha = e^{j2\pi \cdot f(m_1)}$, where the $f(m_1)$ represents a function of the $m_1$; in other words, the coefficient α is determined by the m1. Alternatively, the $\alpha = e^{j2\pi \cdot f(m_2)}$, where the $f(m_2)$ represents a function of the $m_2$; in other words, the coefficient α is determined by the m2. Because the coefficient α is determined by the m1 and m2, no additional feedback resource needs to be added for feeding back the coefficient α. Specifically, a value of the coefficient α may be determined in any manner of the foregoing formulas (5) to (8).

It should be understood that the manner of determining the value of the coefficient α is not limited in the embodiment of the present invention.

For a specific example, reference may be made to the foregoing description, which is not described herein again.

Optionally, the precoding matrix indicator PMI that the receiver 1201 may be specifically configured to receive may include a first precoding matrix indicator $PMI_1$ and a second precoding matrix indicator $PMI_2$. Optionally, the $PMI_1$ and the $PMI_2$ may have a same or different time domain or frequency domain granularities (or may be based on different subframe periods or subband sizes). When the $W_1$ is a matrix representing a long-term channel characteristic, and the $W_2$ is a matrix representing a short-term channel characteristic, correspondingly, the receiver 1201 may be specifically configured to receive, at a long interval, the $PMI_1$ sent by the receive end and receive, at a short interval, the $PMI_2$ sent by the receive end. The processor 1202 may be specifically configured to determine, according to the $PMI_1$, the $W_1$ selected from the codebook by the receive end based on the reference signal, and determine, according to the $PMI_2$, the $W_2$ selected from the codebook by the receive end. Correspondingly, the processor 1202 may further be specifically configured to determine the precoding matrix W according to the $W_1$ and the $W_2$.

Certainly, the processor 1202 may be specifically configured to determine directly, according to one PMI received by the receiver 1201 and sent by the receive end, the selected precoding matrix W. For example, a codebook has 256 precoding matrixes in total. When the PMI received by the receiver 1201 and sent by the receive end is 0, the processor 1202 determines that the receive end selects a 1st precoding matrix of the 256 precoding matrixes from the codebook; when the PMI received by the receiver 1201 and sent by the receive end is 1, the processor 1202 determines that the receive end selects a 2nd precoding matrix of the 256 precoding matrixes from the codebook; . . . . That is, the values 0 to 255 of the PMI correspond to the 256 precoding matrixes, respectively. It should be understood that a manner in which a UE indicates a precoding matrix is not limited in the embodiment of the present invention.

Optionally, the receiver 1201 may receive, through a physical control channel or a physical shared channel, the precoding matrix indicator PMI sent by the receive end. It should be understood that the embodiment of the present invention is not limited thereto.

Optionally, as another embodiment, the transmit end 1200 may further include a sender 1203. The sender 1203 is configured to send the reference signal to the receive end, so that the receive end selects the precoding matrix W from the codebook based on the reference signal. The reference signal includes at least one of the following: a CSI RS, a DM RS, a CRS, and the like.

Figure 13:
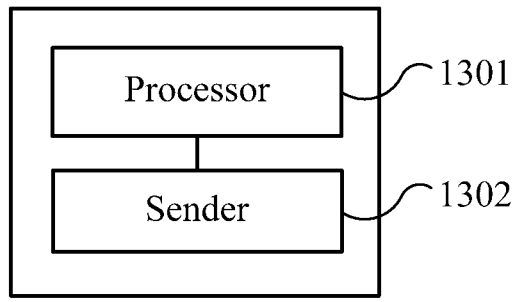
FIG. 13 is a structural block diagram of a user equipment according to another embodiment of the present invention.

FIG. 13 is a structural block diagram of a user equipment according to an embodiment of the present invention. A user equipment 1300 includes a processor 1301 and a sender 1302.

The processor 1301 is configured to determine, based on a reference signal, channel state information corresponding to each subband in a system bandwidth.

The sender 1302 is configured to send, to a base station, the channel state information corresponding to each subband in the system bandwidth determined by the processor 1301. The number of resource blocks RBs included in each subband in the system bandwidth is the same as the number of resource blocks RBs included in a corresponding resource block set.

By means of the foregoing solution, a user equipment determines, based on a reference signal, channel state information corresponding to each subband in a system bandwidth and sends the channel state information to a base station. The number of resource blocks RBs included in the subband is the same as the number of resource blocks RBs included in a resource block set. Therefore, precision of channel state information feedback can be increased, and proper selection of a granularity of the subband effectively enhances system performance.

It should be noted that, the subband is in a one-to-one correspondence with the resource block set in the system bandwidth. In the embodiment of the present invention, a resource block set in the system bandwidth includes M RBs, where the M is a positive integer, and a subband corresponding to the resource block set also includes M RBs. Optionally, when the M>1, the M RBs are consecutive M RBs. It should be understood that the number of multiple subbands (or the number of resource block sets) included in the system bandwidth is not limited in the embodiment of the present invention.

The user equipment 1300 may implement steps involving a receive end in the methods in FIG. 3 to FIG. 5, which are not described in detail to avoid repetition.

Optionally, as an embodiment, the channel state information includes at least one of the following: a rank indicator RI, a PMI, and a CQI. It should be understood that the embodiment of the present invention is not limited thereto. In a PUSCH3-2 feedback mode, the user equipment feeds back both the PMI and the CQI to the base station.

Optionally, as another embodiment, the resource block set may be an RBG or a PRG.

Optionally, in a possible implementation manner, for a resource allocation type 0 (Type 0) of a PDSCH, a resource is allocated by RBG. It may be defined that the granularity of the subband (for example, in the PUSCH3-2 feedback mode) is the same as the granularity of the RBG, which may be schematically shown in the foregoing Table 1.

In another possible implementation manner, it may be defined that the granularity of the subband (for example, in the PUSCH3-2 feedback mode) is the same as the granularity of a PRG defined in an LTE R10 system, which may be schematically shown in the foregoing Table 2.

Furthermore, in the PUSCH3-2 feedback mode, in the case of the system bandwidth (the number of RBs)≤10 RBs, when the system bandwidth is 6 or 7 RBs, no subband is defined, and only a wideband is defined; when the system bandwidth is 8 at least 10 RBs, a size of the subband corresponding to PUSCH3-2 is 1 RB, which may be schematically shown in the foregoing Table 3. Alternatively, when the system bandwidth is 6-10 RBs, a size of the subband corresponding to PUSCH3-2 is 1 RB, which may be schematically shown in the foregoing Table 4.

Optionally, in the system bandwidth, the RB included in each subband may be the same as the RB included in the corresponding resource block set. The base station uses a same precoding matrix to precode multiple RBs of a same PRG inside one system bandwidth. Therefore, the base station may perform coordinated channel estimation on the multiple RBs of the same PRG. It is defined that the granularity of the subband is the same as the granularity of the PRG, which can effectively utilize a feedback mode and enhance system performance.

For a specific example, reference may be made to the foregoing description, which is not described herein again.

Figure 14:
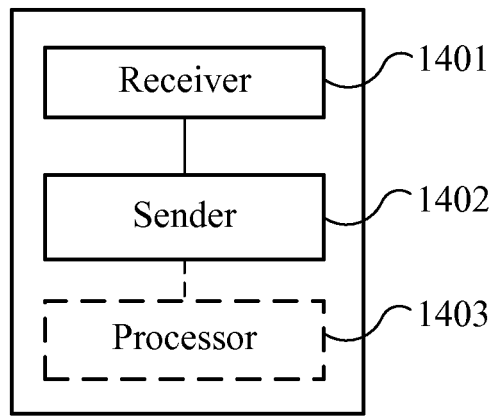
FIG. 14 is a structural block diagram of a base station according to another embodiment of the present invention.

FIG. 14 is a structural block diagram of a base station according to an embodiment of the present invention. A base station 1400 in FIG. 14 includes a receiver 1401 and a sender 1402.

The receiver 1401 is configured to receive channel state information corresponding to each subband in a system bandwidth sent by a user equipment, where the channel state information corresponding to each subband in the system bandwidth is determined by the user equipment based on a reference signal.

The sender 1402 is configured to transmit data according to the channel state information corresponding to each subband in the system bandwidth received by the receiver 1401, where the number of resource blocks RBs included in each subband in the system bandwidth is the same as the number of resource blocks RBs included in a corresponding resource block set.

By means of the foregoing solution, a base station transmits data according to channel state information corresponding to a subband sent by a user equipment, where the channel state information corresponding to each subband in a system bandwidth is determined by the user equipment based on a reference signal. The number of resource blocks RBs included in the subband is the same as the number of resource blocks RBs included in a resource block set. In this way, precision of channel state information feedback can be increased, and proper selection of a granularity of the subband effectively enhances system performance.

It should be noted that, the subband is in a one-to-one correspondence with the resource block set in the system bandwidth. In the embodiment of the present invention, a resource block set in the system bandwidth includes M RBs, where the M is a positive integer, and a subband corresponding to the resource block set also includes M RBs. Optionally, when the M>1, the M RBs are consecutive M RBs. It should be understood that the number of multiple subbands (or the number of resource block sets) included in the system bandwidth is not limited in the embodiment of the present invention.

The base station 1400 may implement steps involving a transmit end in the methods in FIG. 3 to FIG. 5, which are not described in detail to avoid repetition.

Optionally, as an embodiment, the channel state information includes at least one of the following: a rank indicator RI, a PMI, and a CQI. It should be understood that the embodiment of the present invention is not limited thereto. In a PUSCH3-2 feedback mode, the user equipment feeds back both the PMI and the CQI to the base station.

Optionally, as another embodiment, the resource block set may be an RBG or a PRG.

Optionally, in a possible implementation manner, for a resource allocation type 0 (Type 0) of a PDSCH, a resource is allocated by RBG. It may be defined that the granularity of the subband (for example, in the PUSCH3-2 feedback mode) is the same as the granularity of the RBG, which may be schematically shown in the foregoing Table 1.

In another possible implementation manner, it may be defined that the granularity of the subband (for example, in the PUSCH3-2 feedback mode) is the same as the granularity of a PRG defined in an LTE R10 system, which may be schematically shown in the foregoing Table 2.

Furthermore, in the PUSCH3-2 feedback mode, in the case of the system bandwidth (the number of RBs)≤10 RBs, when the system bandwidth is 6 or 7 RBs, no subband is defined, and only a wideband is defined; when the system bandwidth is 8-10 RBs, a size of the subband corresponding to PUSCH3-2 is 1 RB, which may be schematically shown in the foregoing Table 3. Alternatively, when the system bandwidth is 6-10 RBs, a size of the subband corresponding to PUSCH3-2 is 1 RB, which may be schematically shown in the foregoing Table 4.

Optionally, in the system bandwidth, the RB included in each subband may be the same as the RB included in the corresponding resource block set.

Optionally, in the case in which the channel state information includes the precoding matrix indicator PMI and the channel quality indicator CQI, the base station 1400 may further include a processor 1403. The processor 1403 is configured to determine, according to the CQI corresponding to each subband in the system bandwidth, a resource block set used for sending the data, and precode the data according to the PMI corresponding to the subband corresponding to the determined resource block set. The sender 1402 transmits the data in an RB of the resource block set determined by the processor 1403.

Optionally, in the case in which the channel state information includes the precoding matrix indicator PMI, the processor 1403 is configured to precode the data according to the PMI corresponding to the subband corresponding to the resource block set. The sender 1402 may further be configured to transmit the data in an RB of the resource block set.

Optionally, in the case in which the channel state information includes the precoding matrix indicator PMI, the processor 1403 determines, according to the CQI corresponding to each subband in the system bandwidth, a resource block set used for sending the data. The sender 1402 transmits the data in an RB of the resource block set determined by the processor 1403.

The base station uses a same precoding matrix to precode multiple RBs of a same PRG inside one system bandwidth. Therefore, the base station may perform coordinated channel estimation on the multiple RBs of the same PRG. It is defined that the granularity of the subband is the same as the granularity of the PRG, which can effectively utilize a feedback mode and enhance system performance.

For a specific example, reference may be made to the foregoing description, which is not described herein again.

In a conventional codebook design, when a rank is 2, some codewords are repetitive in the codebook, which leads to a decrease in the number of effective codewords, thereby degrading system performance.

FIG. 15 is a flowchart of a precoding matrix indicator feedback method according to an embodiment of the present invention. The method in FIG. 15 is executed by a receive end.

1501. The receive end selects, from a codebook, a precoding matrix W corresponding to a rank indicator, where the rank indicator is 2, the precoding matrix W is represented by $W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi \frac{L}{32}} & e^{j2\pi \frac{L+8}{32}} & e^{j2\pi \frac{L+16}{32}} & e^{j2\pi \frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of a transmit end for a transmission signal from a same transmission layer (a weighted value corresponding to the phase difference), the $$\varphi_n \in \{e^{\frac{j2\pi n}{Q}}\},$$

the n is a non-negative integer, the Q is a positive integer, and the first antenna group and the second antenna group belong to a same multi-antenna system.

1502. The receive end sends a precoding matrix indicator PMI to the transmit end, so that the transmit end determines W according to the PMI.

The multi-antenna system refers to a system in which the transmit end (for example, a base station) and the receive end (for example, a UE) perform communication by using multiple antennas. In contrast to a single-antenna system, multiple antennas of the transmit end and the receive end can form a spatial diversity gain or multiplexing gain, which can effectively improve transmission reliability and increase a system capacity. The diversity gain and multiplexing gain in the multi-antenna system may generally be obtained by using a precoding method at the transmit end and a receive combining algorithm at the receive end.

For example, in an LTE system, the transmit end uses 4 antennas, whereas the receive end uses 2 antennas.

In addition, the multi-antenna system in the embodiment of the present invention may also be applied to a scenario of coordinated multi-point transmission. The coordinated multi-point transmission indicates that multiple transmit ends perform coordinated signal transmission for a same user. For example, a transmit end A has 2 antennas, a transmit end B also has 2 antennas, and the two transmit ends perform coordinated transmission for a receive end at the same time. Therefore, a signal received by the receive end may be regarded as a signal sent by a 4-antenna base station.

It should be further noted that an antenna configuration manner of the multi-antenna system in the embodiment of the present invention is not limited thereto, and may be, for example, a uniform linear array ULA, a dual-polarized antenna, or the like.

In the embodiment of the present invention, a receive end selects a precoding matrix W from a codebook and sends a precoding matrix indicator PMI to a transmit end, so that the transmit end determines the precoding matrix W according to the precoding matrix indicator, where the $W=W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of the transmit end for a transmission signal from a same transmission layer, the $$\varphi_n \in \{e^{\frac{j2\pi n}{Q}}\},$$

the n is a non-negative integer, the Q is a positive integer, and the first antenna group and the second antenna group belong to a same multi-antenna system. In this way, using the coefficient α to perform the phase adjustment on the $\phi_n$ can avoid repetition of codewords in the codebook, which can increase the number of effective codewords, thereby enhancing system performance.

Optionally, as an embodiment, the $W_2$ in the $W_1 \cdot W_2$ may be represented by:

$$W_2 = \frac{1}{B}\begin{bmatrix} e_{m1} & e_{m2} \\ \alpha\varphi_n e_{m1} & -\alpha\varphi_n e_{m2} \end{bmatrix} \quad (9)$$

or $$W_2 = \frac{1}{B}\begin{bmatrix} e_{m1} & e_{m2} \\ \alpha\varphi_n e_{m2} & -\alpha\varphi_n e_{m1} \end{bmatrix} \quad (10)$$

or $$W_2 = \frac{1}{B}\begin{bmatrix} e_{m1} & e_{m2} \\ \alpha\varphi_n e_{m1} & \alpha\varphi_n e_{m2} \end{bmatrix} \quad (11)$$

or $$W_2 = \frac{1}{B}\begin{bmatrix} e_{m1} & e_{m1} \\ \alpha\varphi_n e_{m2} & -\alpha\varphi_n e_{m2} \end{bmatrix} \quad (12)$$

where the $e_{m1}$ represents a 4×1-dimensional column vector, where in the $e_{m1}$ an m1$^{th}$ element is 1 and other elements are all 0; the $e_{m2}$ represents a 4×1-dimensional column vector, where in the $e_{m2}$ an m2$^{th}$ element is 1 and other elements are all 0; the m1 and the m2 are both positive integers less than or equal to 4; and the $e_{m1}$ and the $e_{m2}$ are the same or different.

The coefficient α has a functional relationship with at least one of the m1, the m2, the n, and the L. Specifically, the $$\alpha = e^{j2\pi\frac{\lfloor L/8 \rfloor}{8}},$$

or the $$\alpha = e^{j2\pi\frac{2(m1-1)}{32}},$$

or the $$\alpha = e^{j2\pi\frac{2(m2-1)}{32}},$$

or the $$\alpha = e^{j2\pi\frac{4\cdot\lfloor L/8 \rfloor + 2(m1-1)}{32}},$$

or the $$\alpha = e^{j2\pi\frac{4\cdot\lfloor L/8 \rfloor + 2(m2-1)}{32}},$$

or the $$\alpha = e^{j2\pi\frac{8\cdot\lfloor L/8 \rfloor + n}{64}},$$

where $\lfloor\ \rfloor$ is a rounding down operator. And the like. It should be understood that a manner of determining a value of the coefficient α is not limited in the embodiment of the present invention. Optionally, the L is a non-negative integer less than or equal to 15.

In a codebook of a conventional design, by using the foregoing formula (9) and the $\phi_n=1$ as an example, when the L=0, the m1=2, and the m2=2, the precoding matrix selected from the codebook is $$W = \frac{1}{B}\begin{bmatrix} 1 & 1 \\ e^{j2\pi\frac{8}{32}} & e^{j2\pi\frac{8}{32}} \\ \begin{pmatrix} 1 \\ e^{j2\pi\frac{8}{32}} \end{pmatrix} & -\begin{pmatrix} 1 \\ e^{j2\pi\frac{8}{32}} \end{pmatrix} \end{bmatrix};$$

when the L=8, the m1=1, and the m2=1, the precoding matrix selected from the codebook is $$W = \frac{1}{B}\begin{bmatrix} 1 & 1 \\ e^{j2\pi\frac{8}{32}} & e^{j2\pi\frac{8}{32}} \\ \begin{pmatrix} 1 \\ e^{j2\pi\frac{8}{32}} \end{pmatrix} & -\begin{pmatrix} 1 \\ e^{j2\pi\frac{8}{32}} \end{pmatrix} \end{bmatrix}.$$

It can be seen that the same precoding matrix is selected when the L=1, the m1=2, and the m2=2 and when the L=8, the m1=1, and the m2=1. That is, codewords in the codebook are repeated. After phase adjustment by using the coefficient α, a precoding matrix selected from the codebook when the L=0 is different from a precoding matrix selected from the codebook when the L=8. In this way, the number of effective codewords is effectively increased.

Optionally, in step 1502, the receive end may send a first precoding matrix indicator $PMI_1$ and a second precoding matrix indicator $PMI_2$ to the transmit end, that is, the precoding matrix indicator PMI includes the $PMI_1$ and the $PMI_2$. Furthermore, the $PMI_1$ and the $PMI_2$ are sent by a same time period or different time periods. The $PMI_1$ is used for indicating the W1, and the $PMI_2$ is used for indicating the W2. In other words, the $PMI_1$ and the $PMI_2$ may have a same or different time domain or frequency domain granularities (or may be based on different subframe periods or subband sizes).

For example, when the W1 is a matrix representing a long-term channel characteristic, and the W2 is a matrix representing a short-term channel characteristic, correspondingly, the receive end may send the $PMI_1$ to the transmit end at a long interval and send the $PMI_2$ to the transmit end at a short interval.

Certainly, the receive end may directly indicate the selected precoding matrix W by using one PMI. It should be understood that a manner in which the receive end indicates a precoding matrix is not limited in the embodiment of the present invention.

Optionally, the receive end may send the precoding matrix indicator PMI to the transmit end through a physical control channel or a physical shared channel. For example, the UE may send the precoding matrix indicator PMI to the base station through a physical uplink control channel or a physical uplink shared channel. It should be understood that the embodiment of the present invention is not limited thereto.

It should be noted that manners of representing the foregoing codebook (or precoding matrix) by using other equivalent matrixes all fall within the scope of the present invention. For example, a precoding matrix obtained after row or column permutation is performed on the precoding matrix W in the embodiment of the present invention also falls within the scope of the present invention. For example, different antenna serial numbers correspondingly lead to row permutation of a precoding matrix.

Figure 16:
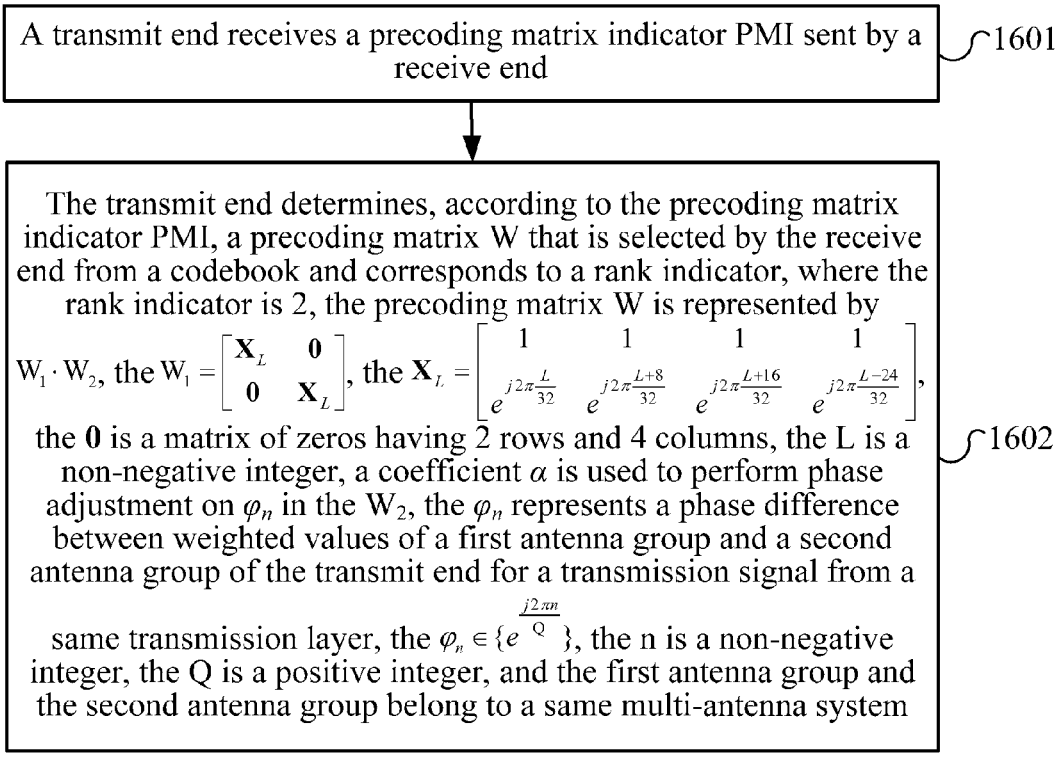
FIG. 16 is a flowchart of a method for receiving a precoding matrix indicator according to another embodiment of the present invention.

FIG. 16 is a flowchart of a precoding method according to another embodiment of the present invention. The method in FIG. 16 is executed by a transmit end, and corresponds to the method in FIG. 15. Therefore, description repeating that in the embodiment in FIG. 15 is properly omitted.

1601. The transmit end receives a precoding matrix indicator PMI sent by a receive end.

1602. The transmit end determines, according to the precoding matrix indicator PMI, a precoding matrix W that is selected by the receive end from a codebook and corresponds to a rank indicator, where the rank indicator is 2, the precoding matrix W is represented by $W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient $\alpha$ is used to perform phase adjustment on $\phi_n$ in the $W_2$, the $\phi_n$ represents a phase difference between weighted values of a first antenna group and a second antenna group of the transmit end for a transmission signal from a same transmission layer (a weighted value corresponding to the phase difference), the $$\varphi_n \in \{e^{j\frac{2\pi n}{Q}}\},$$

the n is a non-negative integer, the Q is a positive integer, and the first antenna group and the second antenna group belong to a same multi-antenna system.

In the embodiment of the present invention, a transmit end receives a precoding matrix indicator PMI sent by a receive end; the transmit end determines, according to the precoding matrix indicator, a precoding matrix W selected by the receive end from a codebook, where the $W = W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer less than or equal to 15, a coefficient $\alpha$ is used to perform phase adjustment on $\phi_n$ in the $W_2$, the $\phi_n$ represents a phase difference between weighted values of a first antenna group and a second antenna group of the transmit end for a transmission signal from a same transmission layer, the $$\varphi_n \in \{e^{j\frac{2\pi}{Q}}\},$$

the n is a non-negative integer, the Q is a positive integer, and the first antenna group and the second antenna group belong to a same multi-antenna system. In this way, using the coefficient $\alpha$ to perform the phase adjustment on the $\phi_n$ can avoid repetition of codewords in the codebook, which can increase the number of effective codewords, thereby enhancing system performance.

It should be noted and it should be understood that the $X_L$ in the embodiment of the present invention may be represented by:

$$X_L = \begin{bmatrix} 1 & 1 & \cdots & 1 \\ e^{j2\pi\frac{L+t_1}{M}} & e^{j2\pi\frac{L+t_2}{M}} & \cdots & e^{j2\pi\frac{L+t_{num}}{M}} \end{bmatrix},$$

where the num is a positive integer, and the $t_1, t_2, \ldots, t_{num}$ are all integers and have nonconsecutive values. For example, when the M=32, the num=4, the $t_1=0$, the $t_2=8$, the $t_1=16$, and the $t_2=24$, the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix}.$$

Optionally, the $W_2$ in the precoding matrix W may be any one of the foregoing formulas (9) to (12).

Optionally, the coefficient α has a functional relationship with at least one of the m1, the m2, the n, and the L. Specifically, the $$\alpha = e^{j2\pi \cdot \frac{\lfloor L/8 \rfloor}{8}},$$

or the $$\alpha = e^{j2\pi \cdot \frac{2(m1-1)}{32}},$$

or the $$\alpha = e^{j2\pi \cdot \frac{2(m2-1)}{32}},$$

or the $$\alpha = e^{j2\pi \cdot \frac{4\cdot\lfloor L/8 \rfloor + 2(m1-1)}{32}},$$

or the $$\alpha = e^{j2\pi \cdot \frac{4\cdot\lfloor L/8 \rfloor + 2(m2-1)}{32}},$$

or the $$\alpha = e^{j2\pi \cdot \frac{8\cdot\lfloor L/8 \rfloor + n}{64}},$$

where $\lfloor \; \rfloor$ is a rounding down operator. And the like. It should be understood that a manner of determining a value of the coefficient α is not limited in the embodiment of the present invention. Optionally, the L is a non-negative integer less than or equal to 15.

Optionally, in step 1601, the transmit end receives a first precoding matrix indicator $PMI_1$ and a second precoding matrix indicator $PMI_2$ sent by the receive end. The precoding matrix indicator PMI includes the $PMI_1$ and the $PMI_2$. Furthermore, the $PMI_1$ and $PMI_2$ sent by the receive end are received by a same time period or different time periods. In other words, the $PMI_1$ and the $PMI_2$ may have a same or different time domain or frequency domain granularities (or may be based on different subframe periods or subband sizes). In step 1602, the transmit end determines, according to the $PMI_1$, the $W_1$ selected from the codebook by the receive end based on the reference signal, and determines, according to the $PMI_2$, the $W_2$ selected from the codebook by a UE, and the transmit end may determine the precoding matrix W according to the $W_1$ and the $W_2$.

For example, when the $W_1$ is a matrix representing a long-term channel characteristic, and the $W_2$ is a matrix representing a short-term channel characteristic, correspondingly, the receive end may send the $PMI_1$ to the transmit end at a long interval and send the $PMI_2$ to the transmit end at a short interval.

Certainly, the transmit end may directly determine the selected precoding matrix W by using one PMI sent by the receive end.

It should be understood that a manner in which the receive end indicates a precoding matrix is not limited in the embodiment of the present invention.

Optionally, the transmit end may receive, through a physical control channel or a physical shared channel, the precoding matrix indicator PMI sent by the receive end. It should be understood that the embodiment of the present invention is not limited thereto.

It should be noted that manners of representing the foregoing codebook (or precoding matrix) by using other equivalent matrixes all fall within the scope of the present invention. For example, a precoding matrix obtained after row or column permutation is performed on the precoding matrix W in the embodiment of the present invention also falls within the scope of the present invention. For example, different antenna serial numbers correspondingly lead to row permutation of a precoding matrix.

FIG. 17 is a flowchart of a precoding matrix indicator feedback method according to an embodiment of the present invention. The method in FIG. 17 is executed by a receive end.

1701. The receive end selects, from a codebook, a precoding matrix $W_{m,m',k}^{(2)}$ corresponding to a rank indicator, where the rank indicator is 2, the $$W_{m,m',k}^{(2)} = \frac{1}{\sqrt{8}} \begin{bmatrix} v_m & v_{m'} \\ \alpha\varphi_k v_{m'} & -\alpha\varphi_k v_m \end{bmatrix}$$

or the $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}$$

or the $$W_{m,m',k}^{(2)} = \frac{1}{\sqrt{8}} \begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m=i_1+8*Z_1$, the $m'=i_1+8*Z_2$, the $i_1$ is a non-negative integer less than or equal to 15, the $Z_1$ and the $Z_2$ are non-negative integers, the $\varphi_k$ represents a phase difference between weighted values of a first antenna group and a second antenna group of a transmit end for a transmission signal from a same transmission layer and the $\varphi_k = e^{j\pi k/2}$, the k is a non-negative integer and is determined by $i_2$, the $i_2$ is a non-negative integer, the first antenna group and the second antenna group belong to a same multi-antenna system, the coefficient α is used to perform phase adjustment on the $\phi_k$, and the coefficient α has a functional relationship with at least one of the $i_1$, the $i_2$, the m, the m', and the k.

1702. The receive end sends a precoding matrix indicator PMI to the transmit end, so that the transmit end determines the $W_{m,m',k}^{(2)}$ according to the PMI.

The multi-antenna system refers to a system in which the transmit end (for example, a base station) and the receive end (for example, a UE) perform communication by using multiple antennas. In contrast to a single-antenna system, multiple antennas of the transmit end and the receive end can form a spatial diversity gain or multiplexing gain, which can effectively improve transmission reliability and increase a system capacity. The diversity gain and multiplexing gain in the multi-antenna system may generally be obtained by using a precoding method at the transmit end and a receive combining algorithm at the receive end. For example, in an LTE system, the transmit end uses 4 antennas, whereas the receive end uses 2 antennas.

In addition, the multi-antenna system in the embodiment of the present invention may also be applied to a scenario of coordinated multi-point transmission. The coordinated multi-point transmission indicates that multiple transmit ends perform coordinated signal transmission for a same user. For example, a transmit end A has 2 antennas, a transmit end B also has 2 antennas, and the two transmit ends perform coordinated transmission for a receive end at the same time. Therefore, a signal received by the receive end may be regarded as a signal sent by a 4-antenna base station.

It should be further noted that an antenna configuration manner of the multi-antenna system in the embodiment of the present invention is not limited thereto, and may be, for example, a uniform linear array ULA, a dual-polarized antenna, or the like.

In the embodiment of the present invention, a receive end selects a precoding matrix $W_{m,m',k}^{(2)}$ from a codebook, and sends a precoding matrix indicator PMI to a transmit end, so that the transmit end determines the precoding matrix $W_{m,m',k}^{(2)}$ according to the precoding matrix indicator. For the precoding matrix $W_{m,m',k}^{(2)}$ in the codebook in the embodiment of the present invention, using a coefficient α to perform phase adjustment on $\phi_n$ in the precoding matrix can avoid repetition of codewords in the codebook, which can increase the number of effective codewords, thereby enhancing system performance.

Optionally, as an embodiment, the coefficient $$\alpha = e^{j2\pi \frac{\lfloor i_1/8 \rfloor}{8}},$$

or the coefficient $$\alpha = e^{j2\pi \frac{(m-i_1)/4}{32}},$$

or the coefficient $$\alpha = e^{j2\pi \frac{(m'-i_1)/4}{32}},$$

or the $$\alpha = e^{j2\pi \frac{4\lfloor i_1/8 \rfloor + (m-i_1)/4}{32}},$$

or the $$\alpha = e^{j2\pi \frac{4\lfloor i_1/8 \rfloor + (m'-i_1)/4}{32}},$$

or the $$\alpha = e^{j2\pi \frac{4\lfloor i_1/8 \rfloor + k/2}{32}},$$

or the $$\alpha = e^{j2\pi \frac{\lfloor i_2/2 \rfloor}{32}},$$

where $\lfloor \, \rfloor$ is a rounding down operator. It should be understood that a manner of determining a value of the coefficient α is not limited in the embodiment of the present invention.

Optionally, as another embodiment, the $i_1$ and the $i_2$ are both non-negative integers less than or equal to 15, and a relationship between the precoding matrix $$W_{m,m',k}^{(2)} \in \left\{ \frac{1}{\sqrt{8}} \begin{bmatrix} v_m & v_{m'} \\ \alpha\varphi_k v_{m'} & -\alpha\varphi_k v_m \end{bmatrix}, \right.$$

$$\left. \frac{1}{\sqrt{8}} \begin{bmatrix} v_m & v_{m'} \\ \alpha\varphi_k v_m & \alpha\varphi_k v_{m'} \end{bmatrix}, \frac{1}{\sqrt{8}} \begin{bmatrix} v_m & v_{m'} \\ \alpha\varphi_k v_m & -\alpha\varphi_k v_{m'} \end{bmatrix} \right\}$$

included in the codebook and the $i_1$ and the $i_2$ may be schematically shown in a form of a table, for example, Table 5:

TABLE 5

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |
| $i_1$ | $i_2$ | | | |
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |
| $i_1$ | $i_2$ | | | |
| | 8 | 9 | 10 | 11 |
| 0-15 | $W_{i_1+8,i_1+24,0}^{(2)}$ | $W_{i_1+8,i_1+24,0}^{(2)}$ | $W_{i_1+8,i_1+24,2}^{(2)}$ | $W_{i_1+8,i_1+24,2}^{(2)}$ |
| $i_1$ | $i_2$ | | | |
| | 12 | 13 | 14 | 15 |
| 0-15 | $W_{i_1,i_1+16,0}^{(2)}$ | $W_{i_1+8,i_1+24,0}^{(2)}$ | $W_{i_1+16,i_1,0}^{(2)}$ | $W_{i_1+24,i_1+8,0}^{(2)}$ | where when the $12 \le i_2 \le 15$, the $$W_{m,m',k}^{(2)} = \frac{1}{\sqrt{8}} \begin{bmatrix} v_m & v_{m'} \\ \alpha\varphi_k v_{m'} & -\alpha\varphi_k v_m \end{bmatrix};$$

when the $i_2=8$ or $i_2=11$, the $$W_{m,m',k}^{(2)} = \frac{1}{\sqrt{8}} \begin{bmatrix} v_m & v_{m'} \\ \alpha\varphi_k v_m & \alpha\varphi_k v_{m'} \end{bmatrix};$$

and when the $0 \le i_2 \le 7$ or $9 \le i_2 \le 10$, the $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}.$$

Optionally, as another embodiment, the $i_1$ and the $i_2$ are both non-negative integers less than or equal to 15, and a relationship between the precoding matrix $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}$$

included in the codebook and the $i_1$ and the $i_2$ may be schematically shown in a form of a table, for example, Table 6:

TABLE 6

| $i_1$ | \multicolumn{4}{c}{$i_2$} | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ | | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

| $i_1$ | $i_2$ | | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ | | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

It should be further noted that a correspondence between a value of $i_2$ and the precoding matrix $W_{m,m',k}^{(2)}$ in the foregoing tables (Table 5 and Table 6) is only exemplary and is not to limit the scope of the present invention. For example, in Table 5, the precoding matrix corresponding to the $i_2=0$ may be $$W_{i_1,i_1,+8,0}^{(2)} = \frac{1}{\sqrt{8}} \begin{bmatrix} v_{i_1} & v_{i_1+8} \\ \alpha\varphi_0 v_{i_1} & \alpha\varphi_0 v_{i_1,+8} \end{bmatrix},$$

and the precoding matrix corresponding to the $i_2=8$ may be $$W_{i_1,i_1,0}^{(2)} = \frac{1}{\sqrt{8}} \begin{bmatrix} v_{i_1} & v_{i_1} \\ \alpha\varphi_0 v_{i_1} & -\alpha\varphi_0 v_{i_1} \end{bmatrix}.$$

Optionally, in step 1702, the receive end may send a first index and a second index to the transmit end, that is, the precoding matrix indicator PMI includes the first index and the second index. Furthermore, the first index and the second index are sent by a same time period or different time periods. In other words, the first index and the second index may have a same or different time domain or frequency domain granularities (or may be based on different subframe periods or subband sizes). The first index is used for indicating the $i_1$, and the second index is used for indicating the $i_2$. The transmit end may determine the $W_{m,m',k}^{(2)}$ according to the $i_1$ and the $i_2$. For example, if the codebook in the foregoing Table 6 is preset at the transmit end, the $i_1$ indicated by the first index is 2, and the $i_2$ indicated by the second index is 10, the transmit end may determine that the $W_{m,m',k}^{(2)}$ selected by the receive end is $W_{10,18,0}^{(2)}$.

Certainly, the receive end may directly indicate the selected precoding matrix W by using one PMI. It should be understood that a manner in which the receive end indicates a precoding matrix is not limited in the embodiment of the present invention.

Optionally, the receive end may send the precoding matrix indicator PMI to the transmit end through a physical control channel or a physical shared channel. For example, the UE may send the precoding matrix indicator PMI to the base station through a physical uplink control channel or a physical uplink shared channel. It should be understood that the embodiment of the present invention is not limited thereto.

It should be noted that manners of representing the foregoing codebook (or precoding matrix) by using other equivalent matrixes all fall within the scope of the present invention. For example, a precoding matrix obtained after row or column permutation is performed on the precoding matrix W in the embodiment of the present invention also falls within the scope of the present invention. For example, different antenna serial numbers correspondingly lead to row permutation of a precoding matrix.

Figure 18:
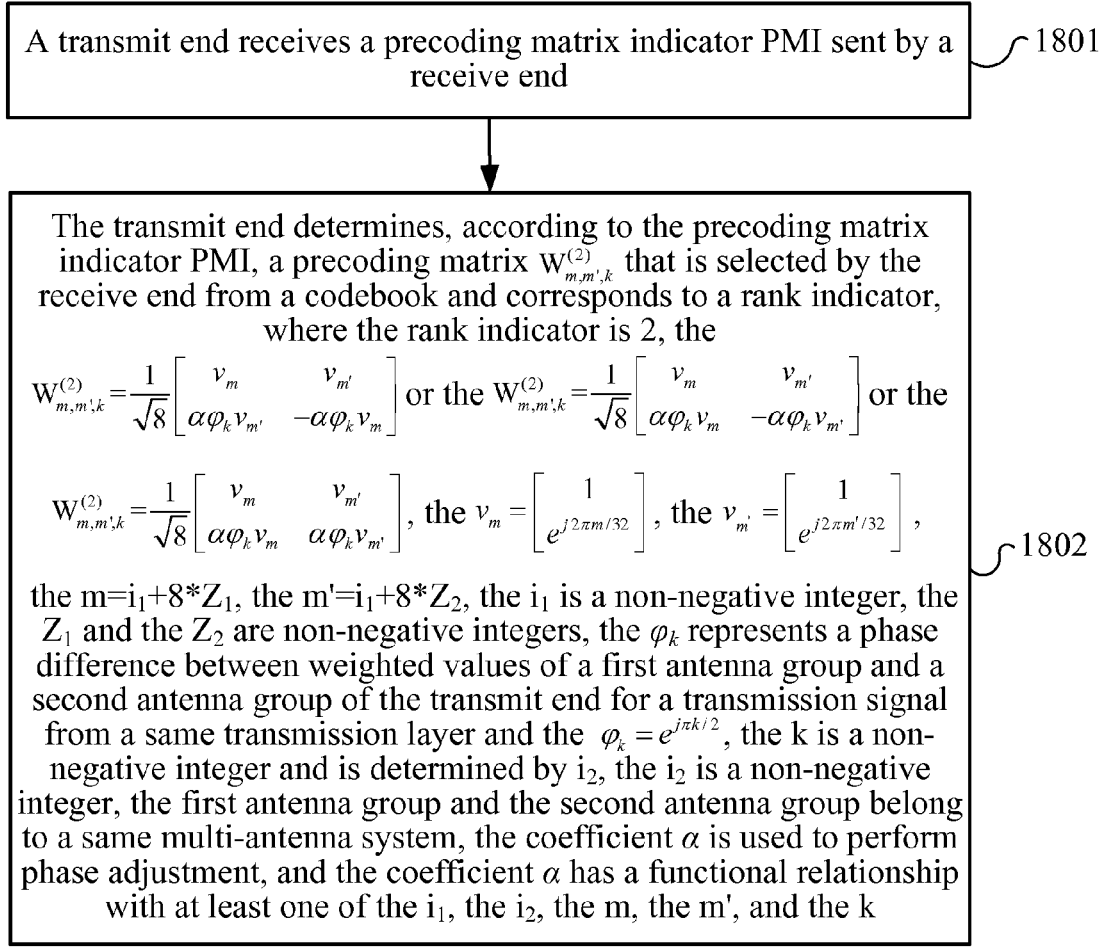
FIG. 18 is a flowchart of a method for receiving a precoding matrix indicator according to another embodiment of the present invention.

FIG. 18 is a flowchart of a precoding method according to another embodiment of the present invention. The method in FIG. 18 is executed by a transmit end, and corresponds to the method in FIG. 17. Therefore, description repeating that in the embodiment in FIG. 17 is properly omitted.

1801. The transmit end receives a precoding matrix indicator PMI sent by a receive end.

1802. The transmit end determines, according to the precoding matrix indicator PMI, a precoding matrix $W_{m,m',k}^{(2)}$ that is selected by the receive end from a codebook based on a reference signal and corresponds to a rank indicator, where the rank indicator is 2, the $$W_{m,m',k}^{(2)} = \frac{1}{\sqrt{8}} \begin{bmatrix} v_m & v_{m'} \\ \alpha\varphi_k v_{m'} & -\alpha\varphi_k v_m \end{bmatrix}$$

or the $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}$$

or the $$W_{m,m',k}^{(2)} = \frac{1}{\sqrt{8}} \begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the m=$i_1$+8*$Z_1$, the m'=$i_1$+8*$Z_2$, the $i_1$ is a non-negative integer, the $Z_1$ and the $Z_2$ are non-negative integers, the $\phi_k$ represents a phase difference between weighted values of a first antenna group and a second antenna group of the transmit end for a transmission signal from a same transmission layer and the $\phi_k = e^{j\pi k/2}$, the k is a non-negative integer and is determined by $i_2$, the $i_2$ is a non-negative integer, the first antenna group and the second antenna group belong to a same multi-antenna system, the coefficient $\alpha$ is used to perform phase adjustment on the $\phi_k$, and the coefficient $\alpha$ has a functional relationship with at least one of the $i_1$, the $i_2$, the m, the m', and the k.

In the embodiment of the present invention, a transmit end receives a precoding matrix indicator PMI sent by a receive end, and selects a precoding matrix $W_{m,m',k}^{(2)}$ from a codebook according to the precoding matrix indicator PMI. For the precoding matrix $W_{m,m',k}^{(2)}$ in the codebook in the embodiment of the present invention, using a coefficient $\alpha$ to perform phase adjustment on $\phi_k$ in the precoding matrix can avoid repetition of codewords in the codebook, which can increase the number of effective codewords, thereby enhancing system performance.

Optionally, as an embodiment, the coefficient $$\alpha = e^{j2\pi \frac{\lfloor i_1/8 \rfloor}{8}},$$

or the coefficient $$\alpha = e^{j2\pi \frac{(m-i_1)/4}{32}},$$

or the coefficient $$\alpha = e^{j2\pi \frac{(m'-i_1)/4}{32}},$$

or the $$\alpha = e^{j2\pi \frac{4\lfloor i_1/8 \rfloor + (m-i_1)/4}{32}},$$

or the $$\alpha = e^{j2\pi \frac{4\lfloor i_1/8 \rfloor + (m'-i_1)/4}{32}},$$

or the $$\alpha = e^{j2\pi \frac{4\lfloor i_1/8 \rfloor + k/2}{32}},$$

or the $$\alpha = e^{j2\pi \frac{\lfloor i_2/2 \rfloor}{32}},$$

where $\lfloor \ \rfloor$ is a rounding down operator. It should be understood that a manner of determining a value of the coefficient $\alpha$ is not limited in the embodiment of the present invention.

Optionally, in step 1801, the transmit end receives a first index and a second index sent by the receive end, that is, the precoding matrix indicator PMI includes the first index and the second index. Furthermore, the first index and the second index sent by the receive end are received by a same time period or different time periods. In other words, the first index and the second index may have a same or different time domain or frequency domain granularities (or may be based on different subframe periods or subband sizes). The first index is used for indicating the $i_1$, and the second index is used for indicating the $i_2$. In step 1802, the transmit end may determine the $W_{m,m',k}^{(2)}$ according to the $i_1$ and the $i_2$.

Optionally, the $i_1$ and the $i_2$ are both non-negative integers less than or equal to 15, and a relationship between the precoding matrix $W_{m,m',k}^{(2)}$ included in a codebook stored at the transmit end and the $i_1$ and the $i_2$ may be schematically shown in a form of a table, for example, the foregoing Table 5. Alternatively, a relationship between the precoding matrix $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}$$

included in a codebook stored at the transmit end and the $i_1$ and the $i_2$ may be schematically shown in a form of a table, for example, Table 6.

For example, if the codebook in foregoing Table 6 is preset at the transmit end, the $i_1$ indicated by the first index is 2, and the $i_2$ indicated by the first index is 10, the transmit end may determine that the $W_{m,m',k}^{(2)}$ selected by the receive end is $W_{10,18,0}^{(2)}$.

Certainly, the receive end may directly indicate the selected precoding matrix W by using one PMI. It should be understood that a manner in which the receive end indicates a precoding matrix is not limited in the embodiment of the present invention.

Figure 19:
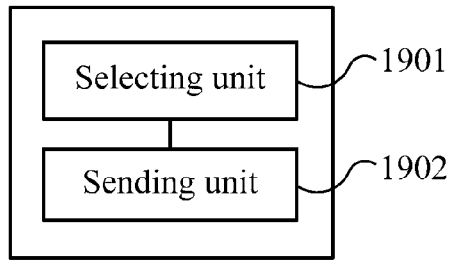
FIG. 19 is a structural block diagram of a receive end according to an embodiment of the present invention.

FIG. 19 is a structural block diagram of a receive end according to an embodiment of the present invention. A receive end 1900 includes a selecting unit 1901 and a sending unit 1902.

The selecting unit 1901 is configured to select, from a codebook, a precoding matrix W corresponding to a rank indicator, where the rank indicator is 2, the precoding matrix W is represented by $W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of a transmit end for a transmission signal from a same transmission layer (a weighted value corresponding to the phase difference), the $$\varphi_n \in \left\{ e^{\frac{j2\pi n}{Q}} \right\},$$

the n is a non-negative integer, the Q is a positive integer, and the first antenna group and the second antenna group belong to a same multi-antenna system.

The sending unit 1902 is configured to send a precoding matrix indicator PMI to the transmit end, so that the transmit end determines, according to the PMI, the precoding matrix W selected by the selecting unit 1901.

In the embodiment of the present invention, a receive end selects a precoding matrix W from a codebook, and sends a precoding matrix indicator PMI to a transmit end, so that the transmit end determines the precoding matrix W according to the precoding matrix indicator, where the $W = W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system. In this way, using the coefficient α to perform the phase adjustment on the $\phi_n$ can avoid repetition of codewords in the codebook, which can increase the number of effective codewords, thereby enhancing system performance.

The receive end 1900 may implement steps involving a receive end in the methods in FIG. 15 and FIG. 16, which are not described in detail to avoid repetition.

It should be noted and it should be understood that the $X_L$ in the embodiment of the present invention may be represented by:

$$X_L = \begin{bmatrix} 1 & 1 & \cdots & 1 \\ e^{j2\pi\frac{L+t_1}{M}} & e^{j2\pi\frac{L+t_2}{M}} & \cdots & e^{j2\pi\frac{L+t_{num}}{M}} \end{bmatrix},$$

where the num is a positive integer, and the $t_1, t_2, \ldots,$ and $t_{num}$ are all integers and have nonconsecutive values. For example, when the M=32, the num=4, the $t_1=0$, the $t_2=8$, the $t_1=16$, and the $t_2=24$, the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix}.$$

Optionally, as an embodiment, the $W_2$ in the $W_1 \cdot W_2$ selected by the selecting unit 1901 may be represented by any one of the foregoing formulas (9) to (12). The coefficient α has a functional relationship with at least one of the m1, the m2, the n, and the L. Specifically, the $$\alpha = e^{j2\pi\frac{\lfloor L/8 \rfloor}{8}},$$

or the $$\alpha = e^{j2\pi\frac{2(m1-1)}{32}},$$

or the $$\alpha = e^{j2\pi\frac{2(m2-1)}{32}},$$

or the $$\alpha = e^{j2\pi\frac{4\cdot\lfloor L/8 \rfloor + 2(m1-1)}{32}},$$

or the $$\alpha = e^{j2\pi\frac{4\cdot\lfloor L/8 \rfloor + 2(m2-1)}{32}},$$

or the $$\alpha = e^{j2\pi\frac{8\cdot\lfloor L/8 \rfloor + n}{64}},$$

where $\lfloor \ \rfloor$ is a rounding down operator. And the like. It should be understood that a manner of determining a value of the coefficient α is not limited in the embodiment of the present invention. Optionally, the L is a non-negative integer less than or equal to 15.

Optionally, as another embodiment, the precoding matrix indicator PMI sent by the sending unit 1901 includes a first precoding matrix indicator $PMI_1$ and a second precoding matrix indicator $PMI_2$, the $PMI_1$ is used for indicating the $W_1$, and the $PMI_2$ is used for indicating the $W_2$.

Figure 20:
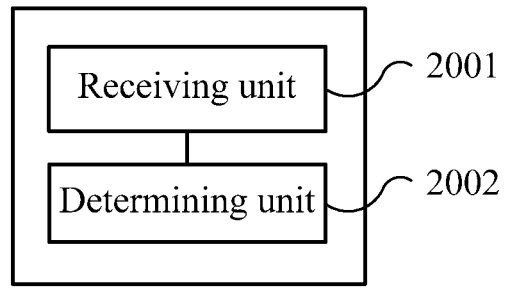
FIG. 20 is a structural block diagram of a transmit end according to an embodiment of the present invention.

FIG. 20 is a structural block diagram of a transmit end according to an embodiment of the present invention. A transmit end 2000 includes a receiving unit 2001 and a determining unit 2002.

The receiving unit 2001 is configured to receive a precoding matrix indicator PMI sent by a receive end.

The determining unit 2002 is configured to determine, according to the precoding matrix indicator PMI received by the receiving unit 2001, a precoding matrix W that is selected by the receive end from a codebook and corresponds to a rank indicator, where the rank indicator is 2, the precoding matrix W is represented by $$W_1 \cdot W_2, \text{ the } W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of the transmit end for a transmission signal from a same transmission layer (a weighted value corresponding to the phase difference), the $$\varphi_n \in \left\{ e^{\frac{j2\pi n}{Q}} \right\},$$

the n is a non-negative integer, the Q is a positive integer, and the first antenna group and the second antenna group belong to a same multi-antenna system.

In the embodiment of the present invention, a transmit end receives a precoding matrix indicator PMI sent by a receive end, and the transmit end determines, according to the precoding matrix indicator, a precoding matrix W precoding matrix W selected by the receive end from a codebook, where the $W=W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system. In this way, using the coefficient α to perform the phase adjustment on the $\phi_n$ can avoid repetition of codewords in the codebook, which can increase the number of effective codewords, thereby enhancing system performance.

The transmit end 2000 may implement steps involving a transmit end in the methods in FIG. 15 and FIG. 16, which are not described in detail to avoid repetition.

It should be noted and it should be understood that the $X_L$ in the embodiment of the present invention may be represented by:

$$X_L = \begin{bmatrix} 1 & 1 & & 1 \\ e^{j2\pi\frac{L+t_1}{M}} & e^{j2\pi\frac{L+t_2}{M}} & \cdots & e^{j2\pi\frac{L+t_{num}}{M}} \end{bmatrix},$$

where the num is a positive integer, and the $t_1, t_2, \ldots,$ and $t_{num}$ are all integers and have nonconsecutive values. For example, when the M=32, the num=4, the $t_1=0$, the $t_2=8$, the $t_1=16$, and the $t_2=24$, the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix}.$$

Optionally, as an embodiment, the $W_2$ in the precoding matrix $W=W_1 \cdot W_2$ may be represented by any one of the foregoing formulas (9) to (12). The coefficient α has a functional relationship with at least one of the m1, the m2, the n, and the L. Specifically, the $$\alpha = e^{j2\pi\frac{\lfloor L/8 \rfloor}{8}},$$

or the $$\alpha = e^{j2\pi\frac{(m1-1)}{32}},$$

or the $$\alpha = e^{j2\pi\frac{2(m2-1)}{32}},$$

or the $$\alpha = e^{j2\pi \frac{4 \cdot \lfloor L/8 \rfloor + 2(m1-1)}{32}},$$

or the $$\alpha = e^{j2\pi \frac{4 \cdot \lfloor L/8 \rfloor + 2(m2-1)}{32}},$$

or the $$\alpha = e^{j2\pi \frac{8 \cdot \lfloor L/8 \rfloor + n}{64}},$$

where $\lfloor \ \rfloor$ is a rounding down operator. And the like. It should be understood that a manner of determining a value of the coefficient $\alpha$ is not limited in the embodiment of the present invention. Optionally, the L is a non-negative integer less than or equal to 15.

Optionally, as another embodiment, the precoding matrix indicator PMI received by the receiving unit 2001 includes a first precoding matrix indicator $PMI_1$ and a second precoding matrix indicator $PMI_2$. The determining unit 2002 is specifically configured to: determine the $W_1$ according to the $PMI_1$, and determine the $W_2$ according to the $PMI_2$; and determine the W according to the $W_1$ and the $W_2$.

Figure 21:
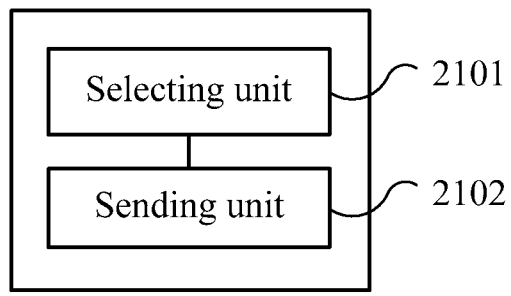
FIG. 21 is a structural block diagram of a receive end according to an embodiment of the present invention.

FIG. 21 is a structural block diagram of a receive end according to an embodiment of the present invention. A receive end 2100 includes a selecting unit 2101 and a sending unit 2102.

The selecting unit 2101 is configured to select, from a codebook, a precoding matrix $W_{m,m',k}^{(2)}$ corresponding to a rank indicator, where the rank indicator is 2, the $$W_{m,m',k}^{(2)} = \frac{1}{\sqrt{8}} \begin{bmatrix} v_m & v_{m'} \\ \alpha \varphi_k v_{m'} & -\alpha \varphi_k v_m \end{bmatrix}$$

or the $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}$$

or the $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix},$$

the $$v_m = \begin{bmatrix} 1 \\ e^{j2\pi m/32} \end{bmatrix},$$

or the $$v_{m'} = \begin{bmatrix} 1 \\ e^{j2\pi m'/32} \end{bmatrix},$$

the $m=i_1+8*Z_1$, the $m'=i_1+8*Z_2$, the $i_1$ is a non-negative integer, the $Z_1$ and the $Z_2$ are non-negative integers, the $\varphi_k$ represents a phase difference between weighted values of a first antenna group and a second antenna group of a transmit end for a transmission signal from a same transmission layer and the $\varphi_k = e^{j\pi k/2}$ the k is a non-negative integer and is determined by $i_2$, the $i_2$ is a non-negative integer, the first antenna group and the second antenna group belong to a same multi-antenna system, the coefficient $\alpha$ is used to perform phase adjustment on the $\varphi_k$, and the coefficient $\alpha$ has a functional relationship with at least one of the $i_1$, the $i_2$, the m, the m', and the k.

The sending unit 2102 is configured to send a precoding matrix indicator PMI to the transmit end, so that the transmit end determines, according to the PMI, the precoding matrix $W_{m,m',k}^{(2)}$ selected by the selecting unit 2101.

In the embodiment of the present invention, a receive end selects a precoding matrix $W_{m,m',k}^{(2)}$ from a codebook, and sends a precoding matrix indicator PMI to a transmit end, so that the transmit end determines the precoding matrix $W_{m,m',k}^{(2)}$ according to the precoding matrix indicator. For the precoding matrix $W_{m,m',k}^{(2)}$ in the codebook in the embodiment of the present invention, using a coefficient $\alpha$ to perform phase adjustment on $\varphi_n$ in the precoding matrix can avoid repetition of codewords in the codebook, which can increase the number of effective codewords, thereby enhancing system performance.

The receive end 2100 may implement steps involving a receive end in the methods in FIG. 17 and FIG. 18, which are not described in detail to avoid repetition.

Optionally, as an embodiment, the coefficient $$\alpha = e^{j2\pi \frac{\lfloor i_1/8 \rfloor}{8}},$$

or the coefficient $$\alpha = e^{j2\pi \frac{(m-i_1)/4}{32}},$$

or the coefficient $$\alpha = e^{j2\pi \frac{(m'-i_1)/4}{32}},$$

or the coefficient $$\alpha = e^{j2\pi \frac{4\lfloor i_1/8 \rfloor + (m-i_1)/4}{32}},$$

or the coefficient $$\alpha = e^{j2\pi \frac{4\lfloor i_1/8 \rfloor + (m'-i_1)/4}{32}},$$

or the coefficient $$\alpha = e^{j2\pi \frac{4\lfloor i_1/8 \rfloor + k/2}{32}},$$

or the coefficient $$\alpha = e^{j2\pi \frac{\lfloor i_2/2 \rfloor}{32}},$$

where $\lfloor \ \rfloor$ is a rounding down operator. It should be understood that a manner of determining a value of the coefficient $\alpha$ is not limited in the embodiment of the present invention.

Optionally, as another embodiment, the $i_1$ and the $i_2$ are both non-negative integers less than or equal to 15, and a relationship between the precoding matrix $W_{m,m',k}^{(2)}$ included in the codebook and the $i_1$ and the $i_2$ may be schematically shown in a form of a table, for example, the foregoing Table 5. Alternatively, a relationship between the precoding matrix $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}$$

included in the codebook and the $i_1$ and the $i_2$ may be schematically shown in a form of a table, for example, Table 6.

Optionally, the PMI sent by the sending unit 2102 includes a first index and a second index, the first index is used for indicating the $i_1$, and the second index is used for indicating the $i_2$, so that the transmit end determines the $W_{m,m',k}^{(2)}$ according to the $i_1$ and the $i_2$. Certainly, the sending unit 2102 may directly indicate the selected precoding matrix W to the transmit end by using one PMI. It should be understood that a manner in which the receive end indicates a precoding matrix is not limited in the embodiment of the present invention.

Figure 22:
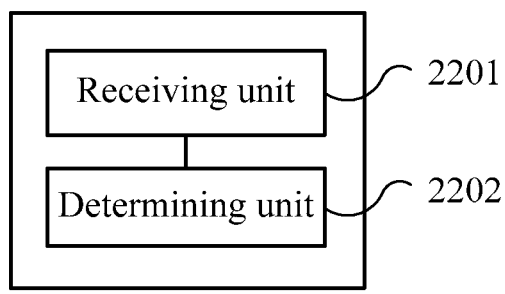
FIG. 22 is a structural block diagram of a transmit end according to an embodiment of the present invention.

FIG. 22 is a structural block diagram of a transmit end according to an embodiment of the present invention. A transmit end 2200 includes a receiving unit 2201 and a determining unit 2202.

The receiving unit 2201 is configured to receive a precoding matrix indicator PMI sent by a receive end.

The determining unit 2202 is configured to determine, according to the precoding matrix indicator PMI received by the receiving unit 2201, a precoding matrix $W_{m,m',k}^{(2)}$ that is selected by the receive end from a codebook based on a reference signal and corresponds to a rank indicator, where the rank indicator is 2, the $$W_{m,m',k}^{(2)} = \frac{1}{\sqrt{8}} \begin{bmatrix} v_m & v_{m'} \\ \alpha \varphi_k v_{m'} & -\alpha \varphi_k v_m \end{bmatrix}$$

or the $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}$$

or the $$W_{m,m',k}^{(2)} = \frac{1}{\sqrt{8}} \begin{bmatrix} v_m & v_{m'} \\ \alpha \varphi_k v_m & \alpha \varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m = i_1 + 8 \ast Z_1$, the $m' = i_1 + 8 \ast Z_2$, the $i_1$ is a non-negative integer, the $Z_1$ and the $Z_2$ are non-negative integers, the $\varphi_k$ represents a phase difference between weighted values of a first antenna group and a second antenna group of the transmit end for a transmission signal from a same transmission layer and the $\varphi_k = e^{j\pi k/2}$ the k is a non-negative integer and is determined by $i_2$, the $i_2$ is a non-negative integer, the first antenna group and the second antenna group belong to a same multi-antenna system, the coefficient $\alpha$ is used to perform phase adjustment on the $\varphi_k$, and the coefficient $\alpha$ has a functional relationship with at least one of the $i_1$, the $i_2$, the m, the m', and the k.

In the embodiment of the present invention, a transmit end receives a precoding matrix indicator PMI sent by a receive end, and selects a precoding matrix $W_{m,m',k}^{(2)}$ from a codebook according to the precoding matrix indicator PMI. For the precoding matrix $W_{m,m',k}^{(2)}$ in the codebook in the embodiment of the present invention, using a coefficient $\alpha$ to perform phase adjustment on $\varphi_k$ in the precoding matrix can avoid repetition of codewords in the codebook, which can increase the number of effective codewords, thereby enhancing system performance.

The transmit end 2200 may implement steps involving a transmit end in the methods in FIG. 17 and FIG. 18, which are not described in detail to avoid repetition.

Optionally, as an embodiment, the coefficient $$\alpha = e^{j2\pi \frac{\lfloor i_1/8 \rfloor}{8}},$$

or the coefficient $$\alpha = e^{j2\pi \frac{(m - i_1)/4}{32}},$$

or the coefficient $$\alpha = e^{j2\pi \frac{(m' - i_1)/4}{32}},$$

or the $$\alpha = e^{j2\pi \frac{4\lfloor i_1/8 \rfloor + (m-i_1)/4}{32}},$$

or the $$\alpha = e^{j2\pi \frac{4\lfloor i_1/8 \rfloor + (m'-i_1)/4}{32}},$$

or the $$\alpha = e^{j2\pi \frac{4\lfloor i_1/8 \rfloor + k/2}{32}},$$

or the $$\alpha = e^{j2\pi \frac{\lfloor i_2/2 \rfloor}{32}},$$

where $\lfloor \ \rfloor$ is a rounding down operator. It should be understood that a manner of determining a value of the coefficient α is not limited in the embodiment of the present invention.

Optionally, as another embodiment, the PMI received by the receiving unit 2201 includes a first index and a second index. The determining unit 2202 is specifically configured to: determine the $i_1$ according to the first index, and determine the $i_2$ according to the second index; and determine, in a stored codebook according to the $i_1$ and the $i_2$, the $W_{m,m',k}^{(2)}$ selected by the receive end.

Optionally, the $i_1$ and the $i_2$ are both non-negative integers less than or equal to 15, and a relationship between the precoding matrix $W_{m,m',k}^{(2)}$ included in the codebook stored at the transmit end and the $i_1$ and the $i_2$ may be schematically shown in a form of a table, for example, the foregoing Table 5. Alternatively, a relationship between the precoding matrix $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}$$

included in the codebook stored at the transmit end and the $i_1$ and the $i_2$ may be schematically shown in a form of a table, for example, Table 6.

Figure 23:
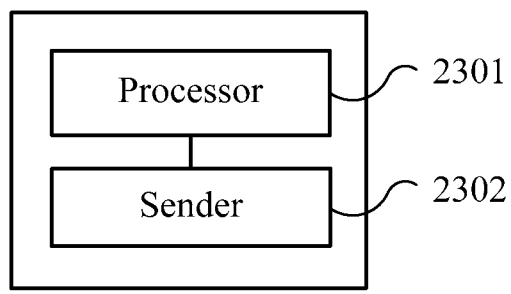
FIG. 23 is a structural block diagram of a receive end according to another embodiment of the present invention.

FIG. 23 is a structural block diagram of a receive end according to an embodiment of the present invention. A receive end 2300 includes a processor 2301 and a sender 2302.

The processor 2301 is configured to select, from a codebook, a precoding matrix W corresponding to a rank indicator, where the rank indicator is 2, the precoding matrix W is represented by the $W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi \frac{L}{32}} & e^{j2\pi \frac{L+8}{32}} & e^{j2\pi \frac{L+16}{32}} & e^{j2\pi \frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of a transmit end for a transmission signal from a same transmission layer (a weighted value corresponding to the phase difference), the $$\varphi_n \in \left\{ e^{\frac{j2\pi n}{Q}} \right\},$$

the n is a non-negative integer, the Q is a positive integer, and the first antenna group and the second antenna group belong to a same multi-antenna system.

The sender 2302 is configured to send a precoding matrix indicator PMI to the transmit end, so that the transmit end determines, according to the PMI, the precoding matrix W selected by the processor 2301.

In the embodiment of the present invention, a receive end selects a precoding matrix W from a codebook, and sends a precoding matrix indicator PMI to a transmit end, so that the transmit end determines the precoding matrix W according to the precoding matrix indicator, where the $W=W_1 \cdot W_2$ the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi \frac{L}{32}} & e^{j2\pi \frac{L+8}{32}} & e^{j2\pi \frac{L+16}{32}} & e^{j2\pi \frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system. In this way, using the coefficient α to perform the phase adjustment on the $\phi_n$ can avoid repetition of codewords in the codebook, which can increase the number of effective codewords, thereby enhancing system performance.

The receive end 2300 may implement steps involving the receive end in the methods in FIG. 15 and FIG. 16, which are not described in detail to avoid repetition.

It should be noted and it should be understood that the $X_L$ in the embodiment of the present invention may be represented by:

$$X_L = \begin{bmatrix} 1 & 1 & \cdots & 1 \\ e^{j2\pi\frac{L+t_1}{M}} & e^{j2\pi\frac{L+t_2}{M}} & \cdots & e^{j2\pi\frac{L+t_{num}}{M}} \end{bmatrix},$$

where the num is a positive integer, and the $t_1, t_2, \ldots,$ and $t_{num}$ are all integers and have nonconsecutive values. For example, when the M=32, the num=4, the $t_1$=0, the $t_2$=8, the $t_1$=16, and the $t_2$=24, the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix}.$$

Optionally, as an embodiment, the $W_2$ in the precoding matrix $W_1$. W, selected by the processor 2301 may be represented by any one of the foregoing formulas (9) to (12). The coefficient α has a functional relationship with at least one of the m1, the m2, the n, and the L. Specifically, the $$\alpha = e^{j2\pi\frac{\lfloor L/8 \rfloor}{8}},$$

or the $$\alpha = e^{j2\pi \cdot \frac{2(m1-1)}{32}},$$

or the $$\alpha = e^{j2\pi \cdot \frac{2(m2-1)}{32}},$$

or the $$\alpha = e^{j2\pi\frac{4\cdot\lfloor L/8\rfloor+2(m1-1)}{32}},$$

or the $$\alpha = e^{j2\pi\frac{4\cdot\lfloor L/8\rfloor+2(m2-1)}{32}},$$

or the $$\alpha = e^{j2\pi\frac{8\cdot\lfloor L/8\rfloor+n}{64}},$$

where $\lfloor \ \rfloor$ is a rounding down operator. And the like. It should be understood that a manner of determining a value of the coefficient α is not limited in the embodiment of the present invention. Optionally, the L is a non-negative integer less than or equal to 15.

Optionally, as another embodiment, the precoding matrix indicator PMI sent by the sender 2302 includes a first precoding matrix indicator $PMI_1$ and a second precoding matrix indicator $PMI_2$, the $PMI_1$ is used for indicating the $W_1$, and the $PMI_2$ is used for indicating the $W_2$.

Figure 24:
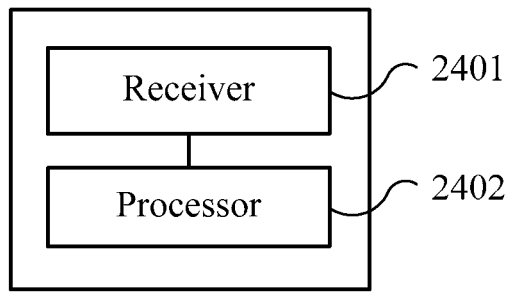
FIG. 24 is a structural block diagram of a transmit end according to another embodiment of the present invention.

FIG. 24 is a structural block diagram of a transmit end according to an embodiment of the present invention. A transmit end 2400 includes a receiver 2401 and a processor 2402.

The receiver 2401 is configured to receive a precoding matrix indicator PMI sent by a receive end.

The processor 2402 is configured to determine, according to the precoding matrix indicator PMI received by the receiver 2401, a precoding matrix W that is selected by the receive end from a codebook and corresponds to a rank indicator, where the rank indicator is 2, the precoding matrix W is represented by $W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of the transmit end for a transmission signal from a same transmission layer (a weighted value corresponding to the phase difference), the $$\varphi_n \in \{e^{\frac{j2\pi n}{Q}}\},$$

the n is a non-negative integer, the Q is a positive integer, and the first antenna group and the second antenna group belong to a same multi-antenna system.

In the embodiment of the present invention, a transmit end receives a precoding matrix indicator PMI sent by a receive end, and the transmit end determines, according to the precoding matrix indicator, a precoding matrix W precoding matrix W selected by the receive end from a codebook, where the $W=W_1 \cdot W_2$, the $$W_1 = \begin{bmatrix} X_L & 0 \\ 0 & X_L \end{bmatrix},$$

the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix},$$

the 0 is a matrix of zeros having 2 rows and 4 columns, the L is a non-negative integer, a coefficient α is used to perform phase adjustment on $\phi_n$ in the $W_2$, the $\phi_n$ represents a phase difference between weighted values of a first antenna group and a second antenna group of the transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system. In this way, using the coefficient α to perform the phase adjustment on the $\phi_n$ can avoid repetition of codewords in the codebook, which can increase the number of effective codewords, thereby enhancing system performance.

The transmit end 2400 may implement steps involving a transmit end in the methods in FIG. 15 and FIG. 16, which are not described in detail to avoid repetition.

It should be noted and it should be understood that the $X_L$ in the embodiment of the present invention may be represented by:

$$X_L = \begin{bmatrix} 1 & 1 & & 1 \\ e^{j2\pi\frac{L+t_1}{M}} & e^{j2\pi\frac{L+t_2}{M}} & \cdots & e^{j2\pi\frac{L+t_{num}}{M}} \end{bmatrix},$$

where the num is a positive integer, and the $t_1, t_2, \ldots,$ and $t_{num}$ are all integers and have nonconsecutive values. For example, when the M=32, the num=4, the $t_1=0$, the $t_2=8$, the $t_1=16$, and the $t_2=24$, the $$X_L = \begin{bmatrix} 1 & 1 & 1 & 1 \\ e^{j2\pi\frac{L}{32}} & e^{j2\pi\frac{L+8}{32}} & e^{j2\pi\frac{L+16}{32}} & e^{j2\pi\frac{L+24}{32}} \end{bmatrix}.$$

Optionally, as an embodiment, the $W_2$ in the precoding matrix $W=W_1 \cdot W_2$ may be represented by any one of the foregoing formulas (9) to (12). The coefficient α has a functional relationship with at least one of the m1, the m2, the n, and the L. Specifically, the $$\alpha = e^{j2\pi\frac{\lfloor L/8 \rfloor}{8}},$$

or the $$\alpha = e^{j2\pi\frac{2(m1-1)}{32}},$$

or the $$\alpha = e^{j2\pi\frac{2(m2-1)}{32}},$$

or the $$\alpha = e^{j2\pi\frac{4\cdot\lfloor L/8 \rfloor + 2(m1-1)}{32}},$$

or the $$\alpha = e^{j2\pi\frac{4\cdot\lfloor L/8 \rfloor + 2(m2-1)}{32}},$$

or the $$\alpha = e^{j2\pi\frac{8\cdot\lfloor L/8 \rfloor + n}{64}},$$

where $\lfloor\ \rfloor$ is a rounding down operator. And the like. It should be understood that a manner of determining a value of the coefficient α is not limited in the embodiment of the present invention. Optionally, the L is a non-negative integer less than or equal to 15.

Optionally, as another embodiment, the precoding matrix indicator PMI received by the receiver 2401 includes a first precoding matrix indicator $PMI_1$ and a second precoding matrix indicator $PMI_2$. The processor 2402 is specifically configured to: determine the $W_1$ according to the $PMI_1$, and determine the $W_2$ according to the $PMI_2$; and determine the W according to the $W_1$ and the $W_2$.

Figure 25:
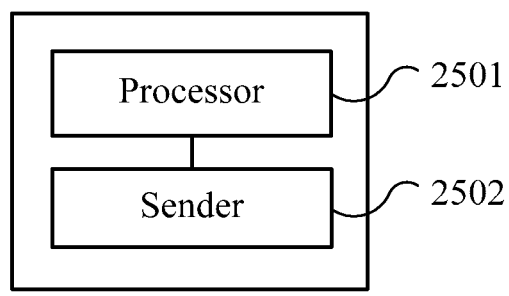
FIG. 25 is a structural block diagram of a receive end according to another embodiment of the present invention.

FIG. 25 is a structural block diagram of a receive end according to an embodiment of the present invention. A receive end 2500 includes a processor 2501 and a sender 2502.

The processor 2501 is configured to select, from a codebook, a precoding matrix $W_{m,m',k}^{(2)}$ corresponding to a rank indicator, where the rank indicator is 2, the $$W_{m,m',k}^{(2)} = \frac{1}{\sqrt{8}} \begin{bmatrix} v_m & v_{m'} \\ \alpha\varphi_k v_{m'} & -\alpha\varphi_k v_m \end{bmatrix}$$

or the $$W_{m,m',k}^{(2)} = \frac{1}{\sqrt{8}} \begin{bmatrix} v_m & v_{m'} \\ \alpha\varphi_k v_m & -\alpha\varphi_k v_{m'} \end{bmatrix}$$

or the $$W_{m,m',k}^{(2)} = \frac{1}{\sqrt{8}} \begin{bmatrix} v_m & v_{m'} \\ \alpha\varphi_k v_m & \alpha\varphi_k v_{m'} \end{bmatrix},$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m=i_1+8*Z_1$, the $m'=i_1+8*Z_2$, the $i_1$ is a non-negative integer, the $Z_1$ and the $Z_2$ are non-negative integers, the $\phi_k$ represents a phase difference between weighted values of a first antenna group and a second antenna group of a transmit end for a transmission signal from a same transmission layer and the $\phi_k = e^{j\pi k/2}$ the k is a non-negative integer and is determined by $i_2$, the $i_2$ is a non-negative integer, the first antenna group and the second antenna group belong to a same multi-antenna system, the coefficient $\alpha$ is used to perform phase adjustment on the $\phi_k$, and the coefficient $\alpha$ has a functional relationship with at least one of the $i_1$, the $i_2$, the m, the m', and the k.

The sender 2502 is configured to send a precoding matrix indicator PMI to the transmit end, so that the transmit end determines, according to the PMI, the precoding matrix $W_{m,m',k}^{(2)}$ selected by the processor 2501.

In the embodiment of the present invention, a receive end selects a precoding matrix $W_{m,m',k}^{(2)}$ from a codebook, and sends a precoding matrix indicator PMI to a transmit end, so that the transmit end determines the precoding matrix $W_{m,m',k}^{(2)}$ according to the precoding matrix indicator. For the precoding matrix $W_{m,m',k}^{(2)}$ in the codebook in the embodiment of the present invention, using a coefficient $\alpha$ to perform phase adjustment on $\phi_n$ in the precoding matrix can avoid repetition of codewords in the codebook, which can increase the number of effective codewords, thereby enhancing system performance.

The receive end 2500 may implement steps involving a receive end in the methods in FIG. 17 and FIG. 18, which are not described in detail to avoid repetition.

Optionally, as an embodiment, the coefficient $$\alpha = e^{j2\pi \frac{\lfloor i_1/8 \rfloor}{8}},$$

or the coefficient $$\alpha = e^{j2\pi \frac{(m-i_1)/4}{32}},$$

or the coefficient $$\alpha = e^{j2\pi \frac{(m'-i_1)/4}{32}},$$

or the coefficient $$\alpha = e^{j2\pi \frac{4\lfloor i_1/8 \rfloor + (m-i_1)/4}{32}},$$

or the coefficient $$\alpha = e^{j2\pi \frac{4\lfloor i_1/8 \rfloor + (m'-i_1)/4}{32}},$$

or the coefficient $$\alpha = e^{j2\pi \frac{4\lfloor i_1/8 \rfloor + k/2}{32}},$$

or the coefficient $$\alpha = e^{j2\pi \frac{\lfloor i_2/2 \rfloor}{32}},$$

where $\lfloor \; \rfloor$ is a rounding down operator. It should be understood that a manner of determining a value of the coefficient $\alpha$ is not limited in the embodiment of the present invention.

Optionally, as another embodiment, the $i_1$ and the $i_2$ are both non-negative integers less than or equal to 15, and a relationship between the precoding matrix $W_{m,m',k}^{(2)}$ included in the codebook and the $i_1$ and the $i_2$ may be schematically shown in a form of a table, for example, the foregoing Table 5. Alternatively, a relationship between the precoding matrix $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}$$

included in the codebook and the $i_1$ and the $i_2$ may be schematically shown in a form of a table, for example, Table 6.

Optionally, the PMI sent by the sender 2502 includes a first index and a second index, the first index is used for indicating the $i_1$, and the second index is used for indicating the $i_2$, so that the transmit end determines the $W_{m,m',k}^{(2)}$ according to the $i_1$ and the $i_2$. Certainly, the sender 2502 may directly indicate the selected precoding matrix W to the transmit end by using one PMI. It should be understood that a manner in which the receive end indicates a precoding matrix is not limited in the embodiment of the present invention.

Figure 26:
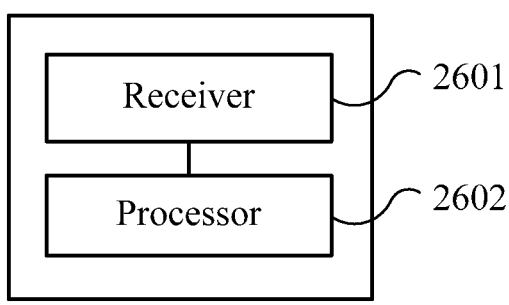
FIG. 26 is a structural block diagram of a transmit end according to another embodiment of the present invention.

FIG. 26 is a structural block diagram of a transmit end according to an embodiment of the present invention. A transmit end 2600 includes a receiver 2601 and a processor 2602.

The receiver 2601 is configured to receive a precoding matrix indicator PMI sent by a receive end.

The processor 2602 is configured to determine, according to the precoding matrix indicator PMI received by the receiver 2601, a precoding matrix $W_{m,m',k}^{(2)}$ that is selected by the receive end from a codebook based on a reference signal and corresponds to a rank indicator, where the rank indicator is 2, the $$W_{m,m',k}^{(2)} = \frac{1}{\sqrt{8}} \begin{bmatrix} v_m & v_{m'} \\ \alpha \varphi_k v_{m'} & -\alpha \varphi_k v_m \end{bmatrix}$$

or the $$W_{m,m',k}^{(2)} = \frac{1}{\sqrt{8}} \begin{bmatrix} v_m & v_{m'} \\ \alpha \varphi_k v_m & -\alpha \varphi_k v_{m'} \end{bmatrix}$$

or the $$W_{m,m',k}^{(2)} = \frac{1}{\sqrt{8}} \begin{bmatrix} v_m & v_{m'} \\ \alpha \varphi_k v_m & \alpha \varphi_k v_{m'} \end{bmatrix}$$

the $$v_m = \begin{bmatrix} 1 \\ e^{j2\pi m/32} \end{bmatrix},$$

the $$v_{m'} = \begin{bmatrix} 1 \\ e^{j2\pi m'/32} \end{bmatrix},$$

the $m=i_1+8*Z_1$, the $m'=i_1+8*Z_2$, the $i_1$ is a non-negative integer, the $Z_1$ and the $Z_2$ are non-negative integers, the $\phi_k$ represents a phase difference between weighted values of a first antenna group and a second antenna group of the transmit end for a transmission signal from a same transmission layer and the $\phi_k=e^{j\pi k/2}$ the k is a non-negative integer and is determined by $i_2$, the $i_2$ is a non-negative integer, the first antenna group and the second antenna group belong to a same multi-antenna system, the coefficient $\alpha$ is used to perform phase adjustment on the $\phi_k$, and the coefficient $\alpha$ has a functional relationship with at least one of the $i_1$, the $i_2$, the m, the m', and the k.

In the embodiment of the present invention, a transmit end receives a precoding matrix indicator PMI sent by a receive end, and selects a precoding matrix $W_{m,m',k}^{(2)}$ from a codebook according to the precoding matrix indicator PMI. For the precoding matrix $W_{m,m',k}^{(2)}$ in the codebook in the embodiment of the present invention, using a coefficient $\alpha$ to perform phase adjustment on $\phi_k$ in the precoding matrix can avoid repetition of codewords in the codebook, which can increase the number of effective codewords, thereby enhancing system performance.

The transmit end 2600 may implement steps involving a transmit end in the methods in FIG. 17 and FIG. 18, which are not described in detail to avoid repetition.

Optionally, as an embodiment, the coefficient $$\alpha = e^{j2\pi\frac{\lfloor i_1/8 \rfloor}{8}},$$

or the coefficient $$\alpha = e^{j2\pi\frac{(m-i_1)/4}{32}},$$

or the coefficient $$\alpha = e^{j2\pi\frac{(m'-i_1)/4}{32}},$$

or the $$\alpha = e^{j2\pi\frac{4\lfloor i_1/8 \rfloor + (m-i_1)/4}{32}},$$

or the $$\alpha = e^{j2\pi\frac{4\lfloor i_1/8 \rfloor + (m'-i_1)/4}{32}},$$

or the $$\alpha = e^{j2\pi\frac{4\lfloor i_1/8 \rfloor + k/2}{32}},$$

or the $$\alpha = e^{j2\pi\frac{\lfloor i_2/2 \rfloor}{32}},$$

where $\lfloor \ \rfloor$ is a rounding down operator. It should be understood that a manner of determining a value of the coefficient $\alpha$ is not limited in the embodiment of the present invention.

Optionally, as another embodiment, the PMI received by the receiver 2601 includes a first index and a second index. The processor 2602 is specifically configured to: determine the $i_1$ according to the first index, and determine the $i_2$ according to the second index; and determine, in a stored codebook according to the $i_1$ and the $i_2$, the $W_{m,m',k}^{(2)}$ selected by the receive end.

Optionally, the $i_1$ and the $i_2$ are both non-negative integers less than or equal to 15, and a relationship between the precoding matrix $W_{m,m',k}^{(2)}$ included in the codebook stored at the transmit end and the $i_1$ and the $i_2$ may be schematically shown in a form of a table, for example, the foregoing Table 5. Alternatively, a relationship between the precoding matrix $$W_{m,m',k}^{(2)} = \frac{1}{\sqrt{8}}\begin{bmatrix} v_m & v_{m'} \\ \alpha\varphi_k v_m & -\alpha\varphi_k v_{m'} \end{bmatrix}$$

included in the codebook stored at the transmit end and the $i_1$ and the $i_2$ may be schematically shown in a form of a table, for example, Table 6.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A precoding matrix indicator feedback method, comprising:
   selecting, by a receive end, based on a reference signal, a precoding matrix W from a codebook, wherein a coefficient α is used to perform phase adjustment on $\phi_n$ in the W, the $\phi_n$ represents a phase difference between weighted values of a first antenna group and a second antenna group of a transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system; and
   sending, by the receive end, a precoding matrix indicator (PMI) of the precoding matrix W to the transmit end.

2. The method according to claim 1, wherein the method further comprises:
   determining, by the receive end, a rank indicator based on the reference signal, wherein the rank indicator corresponds to the number of useful transmission layers; and
   the selecting, by a receive end, based on a reference signal, a precoding matrix W from a codebook comprises:
   selecting, by the receive end, based on the reference signal, the W corresponding to the rank indicator from the codebook.

3. The method according to claim 2, wherein
   when the rank indicator is 1, the precoding matrix is:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix};$$

wherein the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, wherein in the $e_{m1}$ an m1$^{th}$ element is 1 and other elements are all 0; the $Y_2$ and $e_{m2}$ represent a P×1-dimensional column vector, wherein in the $e_{m2}$ an m2$^{th}$ element is 1 and other elements are all 0; the m1 and the m2 are both positive integers; and the $e_{m1}$ and the $e_{m2}$ are same.

4. The method according to claim 3, wherein
   the coefficient $\alpha=e^{j2\pi \cdot f(m1)}$, wherein the $f(m_1)$ represents a function of the $m_1$; or
   the coefficient $\alpha=e^{j2\pi \cdot f(m2)}$, wherein the $f(m_2)$ represents a function of the $m_2$.

5. A receive end, comprising:
   a processor, configured to select a precoding matrix W from a codebook based on a reference signal, wherein a coefficient α is used to perform phase adjustment on $\phi_n$ in the W, the $\phi_n$ represents a phase difference between weighted values of a first antenna group and a second antenna group of a transmit end for a transmission signal from a same transmission layer, the $$\varphi_n \in \left\{ e^{\frac{j2\pi n}{Q}} \right\},$$

the n is a non-negative integer, the Q is a positive integer, and the first antenna group and the second antenna group belong to a same multi-antenna system; and
   a sender, configured to send a precoding matrix indicator (PMI) of the precoding matrix W to the transmit end.

6. The receive end according to claim 5, wherein
   the processor is further configured to determine a rank indicator based on the reference signal, wherein the rank indicator corresponds to the number of useful transmission layers; and
   the configuration of the processor selecting the precoding matrix W from the codebook based on the reference signal, comprises:
   the processor is configured to: select, based on the reference signal, the W corresponding to the rank indicator from the codebook.

7. The receive end according to claim 6, wherein
   when the rank indicator determined by the processor is 1, the precoding matrix selected by the processor is:

$$W = W_1 \cdot W_2 = \begin{bmatrix} X_L & 0 \\ 0 & X_L \end{bmatrix} \cdot \begin{bmatrix} Y_1 \\ \alpha\varphi_n Y_2 \end{bmatrix} = \begin{bmatrix} X_L & 0 \\ 0 & X_L \end{bmatrix} \cdot \begin{bmatrix} e_{m1} \\ \alpha\varphi_n e_{m2} \end{bmatrix};$$

wherein the $$X_L = \begin{bmatrix} 1 & 1 & \cdots & 1 \\ e^{j2\pi\frac{L}{M}} & e^{j2\pi\frac{L+1}{M}} & \cdots & e^{j2\pi\frac{L+(P-1)}{M}} \end{bmatrix};$$

the L, the P, and the M are all positive integers; the L is less than the M; the $Y_1$ and $e_{m1}$ represent a P×1-dimensional column vector, wherein in the $e_{m1}$ an m1$^{th}$ element is 1 and other elements are all 0; the $Y_2$ and $e_{m2}$ represent a P×1-dimensional column vector, wherein in the $e_{m2}$ an m2$^{th}$ element is 1 and other elements are all 0; the m1 and the m2 are both positive integers; and the $e_{m1}$ and the $e_{m2}$ are same.

8. The receive end according to claim 7, wherein the coefficient $\alpha = e^{j2\pi \cdot f(m_1)}$, wherein the $f(m_1)$ represents a function of the $m_1$; or
the coefficient $\alpha = e^{j2\pi \cdot f(m_2)}$, wherein the $f(m_2)$ represents a function of the $m_2$.

9. The receive end according to claim 8, wherein the coefficient $$\alpha = e^{j2\pi \frac{\lfloor (m1-1)/k \rfloor}{A}}$$

or the coefficient $$\alpha = e^{j2\pi \frac{\lfloor (m2-1)/k \rfloor}{A}},$$

wherein the A is a positive integer, the k=P/2, and $\lfloor \ \rfloor$ is a rounding down operator.

10. The receive end according to claim 8, wherein the coefficient $$\alpha = e^{j2\pi \frac{(m1-1) \bmod 2}{A}}$$

or the coefficient $$\alpha = e^{j2\pi \frac{(m2-1) \bmod 2}{A}},$$

wherein the A is a positive integer, and mod is a modulo operator.

* * * * *